United States Patent [19]
Yamada et al.

[11] Patent Number: 5,740,497
[45] Date of Patent: Apr. 14, 1998

[54] IMAGE PROCESSING APPARATUS THAT CAN EXECUTE INTERRUPTION JOB EFFICIENTLY

[75] Inventors: Tatsutoshi Yamada; Takeshi Morikawa; Hiroharu Tanaka, all of Toyokawa; Tomoyuki Atsumi, Toyohashi; Hidenobu Nakamura, Toyokawa, all of Japan

[73] Assignee: Minolta Co., Ltd., Osaka,, Japan

[21] Appl. No.: 766,183

[22] Filed: Dec. 12, 1996

[30] Foreign Application Priority Data

Dec. 14, 1995 [JP] Japan ................................ 7-325979

[51] Int. Cl.⁶ .......................... G03G 15/00; G03G 21/14
[52] U.S. Cl. .................. 399/87; 358/437; 399/38; 399/9; 399/130; 399/364
[58] Field of Search .................. 399/87, 144, 85, 399/9, 130, 38, 364; 358/296, 437

[56] References Cited

U.S. PATENT DOCUMENTS

| | | |
|---|---|---|
| 4,623,244 | 11/1986 | Andrews et al. |
| 4,956,667 | 9/1990 | Gartner . |
| 5,023,728 | 6/1991 | Nimura et al. ............. 358/437 |
| 5,097,341 | 3/1992 | Forest . |
| 5,206,735 | 4/1993 | Gauronski et al. . |
| 5,245,368 | 9/1993 | Farrell et al. ............. 358/401 |
| 5,598,271 | 1/1997 | Ohtani ..................... 358/296 |

FOREIGN PATENT DOCUMENTS 4-233555  8/1996  Japan .

*Primary Examiner*—R. L. Moses
*Attorney, Agent, or Firm*—Burns, Doane, Swecker & Mathis, LLP

[57] ABSTRACT

In an image processing apparatus, determination is made whether an interruptive print wait state is attained during interruptive printing. When determination is made that the apparatus is in an interruptive print wait state, an interruption recover process is effected. Then, the apparatus returns to the normal mode prior to interruption. Thus, an image processing apparatus is provided that can have the waiting time caused by an interruption in the normal job reduced.

16 Claims, 52 Drawing Sheets

1 COPYING APPARATUS

1 COPYING APPARATUS

MT1

| REGION | PAGE NUMBER PN | FORWARD CONCATENATION | BACKWARD CONCATENATION | ADDITIONAL INFORMATION | JOB NUMBER |
|---|---|---|---|---|---|
| 00 | 1 | 00 | 01 | | 1 |
| 01 | 1 | 01 | FF | | |
| 02 | 2 | 00 | 03 | | 1 |
| 03 | 2 | 03 | FF | | |
| ⋮ | | | | | |

306 CODE MEMORY

```
0
        COMPRESSION DATA 1 OF PAGE 1
32K
        COMPRESSION DATA 2 OF PAGE 1
64K
        COMPRESSION DATA 1 OF PAGE 2
96K
        COMPRESSION DATA 2 OF PAGE 2
128K
⋮
```

MEMORY MODE WRITE OPERATION

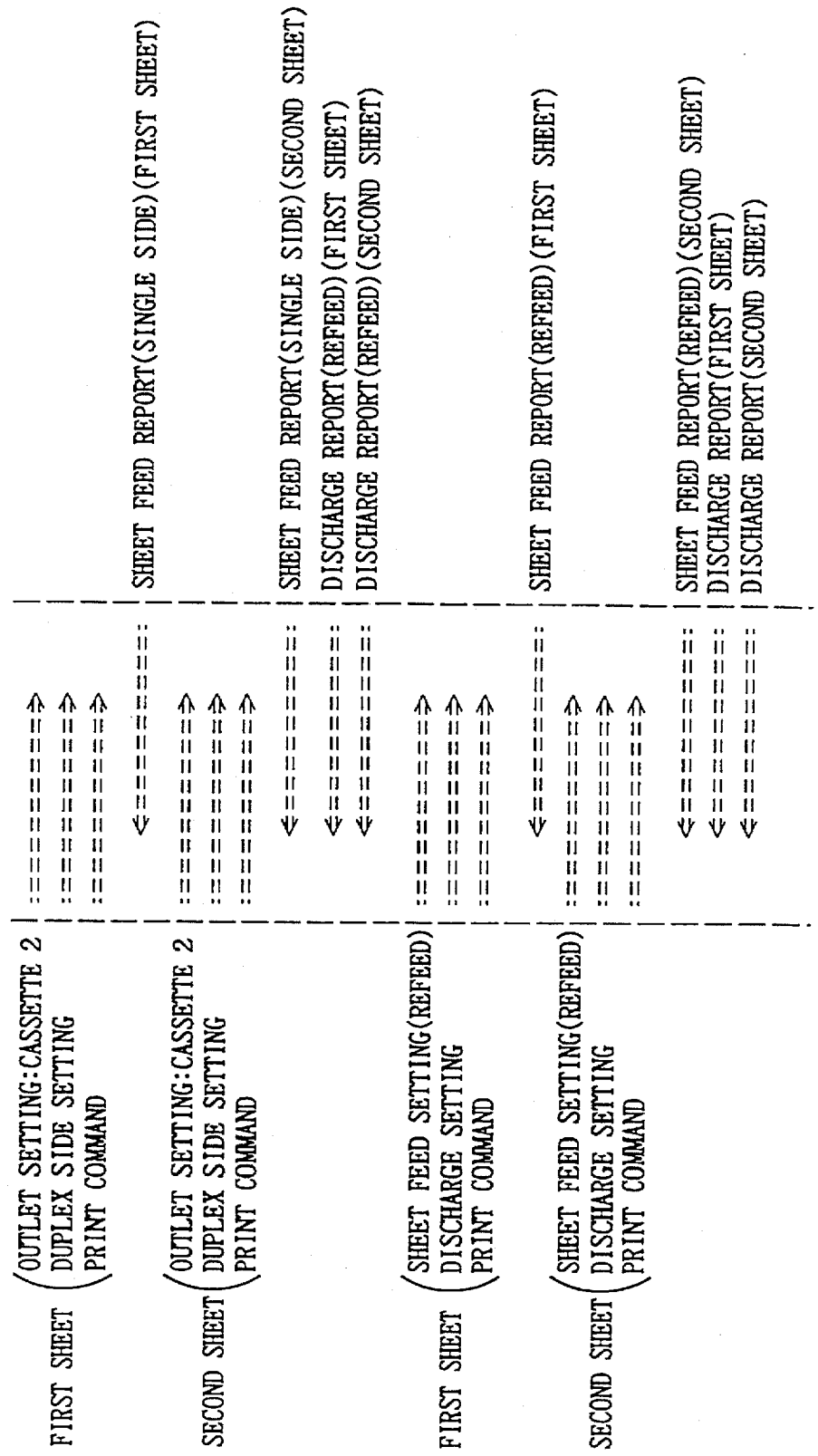

IMAGE PROCESSING APPARATUS THAT CAN EXECUTE INTERRUPTION JOB EFFICIENTLY

BACKGROUND OF THE INVENTION

1. Field of the Invention

The present invention relates to image processing apparatuses, and more particularly, to an image processing apparatus that allows interruption of a job.

2. Description of the Related Art

An image processing apparatus that allows an interruption job of interest to the present invention is disclosed in Japanese Patent Laying-Open No. 4-233555. According to the present publication, execution of a normal job is interrupted when an interruption job is ready to be printed. The process will proceed to execution of the interruption job.

In such a conventional image processing apparatus that allows an interruption job, eight sheets of originals, for example, must be read to define the image data to be printed out on one sheet in a copy operation of an interruption job in an economic copy mode such as a 4in1 duplex copy for a duplex original when the normal job is interrupted for transition to an interruption job. Even if printing is commenced after reading 8 originals, the next printing operation cannot be initiated until the next eight originals are read in. This wasteful period is time consuming.

On occasions of a printing prohibited error such as "paper empty" during execution of an interruption job, there is an unnecessary time period where printing is not carried out until the operator supplies paper, resulting in a wasteful waiting time period.

SUMMARY OF THE INVENTION

In view of the foregoing, an object of the present invention is to provide an image processing apparatus that allows execution of an interruption job and a normal job efficiently.

Another object of the present invention is to provide an image processing apparatus that can carry out an efficient reservation process.

A further object of the present invention is to provide an image processing method that allows execution of an interruption job and a normal job efficiently.

Still another object of the present invention is to provide an image processing method that can carry out an efficient reservation process.

The above objects of the present invention are achieved by an image processing apparatus as set forth in the following.

According to an aspect of the present invention, an image processing apparatus of the present invention is a copying apparatus that interrupts a first job during printing thereof to allow printing by another interruption job. The copying apparatus includes an input unit for optically reading an original image and converting the read original image into image data of electrical signals, a memory for storing the image data read out by the input unit, a print unit for printing on a sheet according to the image data stored in the memory, a detection unit for detecting a print wait state of the print unit when the interruption job is in progress, a first control unit for restarting printing of the interrupted first job when a print wait state is detected by the detection unit, and a second control unit for interrupting printing of the restarted first job to initiate printing of an interruption job at detection of cancel of a print wait state of the interruption job by the detection unit.

The interruption job detection unit detects a print wait state and restarts the printing operation of the first of the interrupted first job during the waiting period. When the print wait state of the interruption job is canceled, the printing operation of the restarted first job is interrupted to initiate the printing operation of the printing operation of the interruption job. Thus, an image processing apparatus that allows execution of an interruption job and a normal job efficiently is provided.

According to an another aspect of the present invention, an image formation apparatus having a reservation function that allows registration of a plurality of jobs for image formation according to a set of image data, and that initiates a print operation of a second job continuous to termination of a print operation of a first job. The image formation apparatus includes an input unit for entering image data and an operation mode at each job, a print unit for printing input image data on a sheet, a detection unit for detecting feeding interval of sheets fed to the print unit, a determination unit for determining whether a print operation of at least one sheet for the second job is allowed during the feeding interval of the first job detected by the detection unit, and a controller for forming an image of the second job during image formation of the first job when determination is made that printing is allowed by said determination unit.

The feeding interval of the print unit is detected during execution of the first job out of the plurality of types of image processes. Determination is made whether the printing operation of the second job is allowed during the feeding interval. When determination is made that the printing operation is executable, the image of the second job is formed during image processing of the first job.

The feeding interval of the print unit is detected during at least one execution of the plurality of types of image processes. Determination is made whether image processing of the second job can be executed when the feeding interval is increased. If executable, the image process of the second job is carried out simultaneous to the image process of the first job. Since another reserved image process is carried out without reducing the process speed of the image process that is currently executed, an image processing apparatus that allows an efficient reservation process is allowed.

According to a further aspect of the present invention, a print method of a copying apparatus that interrupts a first job during printing thereof to allow printing of another interruption job, includes the steps of optically reading out an original image to convert the same into image data of electrical signals, storing the read out image data into a memory, printing on a sheet according to the image data stored in the memory, detecting a print wait state of the print step when the interruption job is in progress, and restarting printing of the interrupted first job when the print wait state is detected.

A print wait state is detected during progress of an interruption job. The printing operation of the interrupted first job is restarted during the waiting time. When the print wait state of the interruption job is canceled, the printing operation of the restarted first job is interrupted to initiate printing of the interruption job. Thus, an image forming method is provided that allows execution of an interruption job and a normal job efficiently.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 30a to 30c, 31a, 31b, 32, 33 and 34 show the communication contents between a printer controller and a print processing unit.

DESCRIPTION OF THE PREFERRED EMBODIMENTS

Embodiments of the present invention will be described hereinafter with reference to the drawings.

Figure 1:
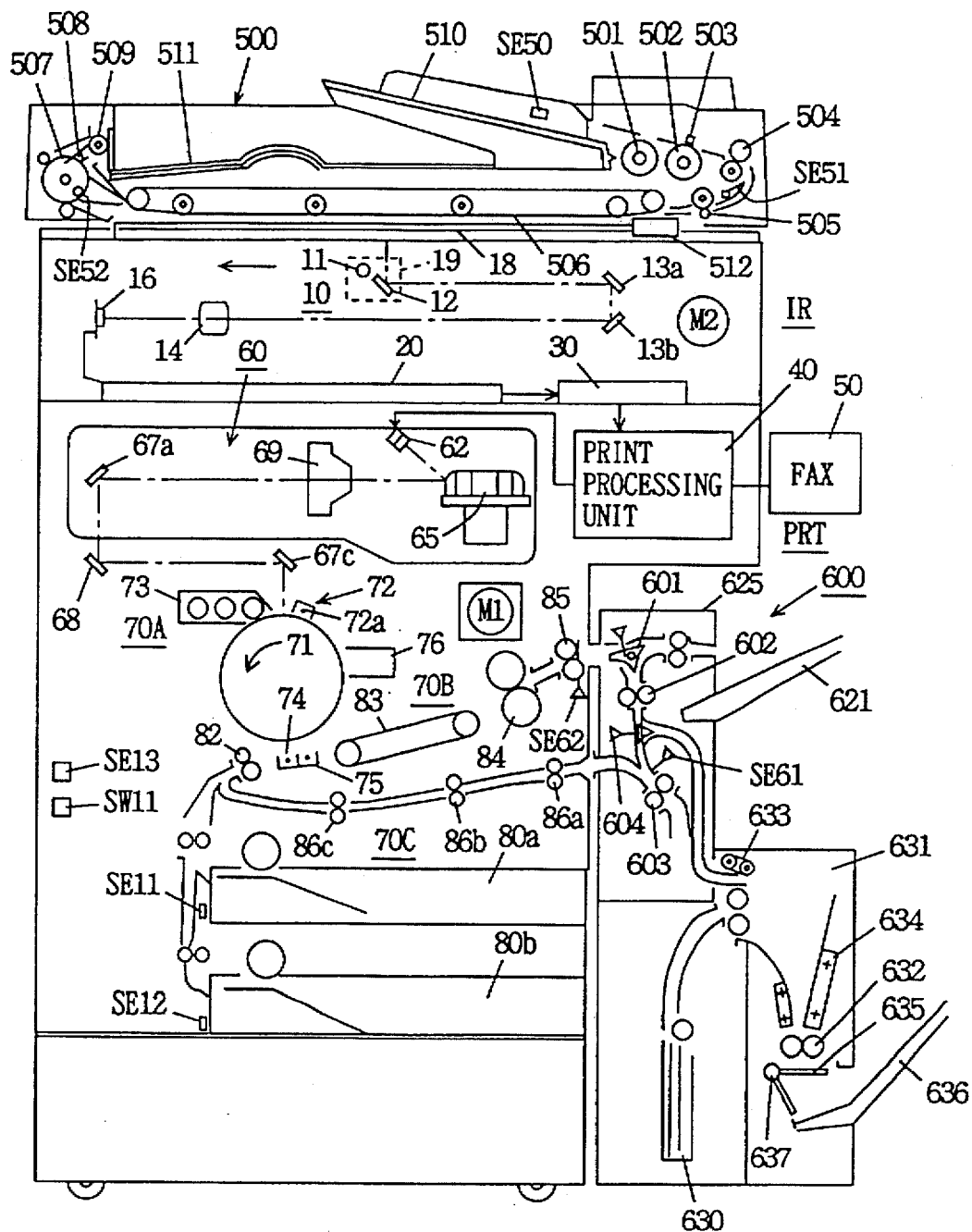
FIG. 1 is a sectional view showing an entire structure of a copying apparatus according to the present invention.

FIG. 1 is a sectional view of a copying apparatus 1 as an example of an image processing apparatus according to the present invention. Referring to FIG. 1, a copying apparatus 1 is a digital copier formed of an image reader IR and a page printer PRT, and also includes a FAX controller 50 for providing a fax function. The main body of image reader IR includes a scanning system 10 for analyzing an original mounted on an original glass 18 into pixels and reading out the same, an image signal processing unit 20 for quantitizing a photoelectric conversion signal output from scanning system 10 and carrying out signal processing according to various image formation modes, and a memory unit 30 for storing image data corresponding to an original. An automatic document feeder (ADFR) 500 which is an additional device also serving as an original cover is provided at the top portion of the main body in an openable manner with the trailing end as a fulcrum.

Scanning system 10 is an image read out mechanism of a line scanning system, including a scanner 19 with a lamp 11 for exposing an original and a mirror 12, fixed mirrors 13a and 13b, a converge lens 14, an image sensor 16 formed of a CCD array, and a scan motor M2 for driving scanner 19. The details of image signal processing unit 20 and memory unit 30 will be described afterwards.

ADFR 500 conveys an original set on an original stacker 510 onto original glass 18 via a sheet feed roller 501, a sorter roller 502, a sorter pad 503, an intermediate roller 504, a resist roller 505, and a transportation belt 506, and discharges the read out original onto an original discharge tray 511 by a discharge sheet roller 509. ADFR 500 includes an original scale 512, an original sensor SE50 for detecting presence of an original, an original size sensor SE51, and a discharge sensor SE52.

In copying a plurality of sheets of originals, the operator sets the accumulated originals in an up-facing manner. Each original in original stacker 501 is fed out one by one from the bottom of the originals and accurately set at a read out position on original platen glass 18 with the right side face downwards. In the case of a single side original mode, the original is transported leftwards in the drawing after being read out so that its right side face is upwards. In the case of a duplex side original mode, the original conveyed leftwards after having the right side face read out is turned opposite by a reversing roller 507 to be returned to the read out position on original platen glass 18. After the backside is read out, the original is fed leftwards to be discharged.

Page printer PRT includes a print processing unit 40 for providing an exposure control signal, a print head 60 with a semiconductor laser 62 as a light source, a develop transfer system 70A constituted by a photoreceptor drum 71 and a peripheral device, a fixing discharge system 70B with a pair of fixing rollers 84 and a discharge roller 85, and a circulation type sheet transport system 70C with a refeeding unit 600. A copy image is printed out according to an electrophotographic process according to image data transferred from image reader IR. Two sheet cassettes 80a and 80b that can accommodate several hundred sheets, sheet size detection sensors SE11 and 12, and a supply sheet roller group are provided beneath page printer PRT.

A laser beam emitted from semiconductor laser 62 is deflected in the main scanning direction by a polygon mirror 65 to be directed to an exposure position on photoreceptor drum 71 via a main lens 69 and various mirrors 67a, 68 and 67c. The surface of photoreceptor drum 71 is uniformly charged by a corona charger 72. A latent image formed by exposure becomes a toner image via developer 73. The toner image is separated from photoreceptor drum 71 by a transfer charger 75 at a transfer position (copy position) to be sent to a fixing roller pair 84 by transport belt 83 to be discharged in a face-up manner.

Refeeding unit 600 is attached at the side of page printer PRT as an additional device for facilitating automatic duplex copy. Refeeding unit 600 functions to temporarily accommodate a sheet discharged from the page printer main body to effect switch back transportation to return the sheet to the page printer main body.

Refeeding unit 600 includes a refeeder 625 and a binder 631 provided beneath refeeder 625 with a switching claw 604 therebetween. Refeeder 625 temporarily accommodates the sheet discharged from discharge roller 85 to turn the face opposite, if necessary, such as in the case of a duplex mode (not necessary when in a combine mode), and sends the sheet to a horizontal transport roller 86a of transportation system 70B for image formation (printing). Refeeding unit 600 includes a switching claw 601 for switching between discharge to discharge tray 621 and refeed, a transport roller 602, a reverse roller 603, and a reverse sensor SE61.

In a single side copy mode, the sheet passes through refeeding unit 600 to be discharged on discharge tray 621. In a duplex side copy mode, the left end portion of switch claw 601 moves upwards by a solenoid not shown. The sheet discharged from discharge roller 85 arrives at a forward/positive reversing roller 603 via transport roller 602. When the trailing edge of the sheet arrives at sheet sensor SE61, forward/positive reversing roller 603 reverses its position. Accordingly, the sheet is returned to the page printer main body. The returned sheet is sent towards a timing roller 82 via horizontal transport rollers 86a, 86b and 86c to attain a standby state. When a plurality of sheets are continuously fed, each sheet is conveyed with a predetermined sheet interval so that the sheet will not overlap each other, and then arrive at refeeding unit 600. Since the sheet transportation path length is constant, the number of sheets of one circulation (maximum number of circulating sheets) N that can be processed by refeeding unit 600 and horizontal transport rollers 86a–86c depends on the sheet size.

Refeeding unit 600 includes a discharge sheet option to effect a finishing process. A hot melt type binder 631 which is a discharge sheet option is provided at the side of page printer PRT as an additional device for automating a binder process. The sheet discharged from the page printer main body by discharge roller 85 is sent to binder 631 to be bound together when a predetermined number of sheets are accumulated to be discharged to a bind discharge tray 636.

In a normal copy operation with no binding, the sheet is discharged onto discharge tray 621 without passing through binder unit 631.

In a bind mode, a binder cover is fed out from a binder cover accommodate tray 630 prior to transportation of a sheet. The binder cover is sent to binder 631 with its leading edge in contact with the upper portion of a bind transport roller 632 in a standby state.

When a sheet is discharged from page printer PRT, the upper portion of switching claw 604 moves leftward by a solenoid not shown. The sheet is transported to binder 631 by a bind sheet discharge roller 633. When a predetermined number of sheets are fed to binder 631, a bind holding plate 634 moves leftwards, whereby the sheets and the binder cover are brought into contact and then transported by a bind transport roller 632. The sheets and the binder cover are pressed towards a bind heating plate 635 to be heated for a predetermined time period. Then, bind heating plate 635 moves downwards, and the binded bundle is discharged to bind discharge tray 636. A bind heater 637 is provided to heat bind heating plate 635.

Figure 2:
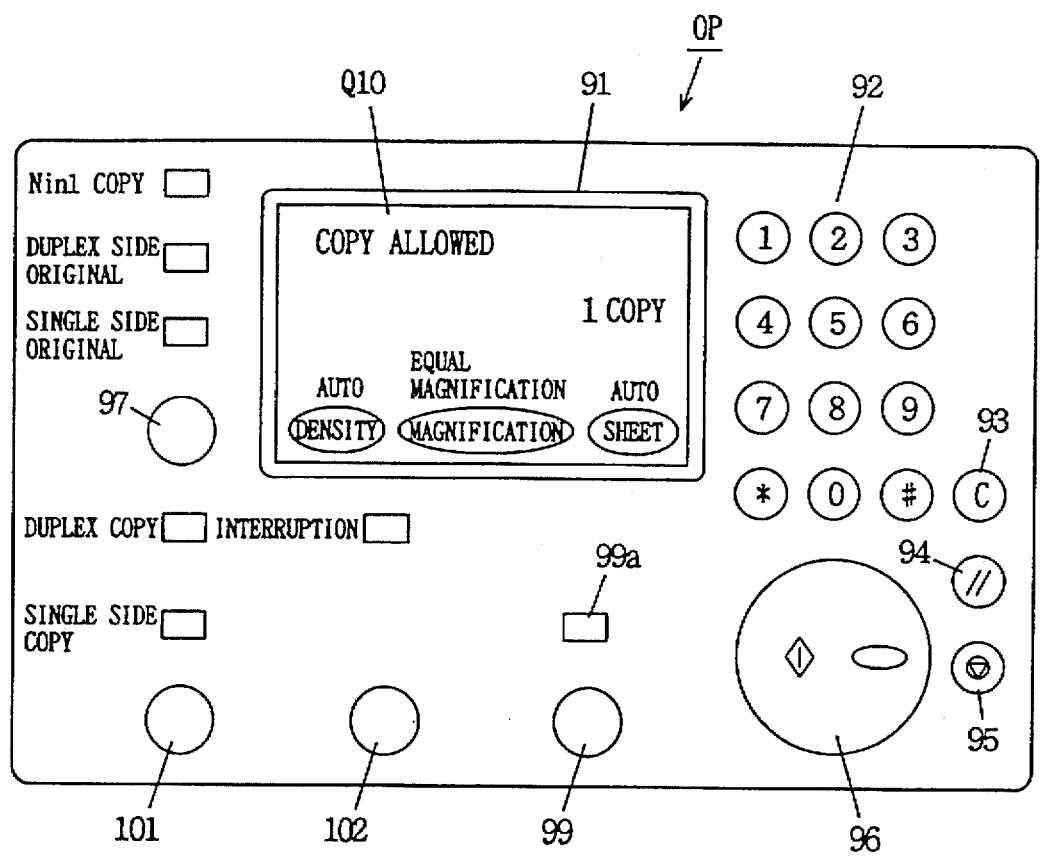
FIG. 2 is a plan view of an operation panel.

FIG. 2 is a plan view of an operation panel OP. Operation panel OP includes a liquid crystal touch panel 91 for status display, various mode setting, and job registration, a ten-key 92 for entering numerics of a copy condition (such as number of copies and magnification rate, a clear key 93 for returning the numeric conditions to the default values, a panel reset key 94 for initializing a copy mode, a stop key 95 for specifying interruption of a copy operation, a start key 96 for specifying commencement of a copy operation, an original specify key 97 for specifying a Nin1 copy, a single side original, or a duplex side original, a copy mode key 101 for switching between a duplex copy and a single copy, an interruption key 102 for entering interruption activation and recover, and a bind mode select key 99 for selecting a bind mode. Here, a Nin1 copy refers to a mode of copying N originals in one sheet. Selection of a bind mode will be displayed at bind mode display 99a.

Figure 3:
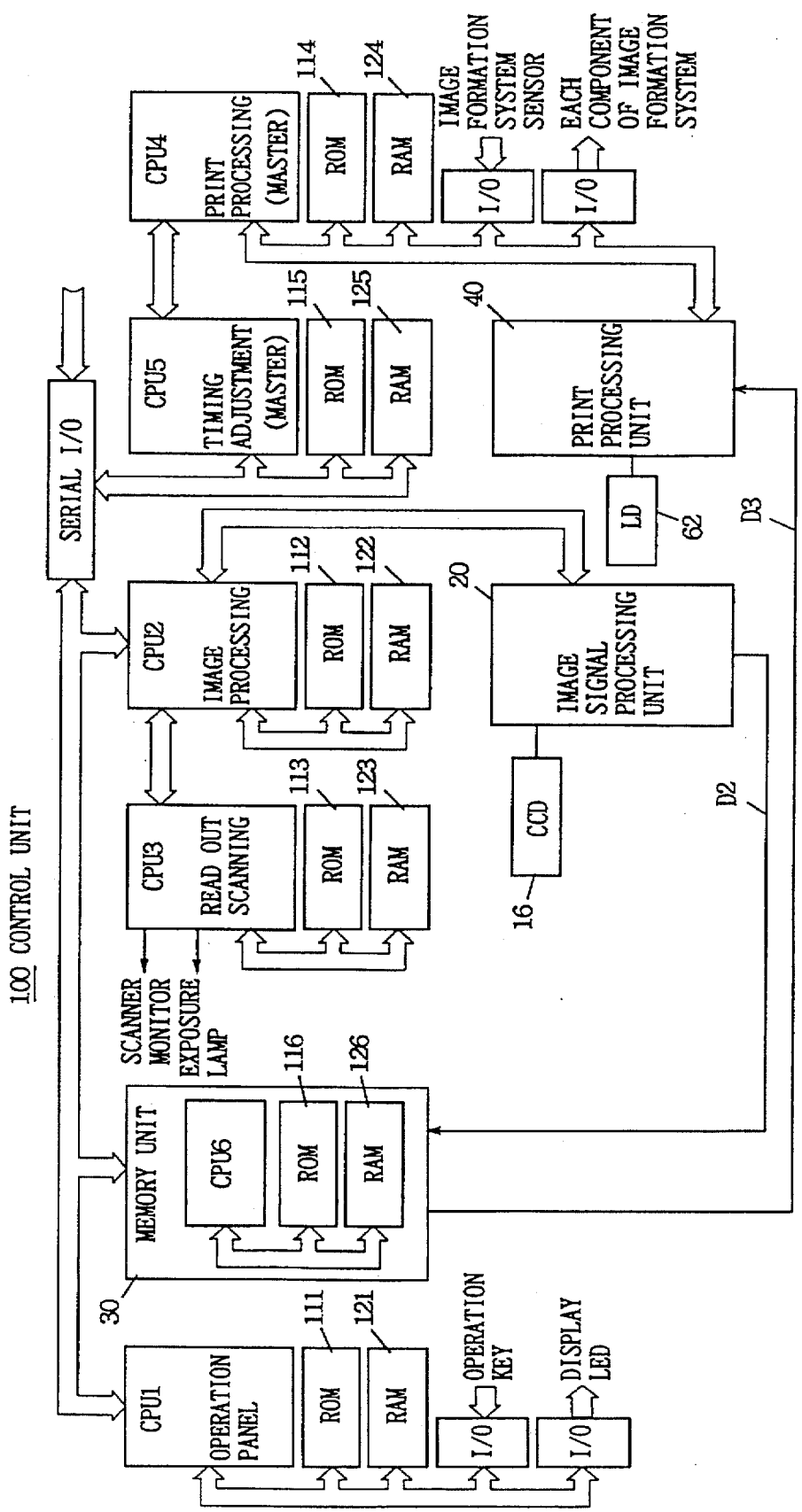
FIGS. 3 and 4 are block diagrams showing a structure of a control unit of a copying apparatus.
Figure 4:
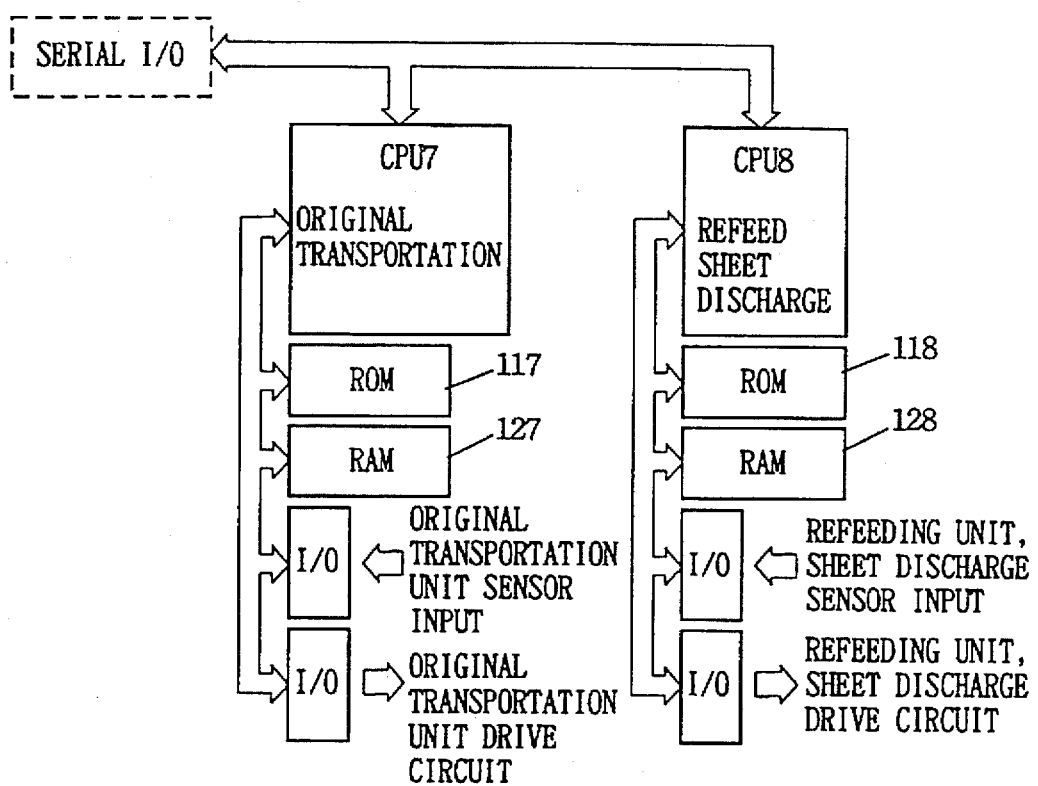

FIGS. 3 and 4 are block diagrams showing a structure of a control unit 100 of copying apparatus 1. Control unit 100 is constituted mainly by eight CPU 1–CPU 8. Each of CPU 1–CPU 8 is provided with ROM111–ROM118, respectively, storing relevant programs. CPU 6 is provided in memory unit 30.

CPU 1 provides control of signal input and display via various operation keys of operation panel OP. CPU 2 provides control of each component of image signal processing unit 20. CPU 3 provides control of driving scanning system 10. CPU 4 provides control of page printer PRT including print processing unit 40.

CPU 5 carries out the process for the entire timing adjustment of control unit 100 and operation mode setting. CPU 5 carries out serial communication with other CPUs to transfer commands and reports required for control.

CPU 6 provides control for storing and reading image information. CPU 7 provides control for original transportation by ADFR 500. CPU 8 provides control of refeeding unit 600.

Figure 5:
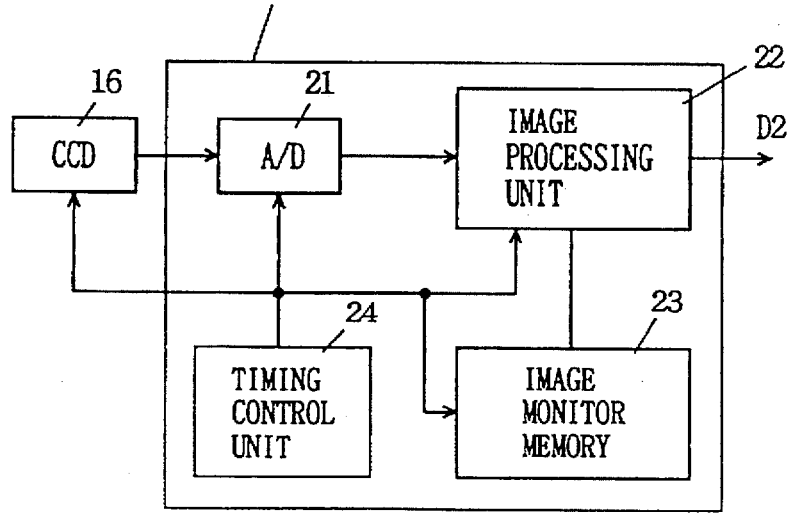
FIG. 5 is a block diagram showing a structure of an image signal processing unit.

FIG. 5 is a block diagram showing a structure of image signal processing unit 20. Image signal processing unit 20 includes an A/D converter 21, an image processing unit 22, an image monitor memory 23, and a timing control unit 24 for providing a synchronizing signal for operation of these components.

A/D converter 21 quantizes a photoelectric conversion signal of image sensor 16 and converts the same into image data of 8 bits (256 tones). Image processing unit 22 carries out image processing such as shading correction, MTF correction, gamma correction, and variable scale magnification processing, and provides processed image data D2 as read out information. Image monitor memory 23 is used to store sample data for shading correction.

Figure 6:
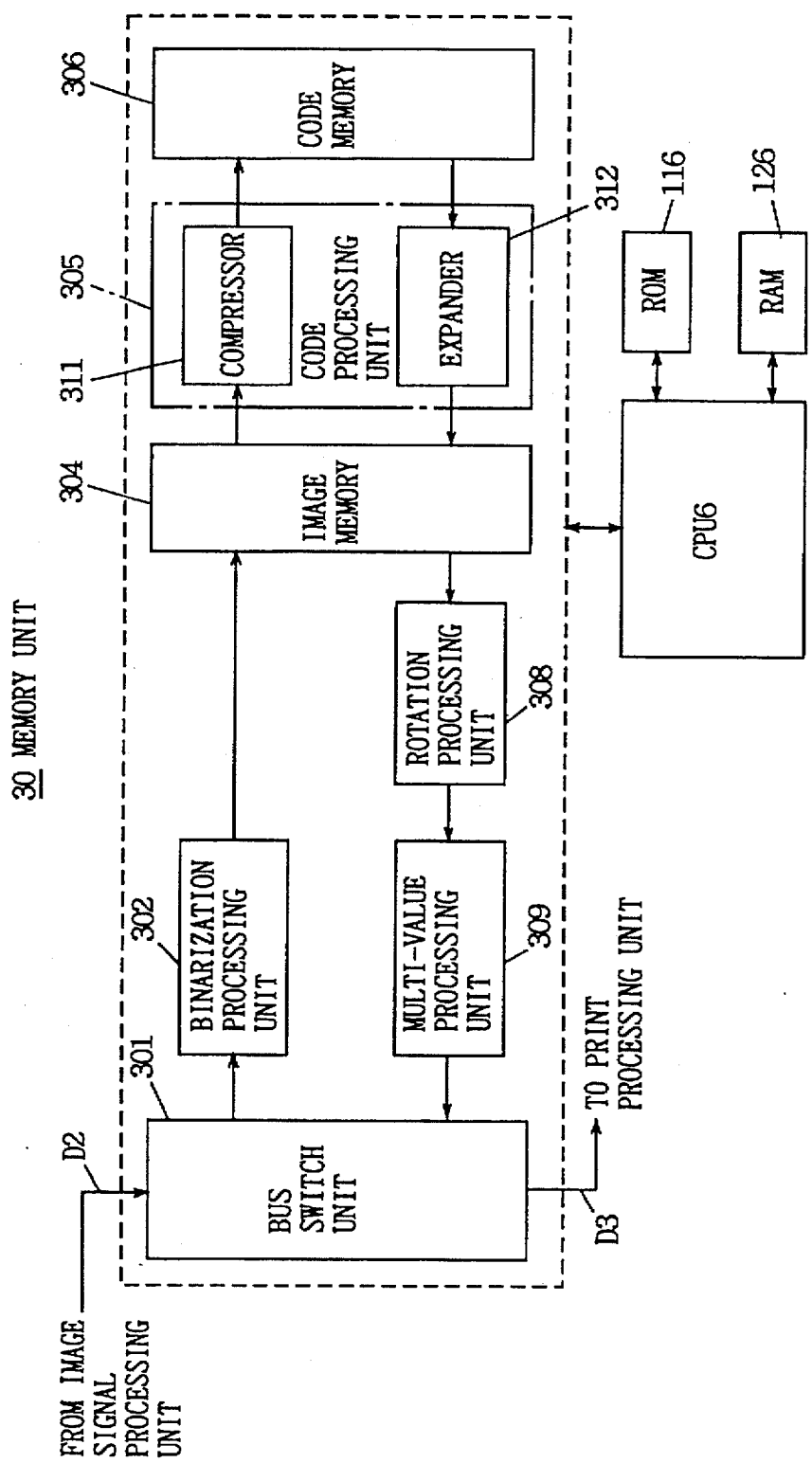
FIG. 6 is a block diagram showing a structure of a memory unit.

FIG. 6 is a block diagram showing a structure of memory unit 30. Memory unit 30 includes a bus switching unit 301, a binarization processing unit 302, a multiport image memory 304, a code processing unit 305 with a compressor 311 and an expander 312, a multiport code memory 306, a rotation processing unit 308, a multi-value processing unit 309, and the above-described CPU 6 for controlling these components. Image information is stored in a compressed manner for reducing the capacity of the memory. Image memory 304 has a capacity that can store image data of two pages read out at the resolution of 400 dpi.

In a memory mode copy operation that has the image read out by original scanning temporarily stored, image data D2 of 8 bits is applied to binarization processing unit 302 of memory unit 330 from image signal processing unit 20 via bus switching unit 301. Binarization processing unit 302 converts multi-value image data D2 into binary image data in a recoverable range by a dither method and the like. Binarized image data is temporarily written into image memory 304.

Code processing unit 305 reads out and compresses image data from image memory 304 to generate code data (compressed data), which is written into code memory 306. Code processing unit 305 reads out and expands code data which is of interest for printing from code memory 306 to write the obtained image data into image memory 304. Compressor 311 and expander 312 are implemented to operate independent of each other and in parallel to improve the copy speed. Data is DMA-transferred between compressor 311 or expander 312 and code memory 306 by a DMA controller not shown.

When one page of image data is reproduced by expansion, the data is read out from image memory 304 to be subjected to a rotation process, if necessary, and then recovered into multi-value image data 309 by multi-value processing unit 309. The multi-value image data is provided to print processing unit 40 as exposure control data. Code memory 306 is administered by a reference table MT1 provided within RAM 126 in the temporary storage of such an original image.

Figures 7A, 7B:
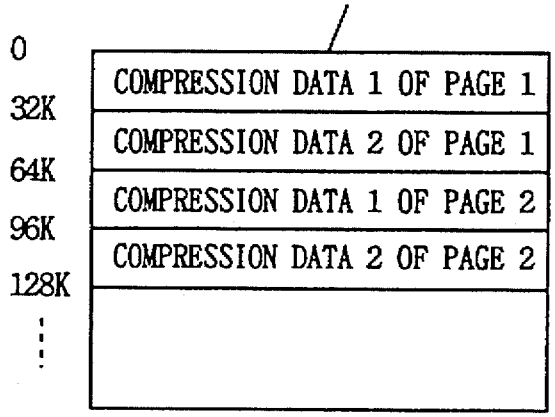
FIGS. 7a and 7b show the relationship between a reference table and a code memory.

FIGS. 7a and 7b show the relationship of reference table MT1 and code memory 306. Code memory 306 is divided into memory regions of 32K-byte unit. Code data of one page is stored in each region taking into consideration the allowability of simultaneous control of writing (reading) and read out (printing).

In reference table MT1 are stored a number indicating a region of code memory 306, an image data page number (original image number) PN assigned in the written order (the scanning order of original), the number of a concatenated region, and various additional information required for identifying the compression-expansion process such as the compression system and data length, and jobs. Code memory 306 is monitored dynamically according to such information.

The "forward concantenation" in FIG. 7a indicates the connection in the forward direction of each region of 32K bytes in each page. When this value is "00", it is the first storage region of data of one page. Similarly, "backward concatenation" indicates the connection in the succeeding direction. When the value is "FF", it is the last region. A value other than "FF" indicates the number of the next connected region.

CPU 106 generates information of reference table MT1 in reading out and compressing image data from image memory 304 while storing the same into code memory 306 by controlling compressor 311. In providing image data, code data is read out from code memory 306 according to operations in an opposite manner. The information in reference table MT1 is erased when the information of the relevant page is read out and the number of copies specified by the operation is completed.

The operation sequence of copying apparatus 1 in a memory mode will be described focusing on a request command (Q), report (A) and data flow between each of CPU 1–CPU 6.

Figure 8:
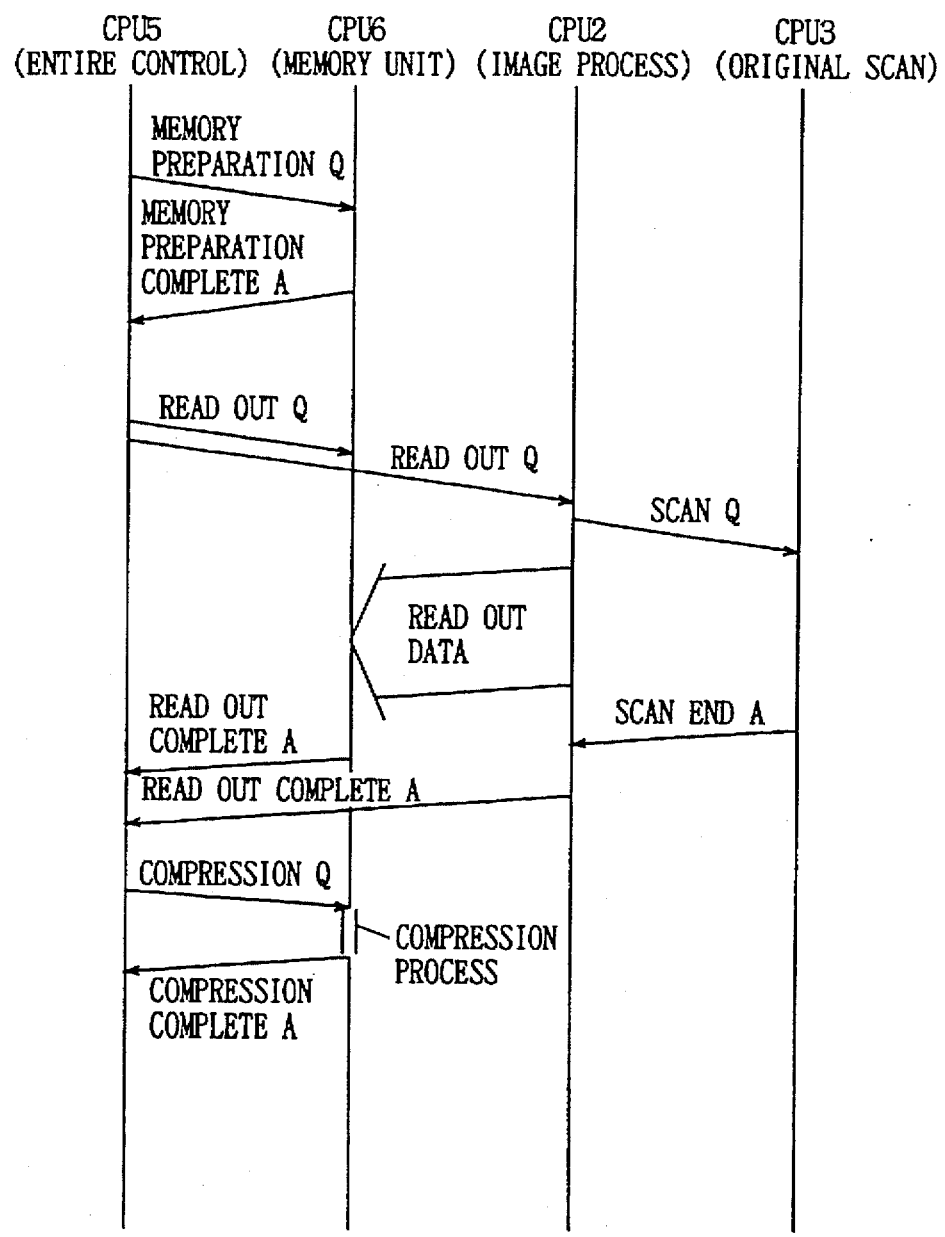
FIG. 8 shows a schematic sequence of a memory mode write operation.

FIG. 8 shows the schematic sequence of a memory mode write operation. In this memory mode write operation, image data is transferred from image signal processing unit 20 to image memory 304. CPU 5 providing the entire sequence control requests the memory to be prepared to CPU 6. In response, CPU 6 provides various settings with respect to the internal hardware such as specifying the bus connection status, the mode for binarization, and the head address of a writing region in image memory 304, and XY length information for transferring image data D2 from image signal processing unit 20 to image memory 304.

When these settings are completed, CPU 6 notifies CPU 5 that the memory is ready. When CPU 5 requests read out to CPU 6 and CPU 2, CPU 2 requests scanning to CPU 3. Then scanning is initiated by CPU 3. When scanner 19 arrives at the image region, read out data (image data D2) is transferred from image signal processing unit 20 to memory unit 30 according to the image processing mode set by CPU 2.

When the scanning operation is completed and read out completion is informed from CPU 2 and CPU 6, CPU 5 requests data compression to CPU 6. In response, CPU 6 sets the read out address from image memory 304, the XY length information, the write address to code memory 306, and the mode of compressor 311 (for example, MH system) to activate various components. A compression process is carried out, and code data is stored in code memory 306.

When the compression process ends, CPU 6 notifies compression completion to CPU 5. On this occasion, when code memory 306 is full, a compression complete report with a parameter indicating compression prohibited is sent to CPU 5, whereby CPU 5 becomes aware that code memory 306 is full.

Figure 9:
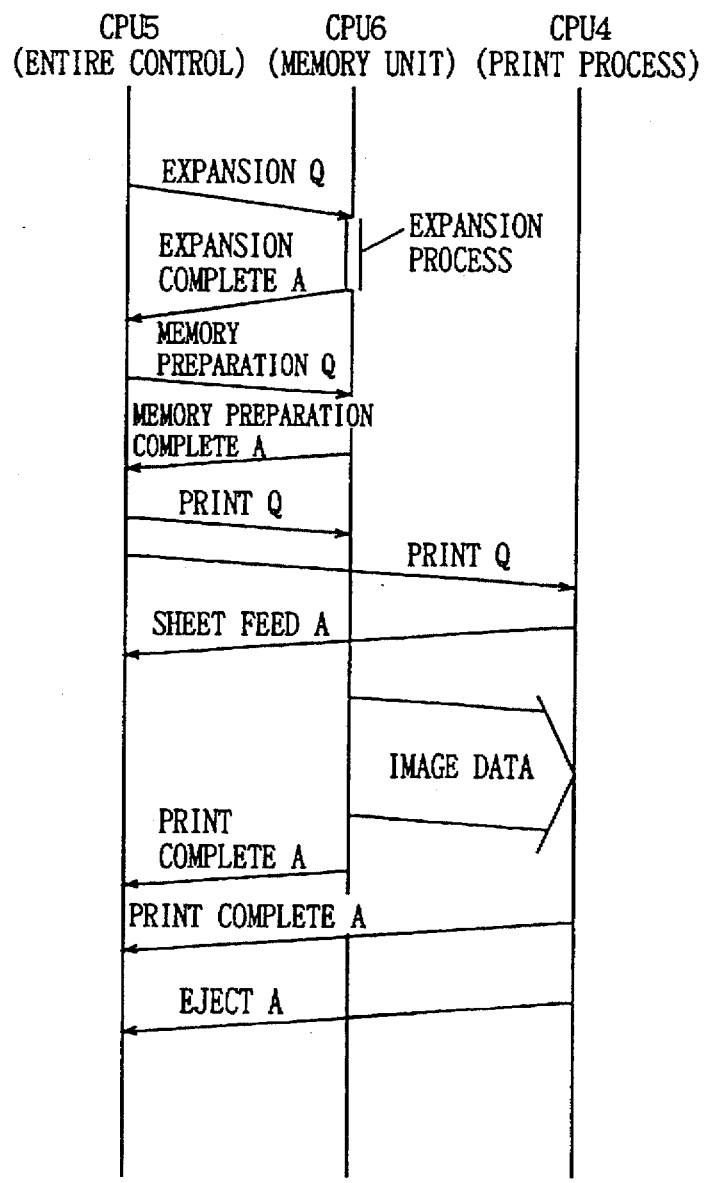
FIG. 9 shows a schematic sequence of a memory mode read out operation.

FIG. 9 shows the sequence of a memory mode read out operation. In this mode, image data is read out from image memory 304, whereby a copy image is printed out on a sheet according to the image data.

CPU 5 requests data expansion to CPU 6. CPU 6 sets the read out address from code memory 306, the data amount, the write address into image memory 304, the XY length information, and the mode of expander 312 (for example, the MH method) to actuate each component. An expand process is carried out, whereby image data is written into image memory 304.

When the expand process ends, CPU 5 requests a memory to be prepared to read out image data from image memory 304 to CPU 6. In response, CPU 6 carries out various settings with respect to the internal hardware such as setting the bus connection state for providing image data D3 from image memory 304 to print processing unit 40, the setting for a rotate process, the setting of the head address of the read out region of image memory 304, and the XY length information.

When these settings end and completion thereof is notified, CPU 5 requests print out to CPU 6 and CPU 4. A feed sheet report is sent from CPU 4 to CPU 5 to notify the sheet transportation state. Then, image data D3 read out from image memory 304 is output to print processing unit 40 for print out.

When the print operation ends, CPU 6 and CPU 4 send a print complete report and an inject complete report to CPU 5. When CPU 5 receives these reports, CPU 5 provides a memory clear request to CPU 6, if necessary.

Figure 10:
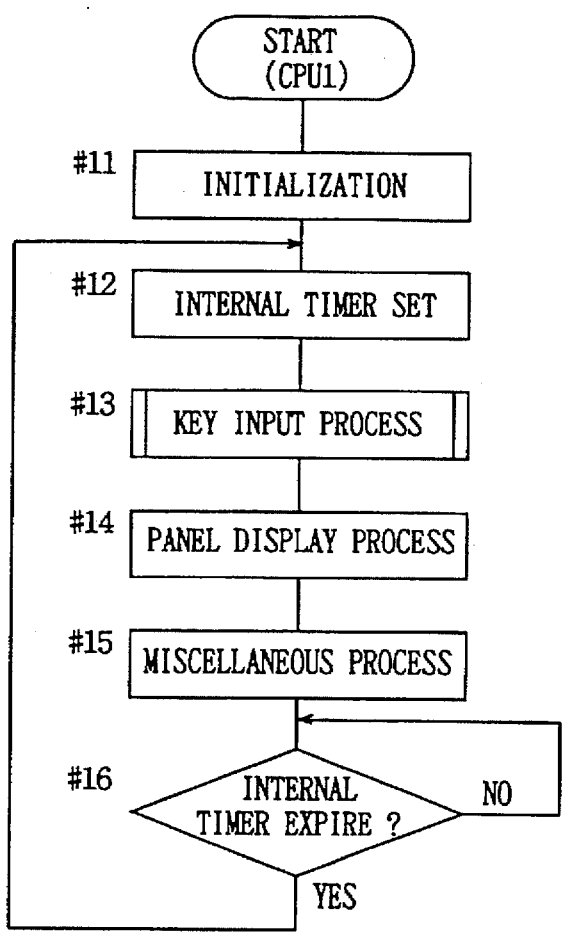
FIG. 10 is a main flow chart of a CPU for control of an operation panel.

The operation of copying apparatus 1 will be described in further detail according to the flow chart focusing on the control which is the feature of the present invention. FIG. 10 is a main flow chart of CPU 1 that provides control of operation panel OP.

When power is turned on, CPU 1 carries out initialization to initialize RAM121, the register and the like (#11). Then, the processes of setting the internal timer defining the length of one routine (#12), the key input process accepting key operations (#13), a panel display process for providing a display according to the operation (#14), miscellaneous process (#15), and detecting expiration of internal timer (#16) are repeatedly executed. Also, communication with another CPU as an interruption process is appropriately carried out.

Figure 11:
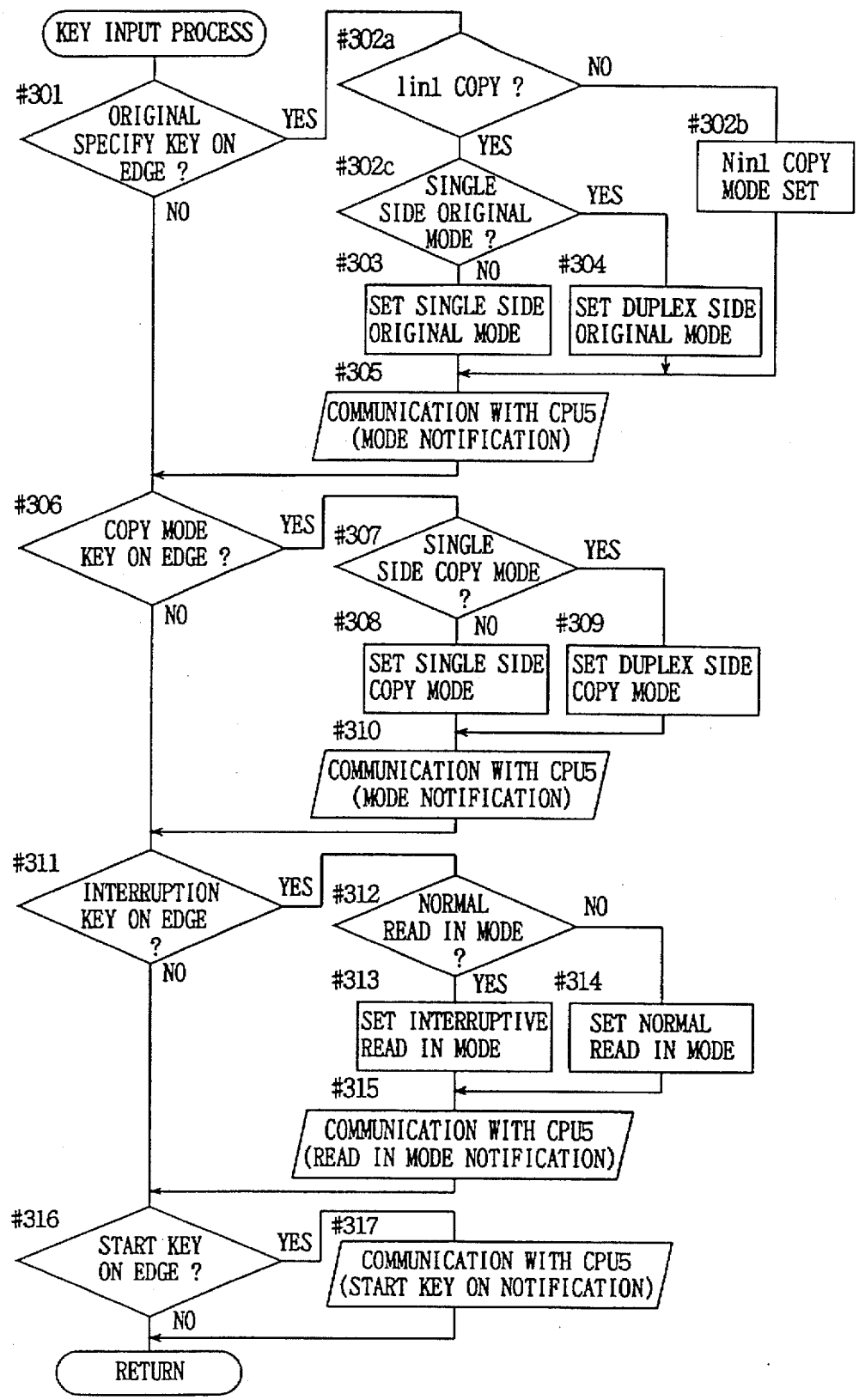
FIG. 11 is a flow chart of a key input process.

FIG. 11 is a flow chart of the key input process. CPU 1 responds to original specify key 97 (refer to FIG. 2) being turned on to switch among a single side original mode, a duplex side original mode, and an Nin1 copy mode according to the current original mode. Then, the switched mode is notified to CPU 5 (#301–#305).

Similarly, in response to copy mode key 101 being turned on, the copy mode is switched to a single side copy mode or a duplex side copy mode. In response to interruption key 101 being turned on, the read in mode is switched to an interruption mode or a normal read in mode, which is notified to CPU 5 (#306–#315). The switching-on of start key 96, when depressed, is notified to CPU 5 (#316, #317).

Figure 12:
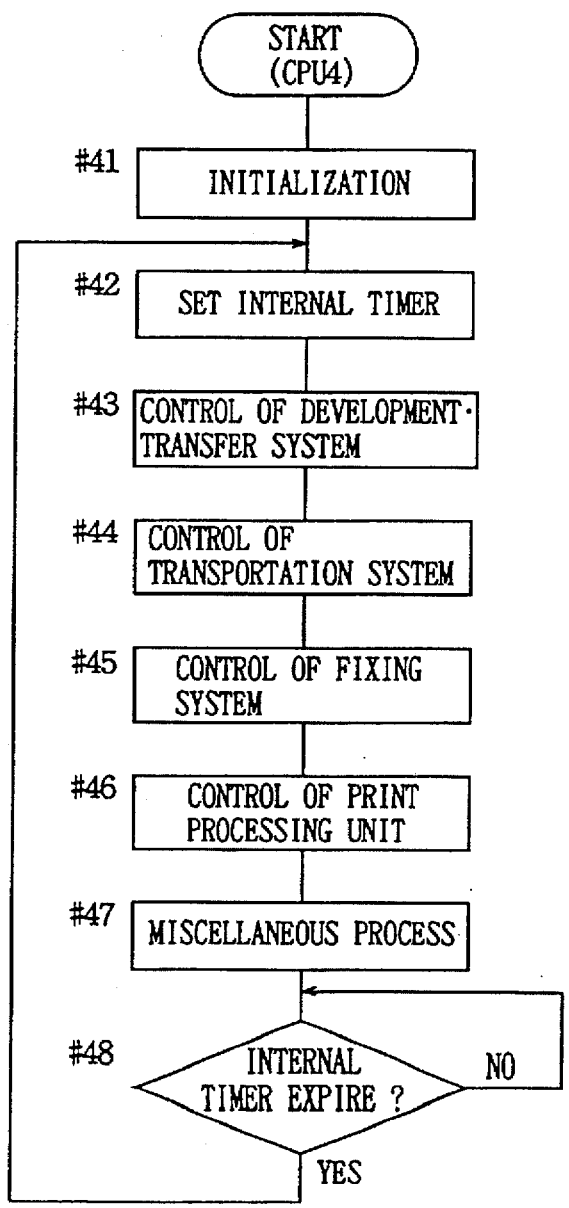
FIG. 12 is a main flow chart of the CPU for control of a page printer.

FIG. 12 is a main flow chart of CPU 4 allowing control of page printer PRT. CPU 4 effects initialization (#41), and then repeats the processes of setting the internal timer (#42), providing control of the develop transfer system (#43), providing control of the transportation system (#44), providing control of the fixing system (#45), providing control of the print processing unit (#46), effecting miscellaneous process (#47), and detecting expiration of the internal timer (#48).

Figure 13:
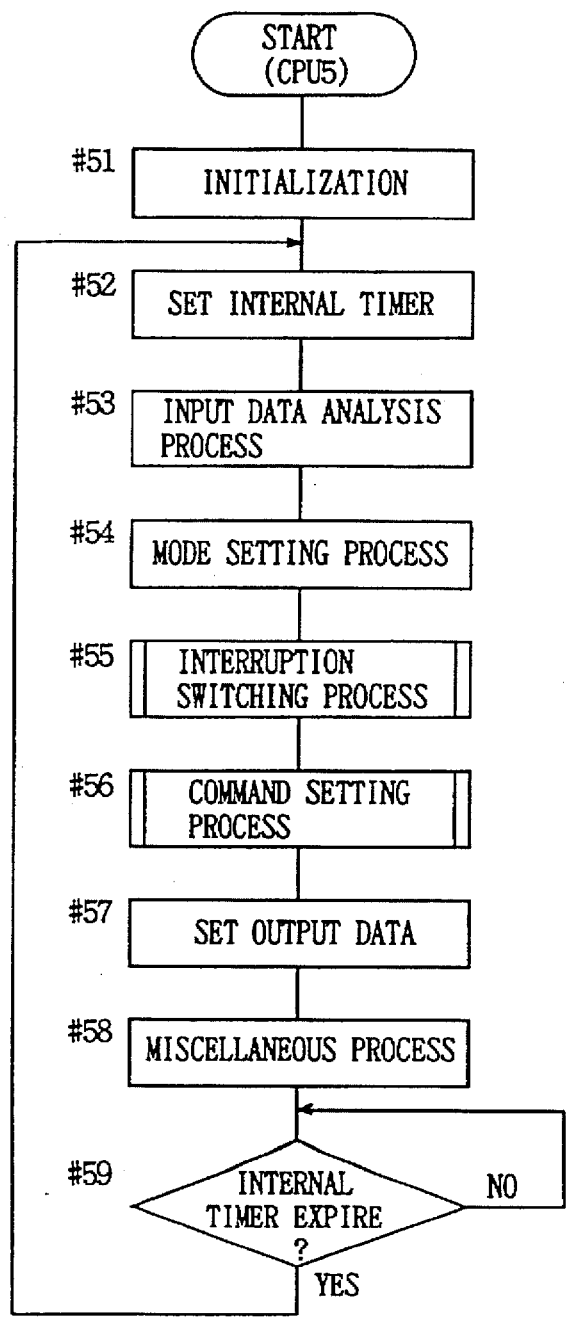
FIG. 13 is a main flow chart of the CPU for the total control of a copying apparatus.
Figure 14:
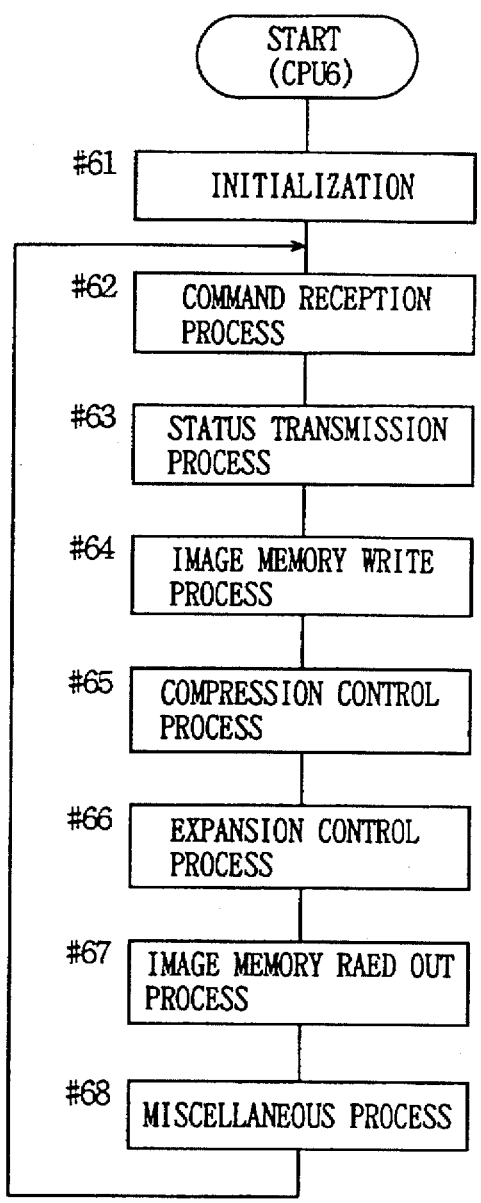
FIG. 14 is a main flow chart of the CPU for control of a memory unit.

FIG. 13 is a main flow chart of CPU 5 allowing overall control of copying apparatus 1. FIG. 14 is a main flow chart of CPU 6 allowing control of memory unit 30.

Following initialization (#51), CPU 5 repeatedly executes the process of setting the internal timer (#52), an input data analysis process for checking input data from another CPU (#53), a mode setting process for defining an operation mode according to key input (#54), an interruption switching process (#55), a command setting process according to the mode (#56), output data setting for placing a command at the communication port in a standby manner (#57), miscellaneous process (#58), and detection of expiration of the internal timer (#59).

Following initialization (#61), CPU 6 repeatedly executes a command reception process (#62), a status transmission process (#63), an image memory write process (#64) a compression control process (#65), an expansion control process (#66), an image memory real process (#67), and miscellaneous process (#68).

Figure 15:
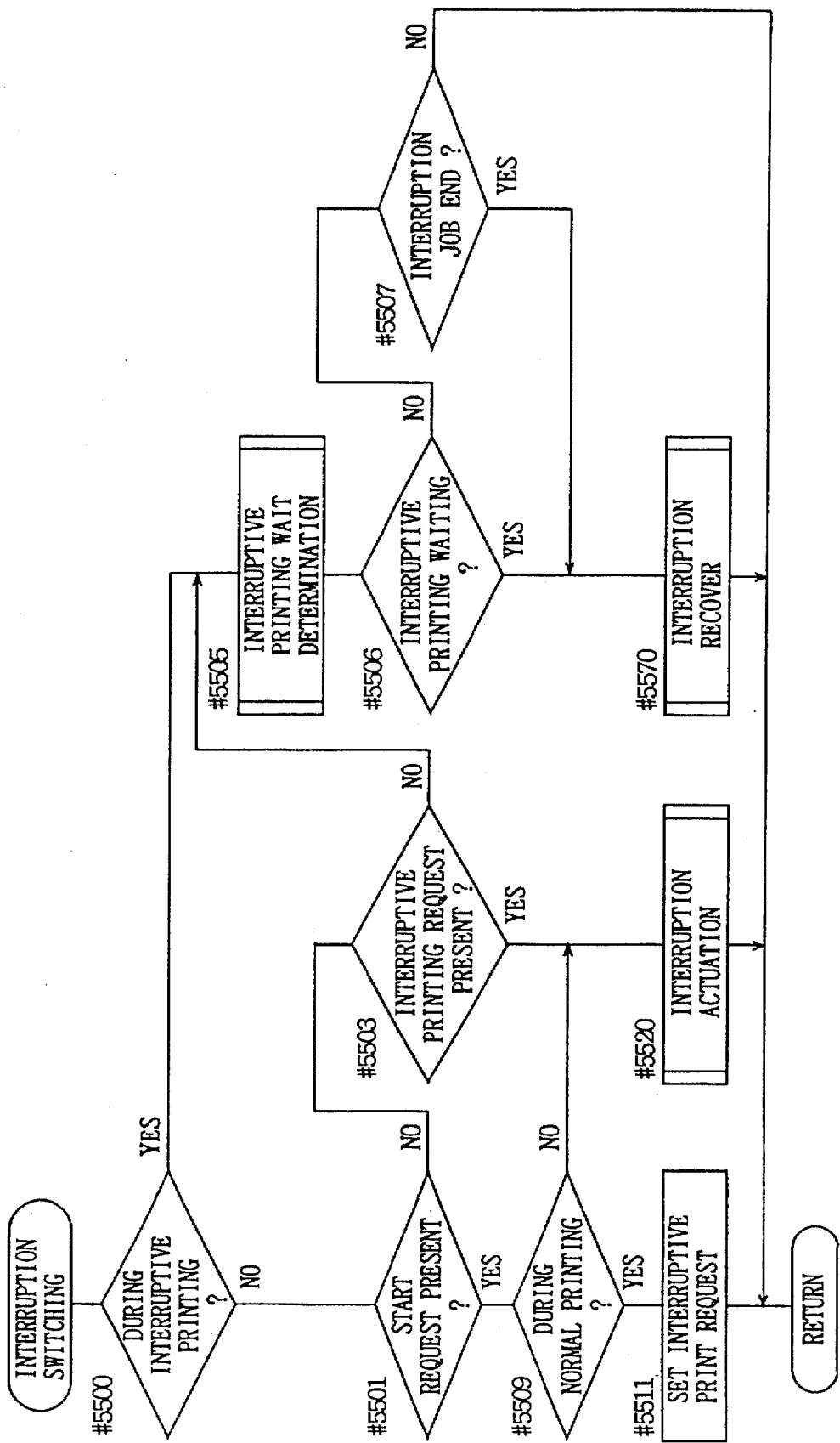
FIG. 15 is a flow chart of an interruption switching process.

FIG. 15 is a flow chart of the interruption switching process of FIG. 13. First, determination is made whether the current stage is an interruption print mode (#5500). If not during an interrupt printing operation, detection is made whether a start request is received from CPU 1 (#5501). When there is a start request, determination is made whether a normal print out operation is currently carried out or not (#5509). When during a normal print out operation, an interruptive print request is set to actuate an interruptive print out operation at an optimum timing according to the set mode of the interruption job (#5511).

When there is no start request, determination is made whether an interruptive print request is already set (#5503). If there is a request already, a subroutine of the interruption actuate process is called (#5520). Determination is made of an interruptive print waiting status when an interruptive print request is not set (#5505) to identify whether the current stage is at an interruptive print waiting status (#5506). In an interruptive print waiting status, the copying apparatus attains a state where the original is currently read in and data to be printed out is not yet ascertained, or where the interruption job cannot be printed out due to a paper empty error and the like. In order to switch back to a print out of a normal job, an interruption recover process subroutine is called (#5570). When not in an interruptive print waiting status, determination is made whether the interruption job has ended or not (#5507). If the job has ended, an interruption recover process is carried out to be automatically recovered from the interruptive status (#5570).

Figure 16:
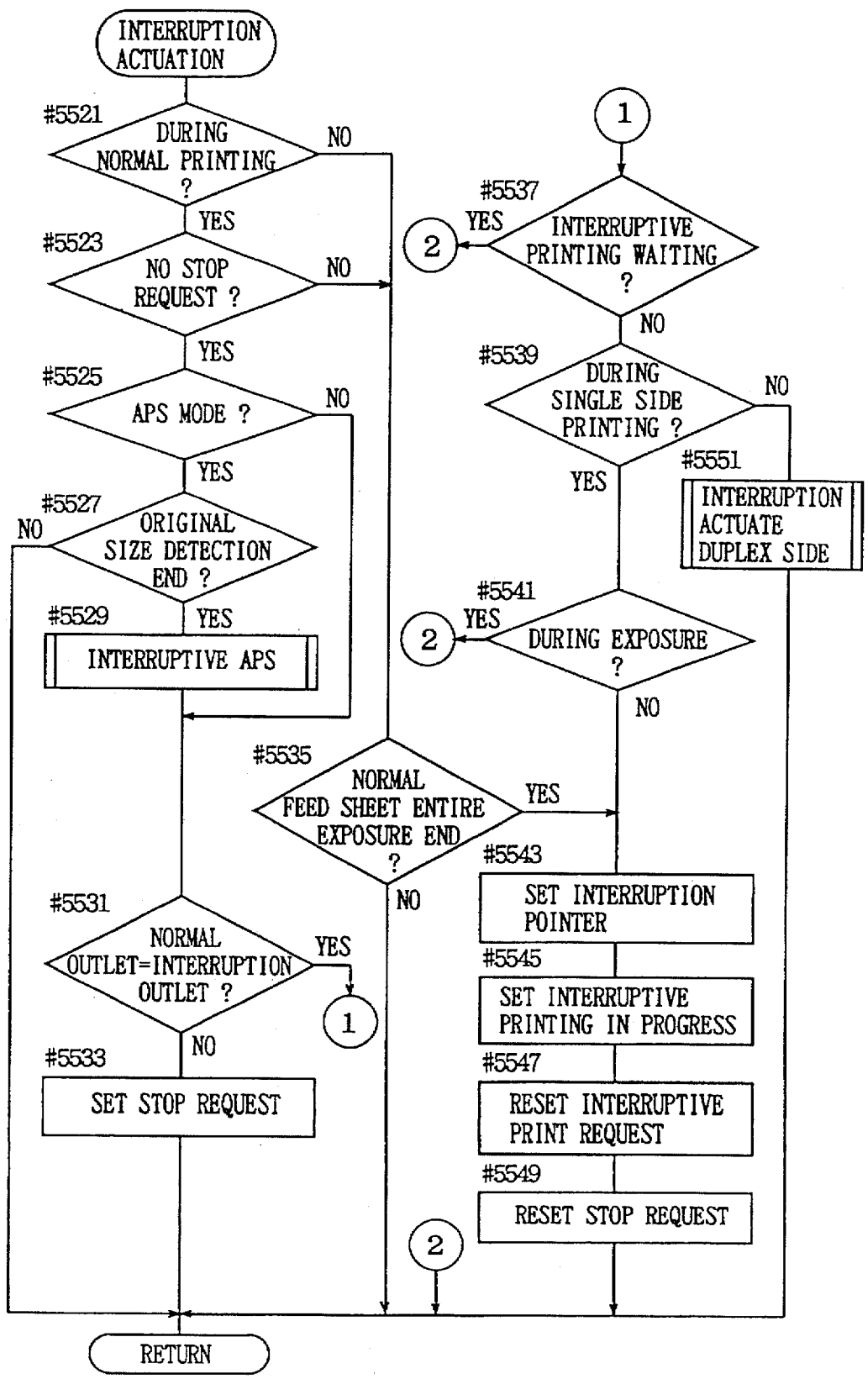
FIG. 16 is a flow chart of an interruption actuate process.

FIG. 16 is a flow chart of the interruption actuate process of FIG. 15. First, determination is made whether a normal print out operation is currently carried out (#5521). Then, determination is made whether a stop request is generated (#5523). If the above two conditions are established, the program proceeds to the determination of suppressing or continuing a normal job by the sheet feed setting mode of the interruption job.

If in an APS mode, determination is made whether the original size is detected or not. A sheet outlet detection process of the APS mode for the interruption job is carried out if original size detection is completed (#5525, 5527, 5529). If manual sheet feed outlet is specified, the sheet outlet of the current printing operation of the normal job is compared with the determined sheet outlet of the printing operation of the interruption job since the sheet outlet is already determined (#5531). If the outlet is not the same, a stop request is set since it is necessary to inhibit sheet feeding of the normal job immediately (#5533). If the outlet is the same, a process of transition to interruptive print out is effected while continuing sheet feeding of the normal job. Thus, when the sheet outlet selection mode at the interruption job mode setting is in an APS mode, printing of the normal job is continued while the original size of the interruption job is detected and the feed sheet outlet is ascertained, at which time point determination is made whether to continue the normal job or not.

Next, a description is provided of an interruptive print switching process when the sheet outlet in the normal job is identical to the sheet outlet of the interruption job. Determination is made whether the copying apparatus is in an interruptive print waiting status (#5537). This is similar to step #5505 of FIG. 15. If not in an interruptive print waiting status, determination is made whether the normal job is currently carrying out a single side print out or not (#5539).

If during single side printing, determination is made whether the exposure is currently carried out (#5541). Waiting is conducted for completion if during an exposure operation. If exposure is not currently carried out, the pointer for accessing reference table MT1 and code memory 306 in a memory read out mode is switched to an interruption pointer. This pointer is used to identify whether printing of a normal job or an interruption job is to be carried out. Then, "interruptive printing in progress" is set, followed by resetting the stop request (#5543–#5549.) If during a duplex copy print out, the subroutine of an interruption actuate process of duplex copy is called (#5551). At step #5535, the stop process end condition of the case when not during normal printing or when a stop request is generated is determined. If all the sheets of the normal feeding are not exposed, an ending process of the interruption switching process is carried out. Specific determination of whether all the sheets of the normal feeding sheet are exposed or not is carried out depending on the variables indicating the number of sheet feeding and exposures in the normal print out, i.e. whether PRNF and PRNF (M), and also PRNE and PRNE (M) are equal.

Figure 17:
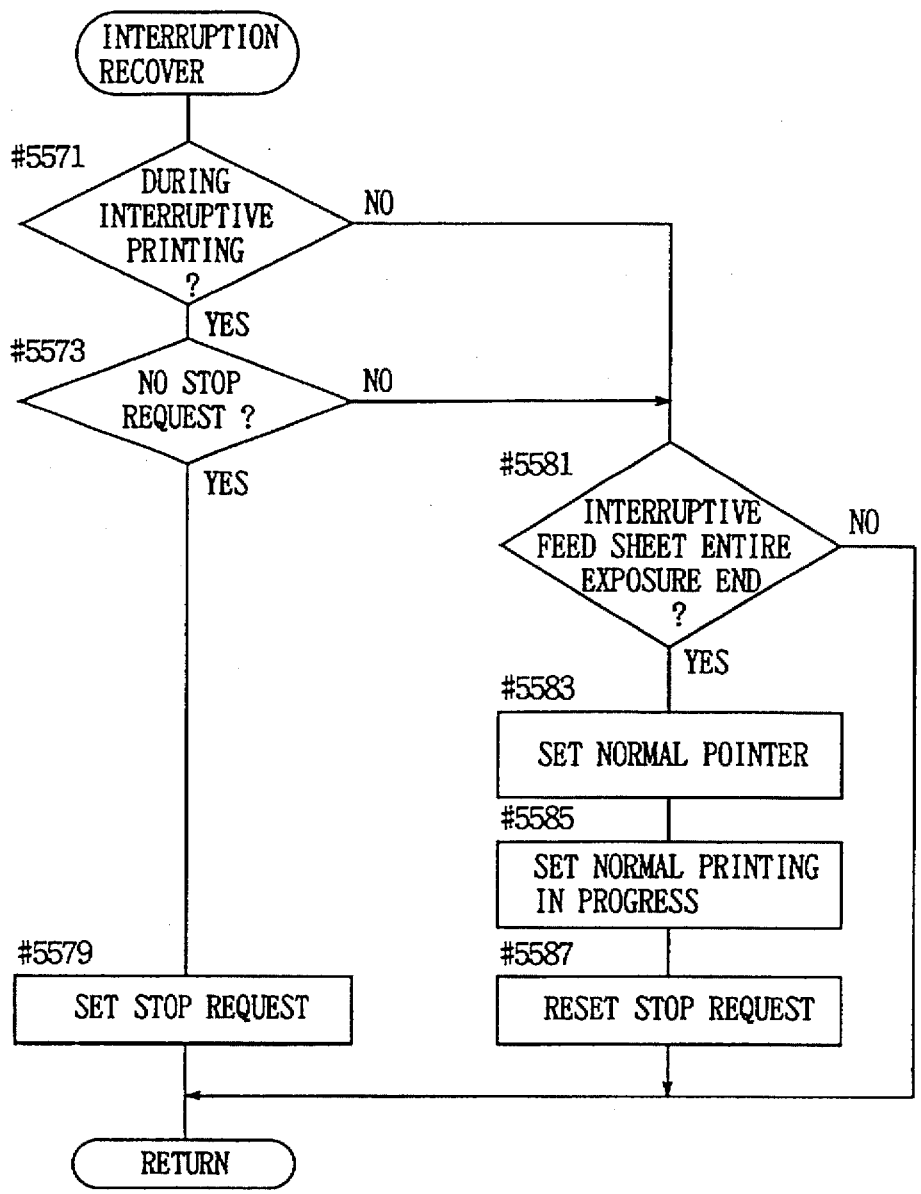
FIG. 17 is a flow chart of an interruption recovery process.

FIG. 17 is a flow chart of the interruption recover process of FIG. 15. First, determination is made whether an interruptive printing operation is currently carried out (#5571). Also, determination is made whether a stop request is generated (#5573). A stop request for interruption recover is set if the above two conditions are established (#5579). When not during interruptive printing or when a stop request is generated, determination is made whether all the interruptive fed sheets have been exposed or not (#5581). This determination is carried out depending on the variables indicating the number of sheet feeding and exposures in an interruptive printing, i.e. whether PRIF, PRIF (M) and PRIE, PRIE (M) are equal. This determination will be specifically described in FIGS. 22 et seq.

If the exposure has been completed, the pointer for accessing reference table MT1 and code memory 306 is switched to the normal pointer. "Normal printing in progress" is set, and the stop request is reset (#5583–#5587).

Figure 18:
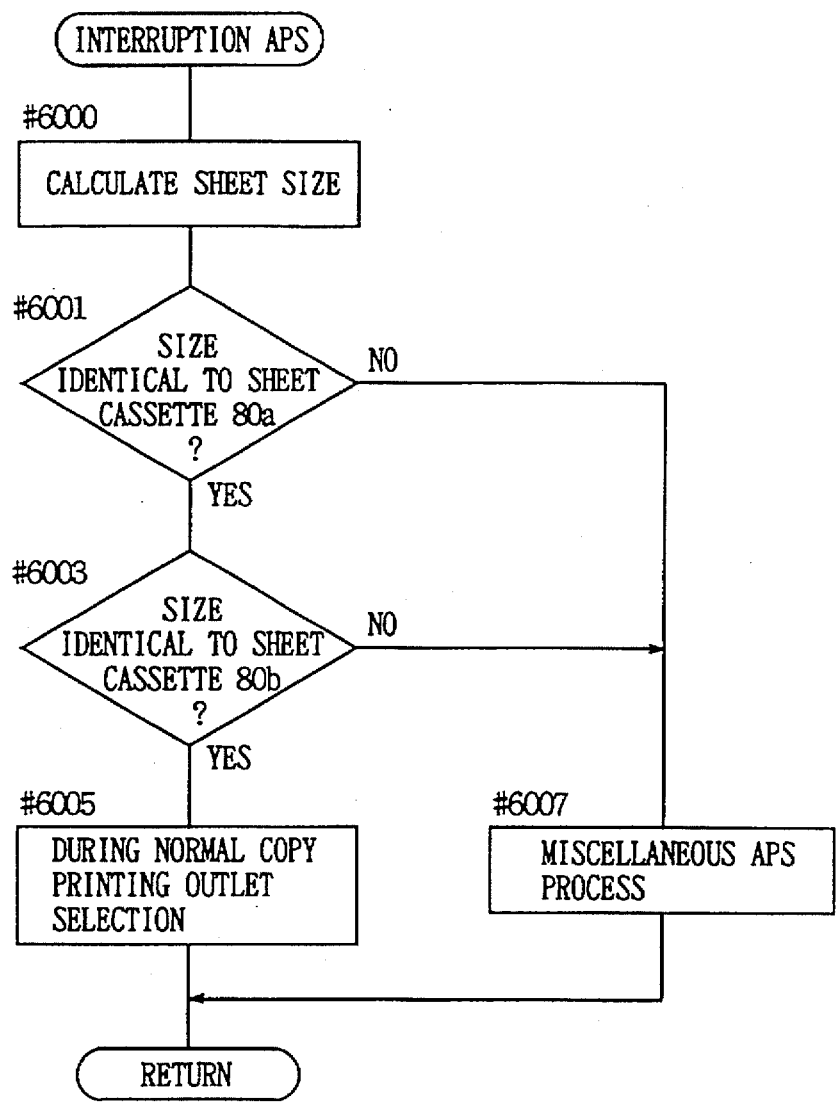
FIG. 18 is a flow chart of an interruption APS process.

FIG. 18 is a flow chart of the interruption APS sheet outlet selection process of FIG. 16. First, the sheet size is calculated taking into consideration the copy mode and magnification based upon the original size detected by image reader IR (#6000). If the calculated sheet size is equal to the size of both sheet cassettes 80a and 80b mounted in the main body, printout of the interruption job can immediately be initiated when the image of the interruption job is ascertained without interrupting print out of the normal job by forcefully selecting the sheet outlet of the current print out operation even if the preferential sheet outlet differs from the sheet outlet of the current printing operation (#6001–#6005). If the sheet size is not equal to that of the cassette, the miscellaneous APS process is carried out (#6007). Thus, in the sheet outlet selection based on the detected result of the original size in the APS mode, the preset priority level of sheet outlet selection is altered if necessary when there are at least two sheet outlets of the sheet size to be selected.

Figure 19:
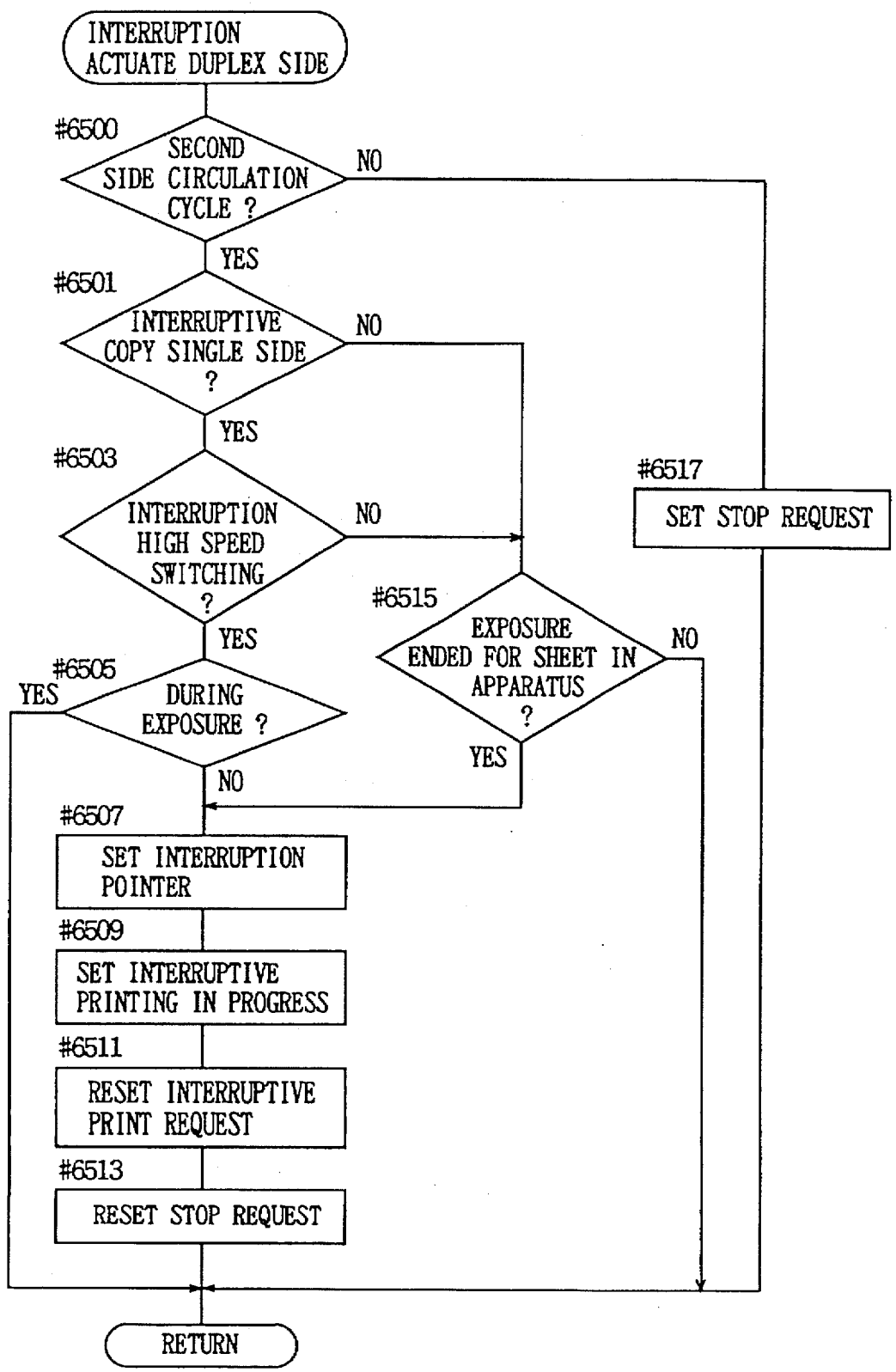
FIG. 19 is a flow chart of an interruption actuate duplex process.

FIG. 19 is a flow chart of the interruption actuate dual side process of FIG. 16. First, determination is made whether the status of the print processing unit of the current printing operation is in the circulation cycle of the second side (#6500). If in the circulation cycle of the second side, determination is made whether the interruption job is a single side copy operation or not (#6501). Also, determination is made whether the switching to the interruption job is of the high speed mode or not (#6503). This is registered by the operator in advance via the operation panel OP of the user's choice setting. This high speed setting is provided to activate single side printing of the interruption job as quickly as possible under the condition that an unrequired image may be present at the backside of the copy sheet even during duplex copy printing in the normal job, for example.

If the above two conditions are established, determination is made whether exposure is currently carried out (#6505). If not during an exposure process, a process similar to the steps of #5543–#5549 of FIG. 16 is carried out (#6507–#6513). If the above two conditions are not established, waiting is conducted for exposure of all the sheets to be exposed, followed by the ending process of the interruption actuate process. If the process is not in the circulation cycle of the second side, only a stop request to suppress sheet feeding is set (#6517).

In the case where the sheet outlet used in the interruption job is identical to the sheet outlet used in the normal job, sheet feeding of the normal job is continued if the normal job is a duplex side copy and the interruption job is a single side copy. Even if the copying apparatus, at the time point when the print data of an interruption job is ascertained, attains a state where a sheet of a duplex copy is refed for an image of the second side to be output after the first side of the duplex copy is printed out in a normal job, image data of the interruption job is printed out on the second face, and the mode is switched to a single side copy mode when refeeding is completed.

Figure 20:
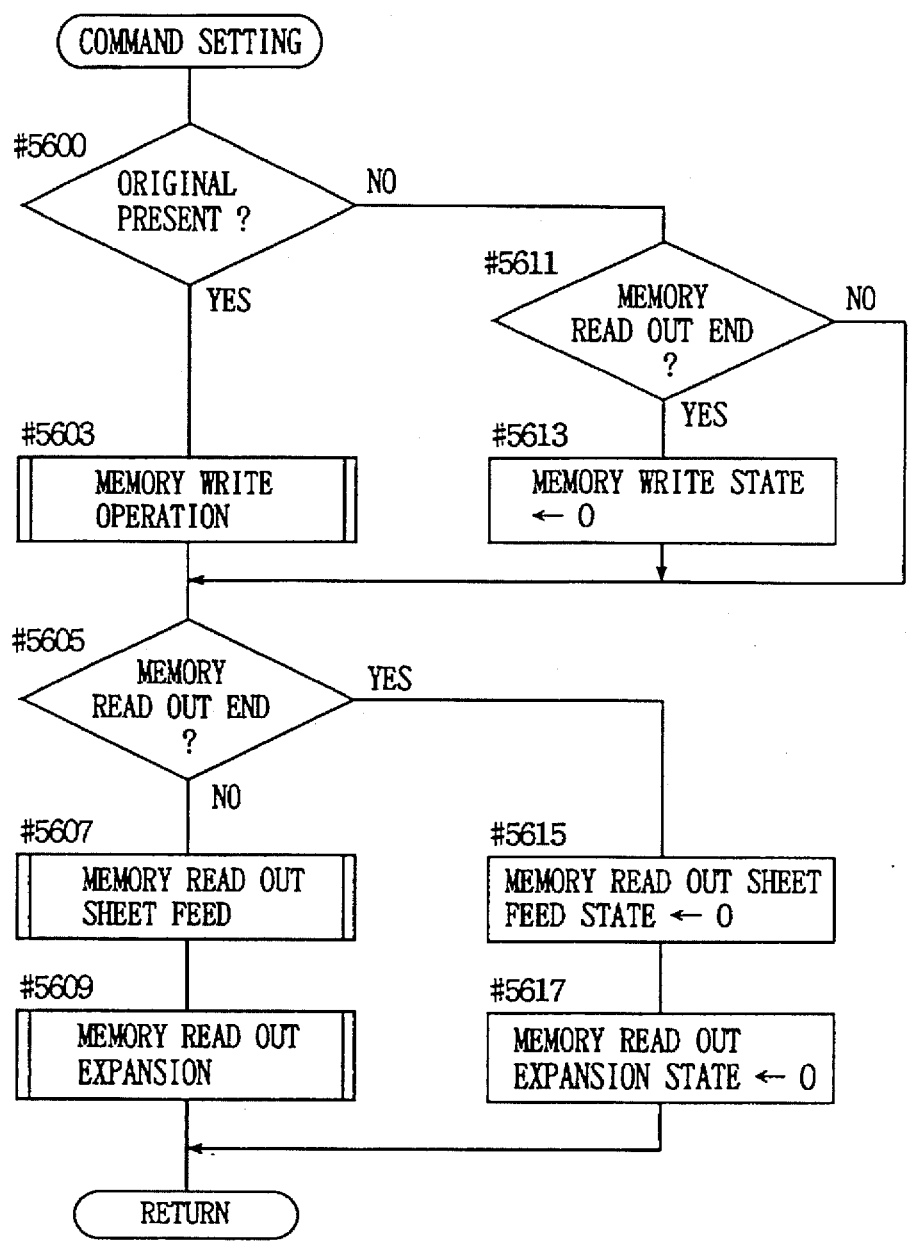
FIG. 20 is a flow chart of a command setting process.

FIG. 20 is a flow chart of the command setting process of FIG. 13. First, determination is made whether there is an original to be read out (#5600). If there is an original, a process for the above-described memory write operation is carried out (#5603). When there is no original, determination is made whether the read in original has been read out for a predetermined number of times according to the copy mode (#5611). If read out is completed, the memory write state is initialized (#5613).

If the memory read out process has not ended (#5605), the subroutines for memory read out sheet feeding for the above-described memory read out process and the memory read out expansion process are called (#5607, #5609). If the memory read out process has ended, the memory read out sheet feed state and memory read out expansion state are initialized (#5615, #5617).

Figure 21:
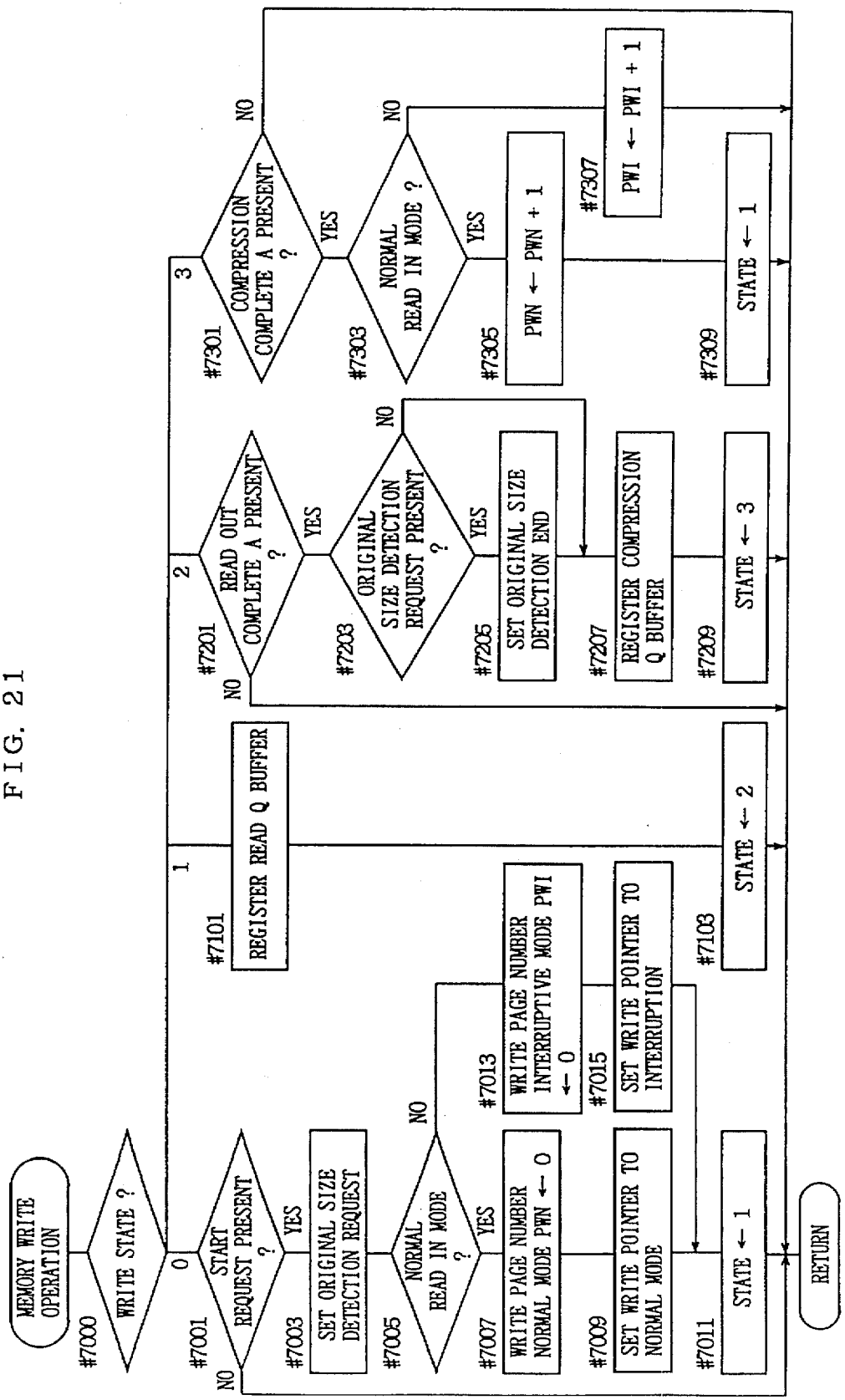
FIG. 21 is a flow chart of a memory write operation.

FIG. 21 is a flow chart of the memory write operation process of FIG. 20. First, the write state is identified (#7000) to carry out processes set forth in the following according to each of the states (states 0–3). In state 0, determination is made whether there is a start request in response to start key 96 being turned on (#7001). If there is a start request, the original size detection request is set (#7003). Determination is made whether in a normal read in mode according to the setting of the current operation panel OP (#7005). If in a normal read in mode, the write page variable PWN of the normal read in mode is initialized. In a memory write mode, the write pointer for accessing reference table MT1 and code memory 306 is set to a pointer for normal mode (#7007, #7009). If not in a normal read in mode, an interruption mode similar to that described above is carried out (#7013, #7015). Then, the state proceeds to 1 (#7011).

In state 1, the read command is registered in the command-dedicated buffer (#5511). A command-dedicated buffer (Q buffer) is prepared in advance for each command. Each command is transferred from the Q buffer to the communication port in the above-described output data setting (#57 in FIG. 13). Then, the state proceeds to 2.

In state 2, reception of a read out complete report (read out completion A) from CPU 6 and CPU 2 causes the original size detection and to be set only when there is an original size detection request. This is required for the APS sheet outlet select process of the interruption actuation. Then, the compression Q buffer is registered, and the states proceeds to 3 (#7201–#7209).

At state 3, reception of a compression complete report (compression completion A) from a CPU causes variable PWN indicating the number of written pages in a normal read in mode is incremented if in a normal read in mode. If in an interruption read in mode, variable PWI indicating the number of written pages in the interruption mode is incremented. Then, the state is returned to 1 (#7301–#7309).

Figure 22:
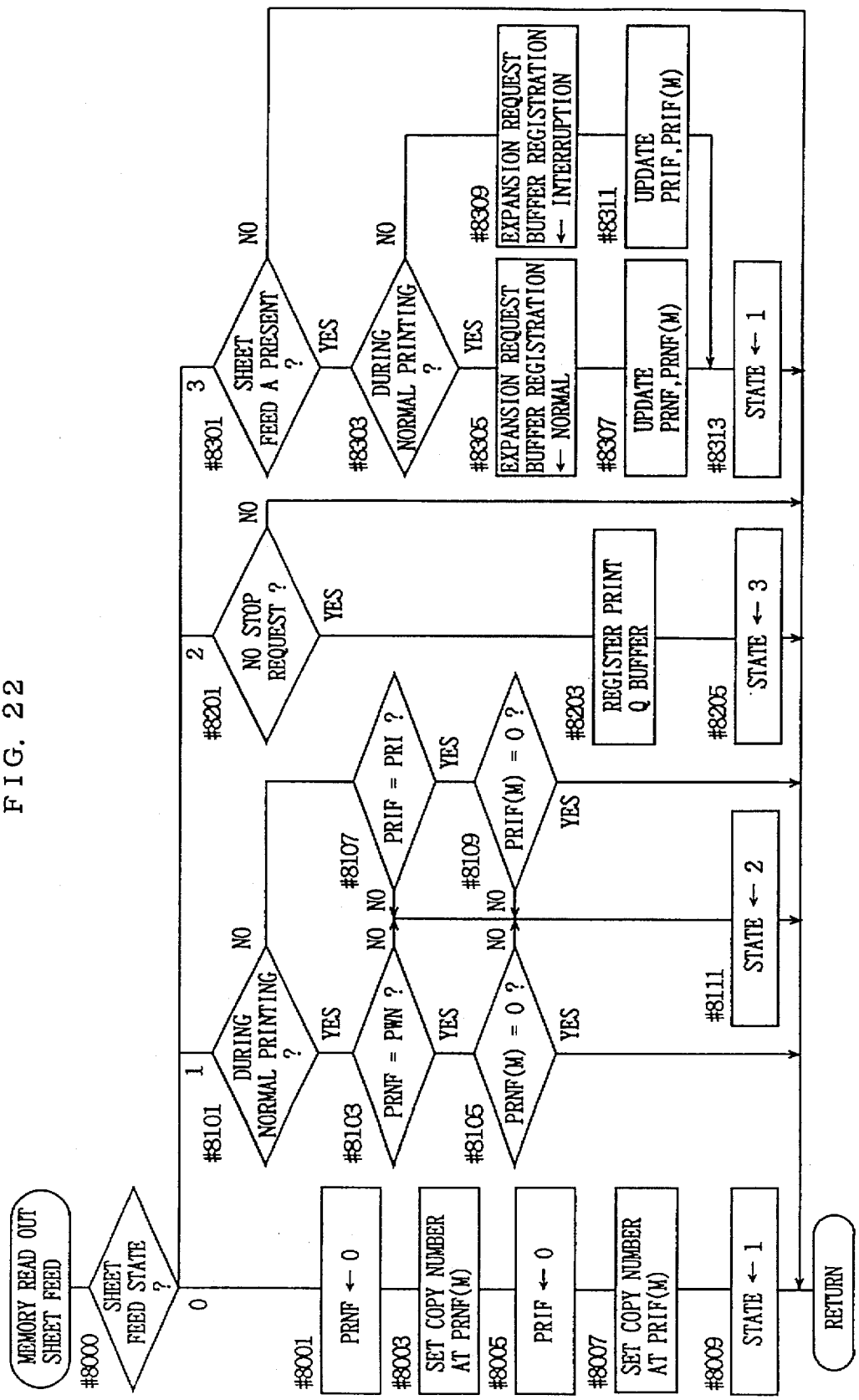
FIG. 22 is a flow chart of a memory read out feed operation.

FIG. 22 is a flow chart of the memory read out feed sheet process of FIG. 20. Similarly, the read out sheet feed state is identified (#8000) to carry out processes set forth in the following according to the state (states 0–3).

At state 0, the values of variable PRNF indicating the number of fed sheets in print out of the normal job, variable PRNF (M) indicating the number of copies; set by the operator to print for the normal job, variable PRIF indicating the number of fed sheets in printing for an interruption job, and variable PRIF (M) indicating the number of copies set by the operator to print for an interruption job are initialized. Variables PRNF (M) and PRIF (M) are decremented by 1 for every completion of sheet feeding required for printing out a group of original image data (PWN or PWI). A value of 0 for these variables indicates that the required number of sheet feeding for the relevant page is completed. Then, the state proceeds to 1 (#8001–#8009).

At state 1, determination is made whether printing is currently carried out for a normal job or printing for an interruption job (#8101). If during normal printing, determination is made whether a predetermined number of sheet feeding and print out of the number of copies set by the operator are completed or not with respect to the values of PRNF, PRNF (M) (#8103, #8105). If not in a normal printing job, a similar process for the values of PRIF, PRIF (M) is carried out (#8107, #8109). If sheet feeding is not completed, the state proceeds to 2 (#8111).

At state 2, determination is made whether a stop request is set in the aforementioned interruption actuation and recover routine (#8201). If not set, a print Q buffer is registered to feed one sheet. Then, the state proceeds to 3 (#8205). When a stop request is set, waiting is conducted for sheet feeding without newly feeding a sheet.

At state 3, determination is made whether a sheet feed report (sheet feed A) indicating sheet feeding is received in response to a print request (#8301). When the report is received, determination is made whether printing of a normal job is currently carried out (#8303). If during normal printing, data indicating normal sheet feed is registered in the expansion request buffer (#8305). Then, the values of PRNF and PRNF (M) are updated (#8307). In practice, PRNF is incremented by 1, and if PRNF is not equal to PWN, PRNF (M) is decremented by 1. If not during print out of a normal job, a process as described above is carried out for the print data of the interruption job (#8309, #8011). Then, the state returns to 1 (#8313). When sheet feed report is not received, waiting is conducted until the report is received.

Figure 23:
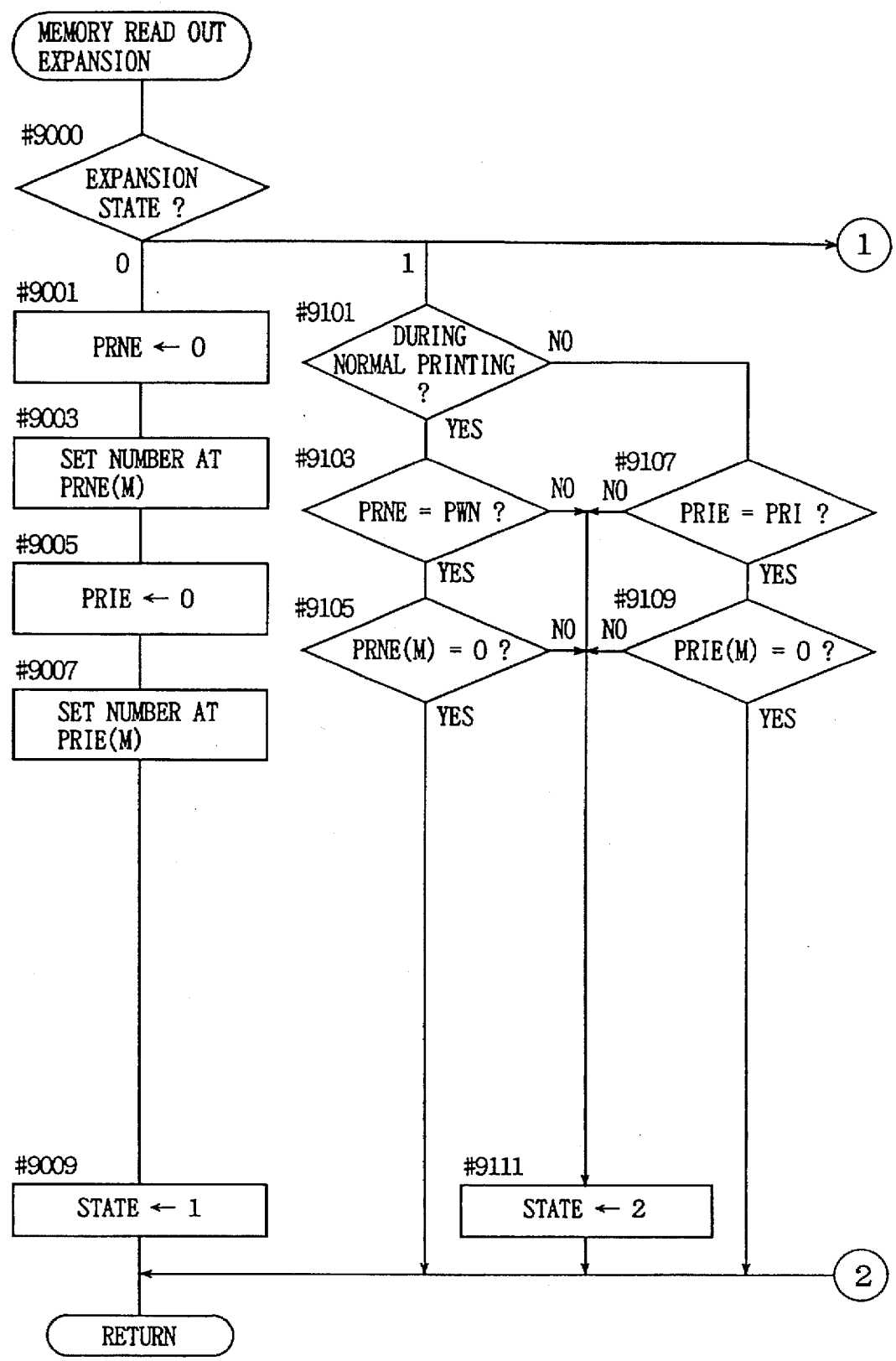
FIGS. 23 and 24 are flow charts of a memory read out expansion process.
Figure 24:
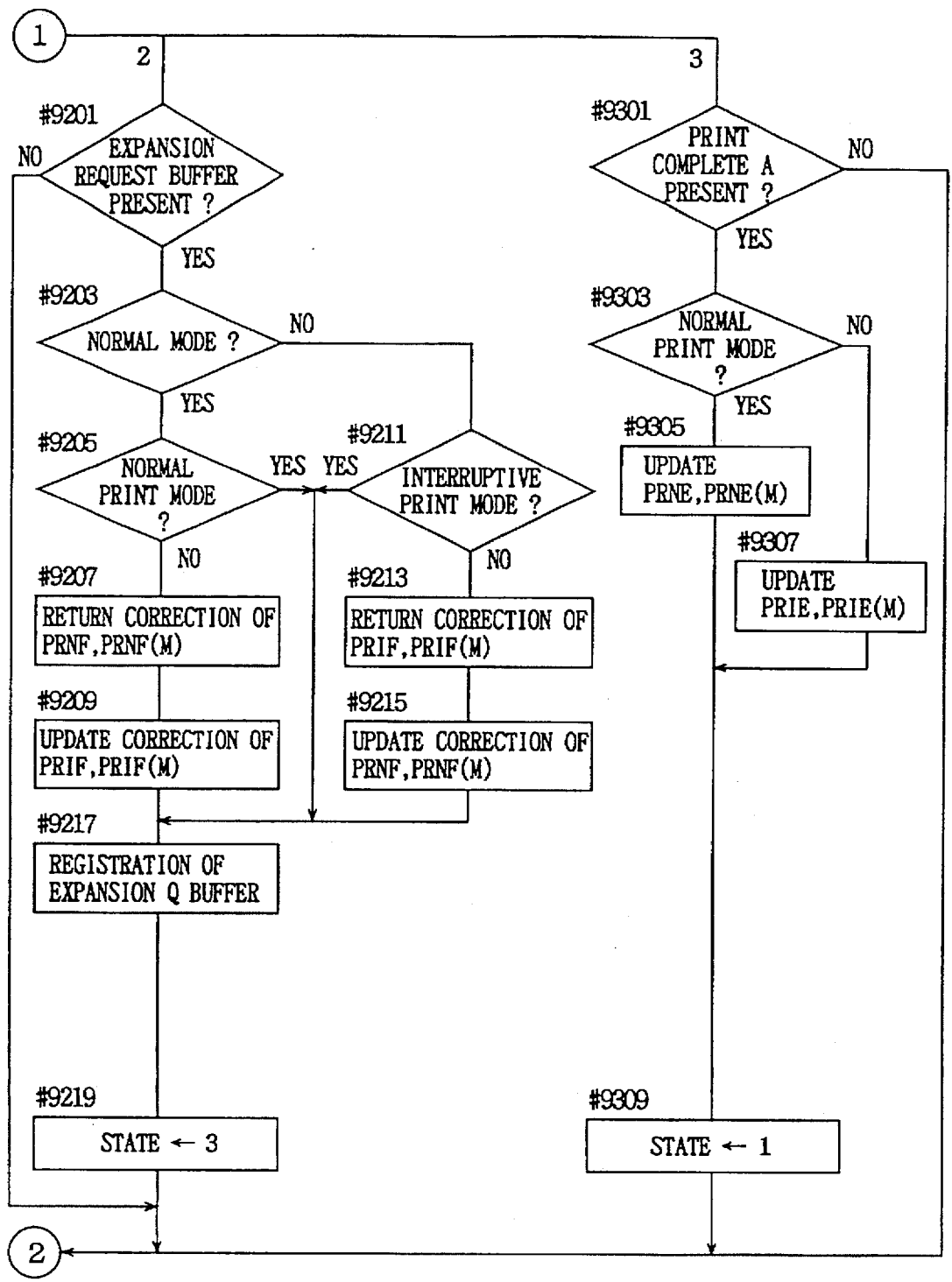

FIGS. 23 and 24 show the flow chart of the memory read out expansion process of FIG. 20. First, the read out expansion state is identified (#9000) to carry out processes set forth in the following according to the state (state 0–3). At state 0, the values of variable PRNE indicating the number of expansions (exposures) in printing for a normal job, variable PRNE (M) indicating the number of copies set by the operator in printing for a normal job, variable PRIE indicating the number of expansions (exposures) in printing for an interruption job, and variable PRIE (M) indicating the number of copies set by the operator in printing for an interruption job are initialized. Variables PRNE (M) and PRIE (M) are decremented by 1 every time the image data of the same one page is expanded (exposed). A value of 0 thereof indicates that exposure for the required number of sheets of the relevant page is completed. Then, the state proceeds to 1 (#9001–#9009), At state 1, determination is made whether the process is in printing for a normal job or for an interruption job (#9101). If normal printing is currently carried out, determination is made whether the expansion number of times is carried out for the predetermined number of times and whether expansion for the number of copies set by the operator has ended or not as to the values of PRNE and PRNE (M) (#9103, #9105). If not during normal printing, a similar process is carried out as to the values of PRIE and PRIE (M) (#9107, #9109). If the entire expansion has not yet ended, the state proceeds to 2 (#9111).

At state 2, determination is made whether data is present in the expansion request buffer set at the memory read out sheet feed process (#9201). If there is data, determination is made whether the buffer data corresponds to sheet feed of a normal mode or of an interruption mode (#9203). If of a normal mode, determination is made whether the current print mode is actually the normal print mode (#9205). If not in the normal print mode, determination is made that the normal mode at the time of sheet feed with the sheet outlet identical for both the normal and interruption jobs has been switched to the interruption mode at the time of exposure. Therefore, a process opposite to the process executed at step #8307 of the memory read out sheet feed process is carried out for sheet feed variables PRNF and PRNF (M) of the normal mode (PRNF is decremented by 1; if PRNF becomes 0, PRNF (M) is incremented by (1) (#9207).

In the case of a duplex copy mode for a normal copy operation, determination is made that the mode has been switched to interruption printing during the circulation cycle of the second side. Here, a process opposite to the process executed at step #8307 is carried out again.

By virtue of this process, the page that was forced to have the second side printed in the interruption job can be corrected to be printed out again when the mode is recovered to the normal job.

An update date process similar to that of step #8311 for the memory read out sheet feed process is carried out for sheet feed variables PRIF and PRIF (M) of the interruption mode (#9209).

The aforementioned correction process is not necessary when determination is made of a normal printing mode at step #9205. When determination is made that the read out data is of the interruption mode at step #9203, determination is made whether the current print mode is really the interruption print mode (#9211). If not in an interruption print mode, determination is made that the printing has been switched from the interruption mode to the normal mode. A similar restore correction (#923) for the sheet feed of the interruption mode, and a similar update correction for sheet feed of the normal mode (#9215) are carried out. An expansion Q buffer is registered for activating expansion. Then, the state proceeds to 3 (#9219).

At state 3, determination is made whether a print complete report (print completion A) is received (#9301). If the report is received, determination is made whether the process is of a normal print mode (#9303). If in a normal print mode, PRNE and PRNE (M) are updated. In practice, PRNE is incremented by 1. If PRNE is not equal to PWN, PRNE (M) is decremented by 1 (#9305). If not of a normal print mode, a similar process is carried out for expansion data of the interruption mode. Then, the state returns to 1 (#9309). When a print complete report is not received, waiting is conducted until the report is received.

When the normal copy mode is in a duplex copy mode, determination is made that the mode has switched to interruption printing during the recirculation cycle of the second side. Here, a process opposite to the process executed at step #8307 is carried out again. By virtue of this process, the page that forcefully had the second side printed out during the interruption job can be corrected to be printed out again when returned to the normal job.

Figure 25:
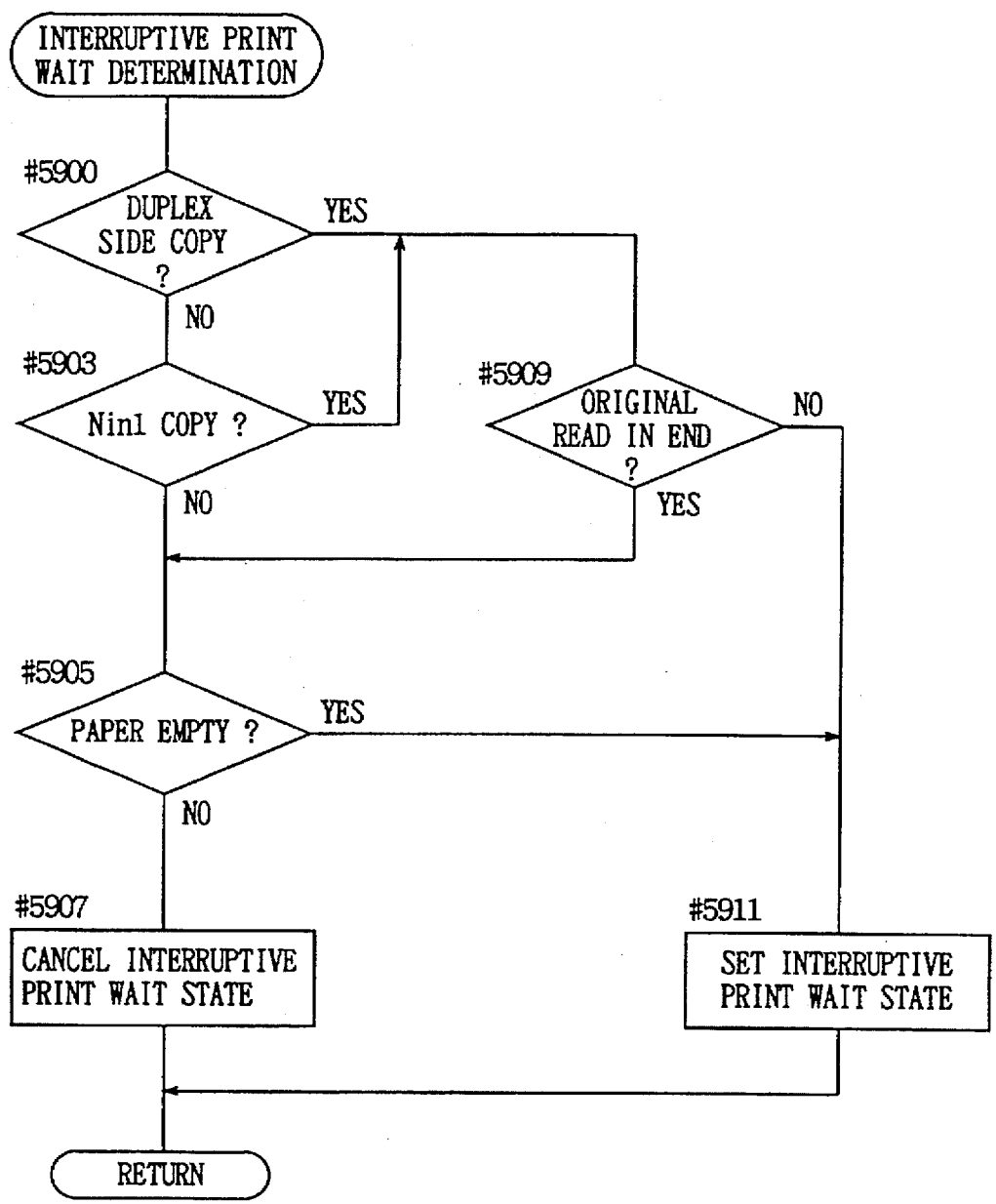
FIG. 25 is a flow chart of an interruption print wait determination process.

The interruption print waiting determination routine of #5505 in FIG. 15 will be described hereinafter with reference to FIG. 25. At step #5900, determination is made whether the process is of a duplex side copy. At step #5903, determination is made whether the mode is a Nin1 copy mode. If either one of the conditions is established, determination is made whether the original read in process has ended at step #5909. In the present embodiment, the number of originals cannot be identified until all the originals are read in in a duplex copy operation or in an Nin1 copy operation since original reading is carried out from the last page. An interruption print waiting state is provided until completely reading in all originals since the print out side and position of the original first read out are not ascertained (#5911).

At step #5905, determination is made whether the sheet outlet of the interruption job is empty or not. In the case of "paper empty", a similar process at step #5911 is carried out. If determination is made that the paper is not empty at step #5905, printing of an interruption job is allowed. Therefore, the interruption print wait state is canceled.

Figure 26:
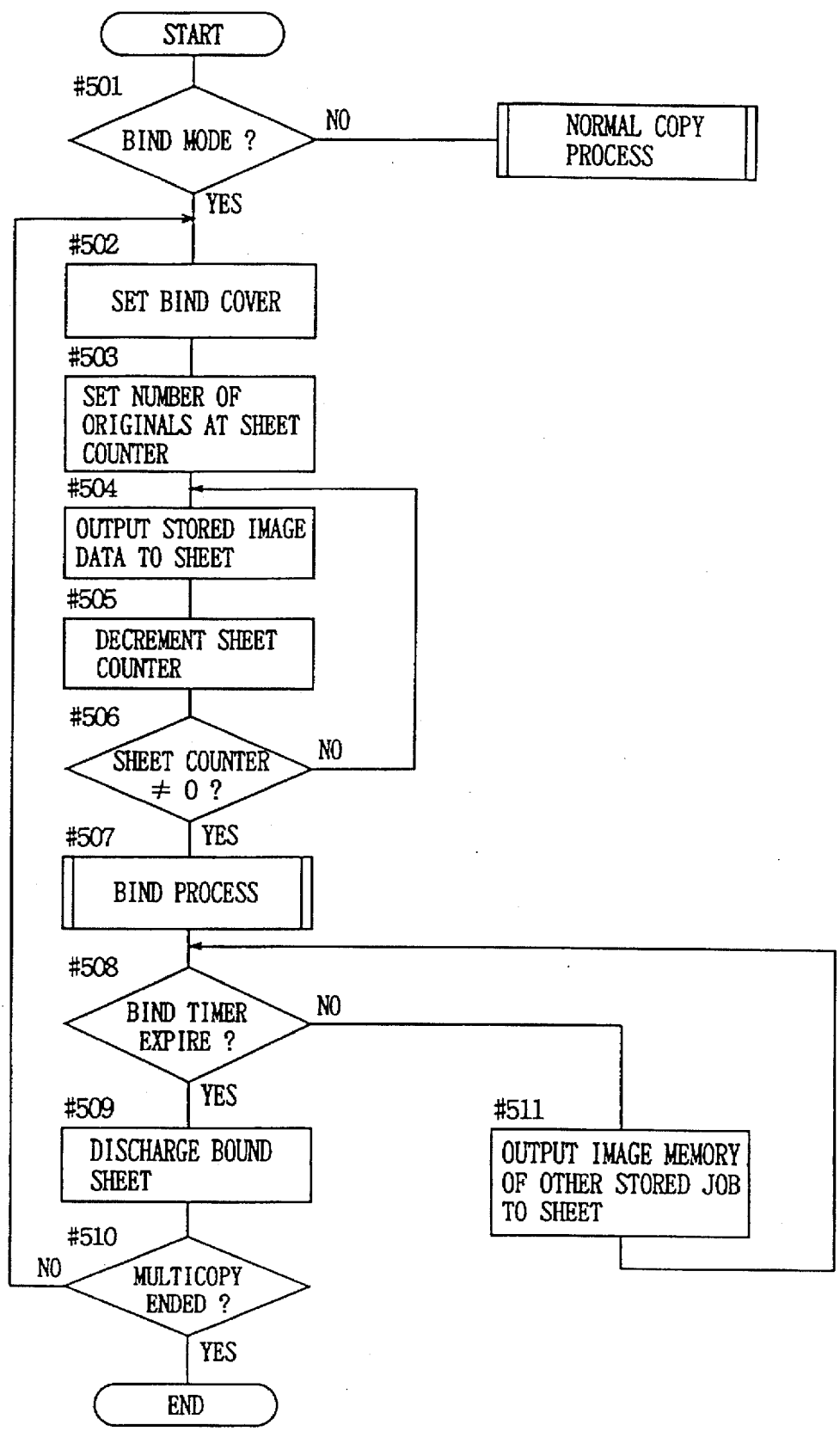
FIG. 26 is a flow chart showing the process of a bind mode.

FIG. 26 is a flow chart showing the operation contents of a bind mode as a finishing process carried out by CPU 5. Referring to FIG. 26, determination is made whether a bind mode is specified (#501). Upon commencement of copying in a bind mode, one sheet of a bind cover is set in the accommodation tray (#502). Then, image data in the memory is output for every one page for print out (#503, #504, #505). When one set of copy is completed (#506) and the sheets are accommodated in the tray, a binding process is initiated (#507).

When determination is made that the binding process is not completed by monitoring the bind timer, image data in the memory other than those of a bind job, if any, which is another reserved job, is printed out to be discharged to another tray (#508, #511). When the bind timer expires, the binded sheets are discharged (#508, #510). In the case of a multicopy mode of the binding mode, determination is made whether the multicopy has been completed (#510). If NO at #510, the program is reinitiated from #502.

Figure 27:
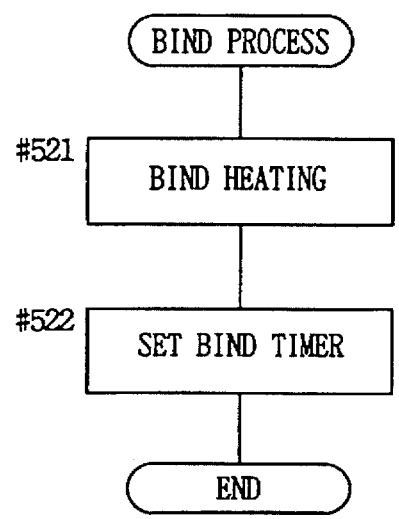
FIG. 27 is a flow chart showing the contents of a bind process.

FIG. 27 is a flow chart showing the contents of the binder process of #507. When the bind process is called, the binder heating plate is heated to initiate binding (#521). The bind timer is actuated when this binding is initiated (#522). This bind timer is decremented at the interruption process.

Another embodiment of the present invention will be described hereinafter. According to the present embodiment, copying apparatus 2 is connected to a personal computer and a FAX controller to allow print out of input information other than from image reader IR via page printer PRT. In the present embodiment, copying apparatus 2 is provided with 4 sheet cassettes as will be described afterwards, not two cassettes as in FIG. 1. It is also to be noted that a binder unit is not provided.

Figure 28:
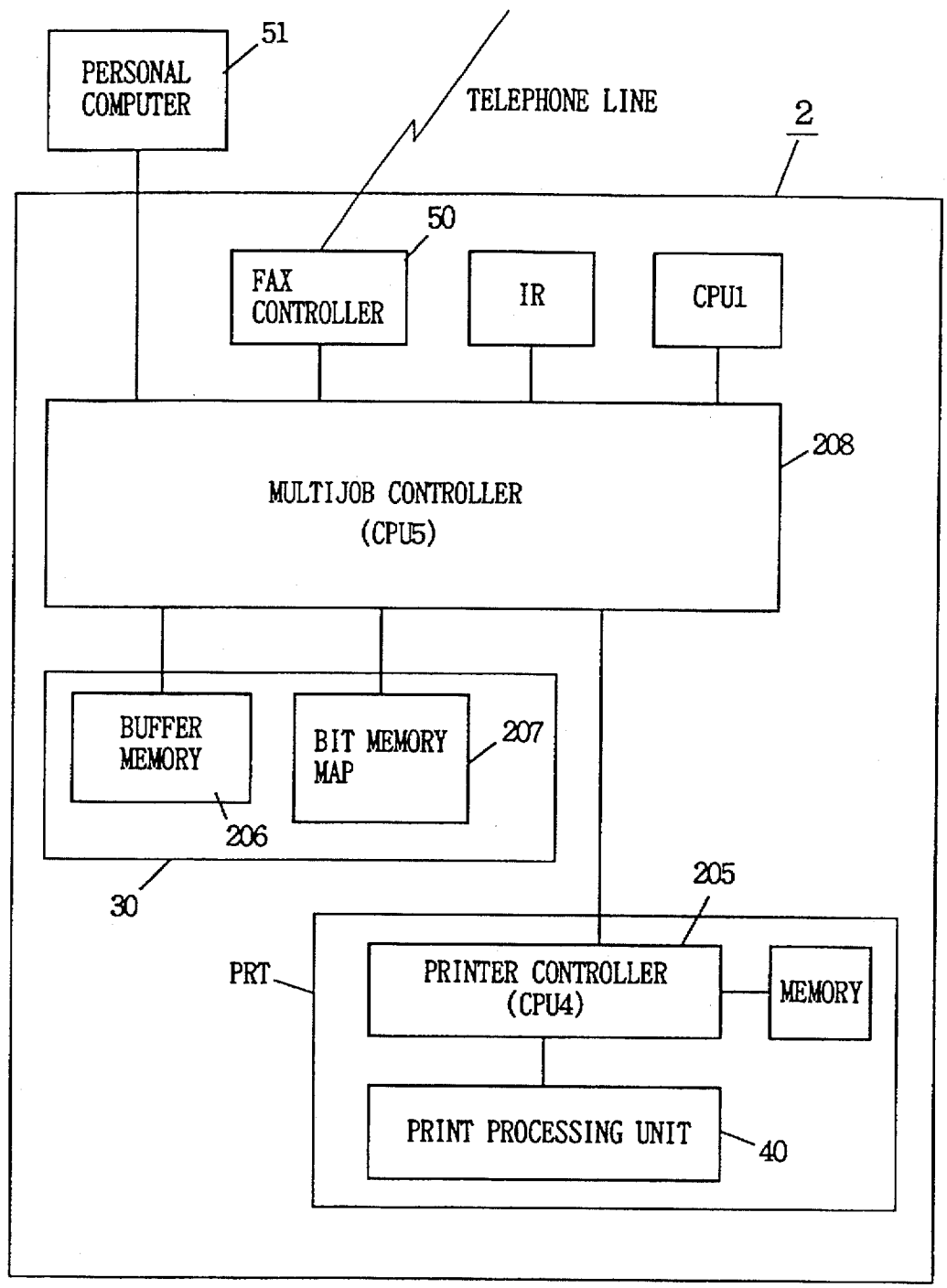
FIG. 28 is a block diagram of a network system including a copying apparatus to which the present invention is applied.

FIG. 28 is a block diagram showing an entire, structure of a copying apparatus 2 of the present. embodiment. Components corresponding to the prior embodiment have likewise reference numerals allotted. Referring to FIG. 28, copying apparatus 2 is connected to an externally provided personal computer 51, a FAX controller 50, and an image reader IR. Copy apparatus 2 includes a multijob controller 208 for controlling personal computer 51, FAX controller 50, and image reader IR. Multijob controller 208 effects an operation similar to that of CPU 5 described in the prior embodiment. Multijob controller 208 is connected to memory unit 30. Memory unit 30 includes a buffer memory 206 and a bit map memory 207. Multijob controller 208 is connected to page printer PRT. Page printer PRT includes a printer controller 205 and a print processing unit 40.

Figure 29:
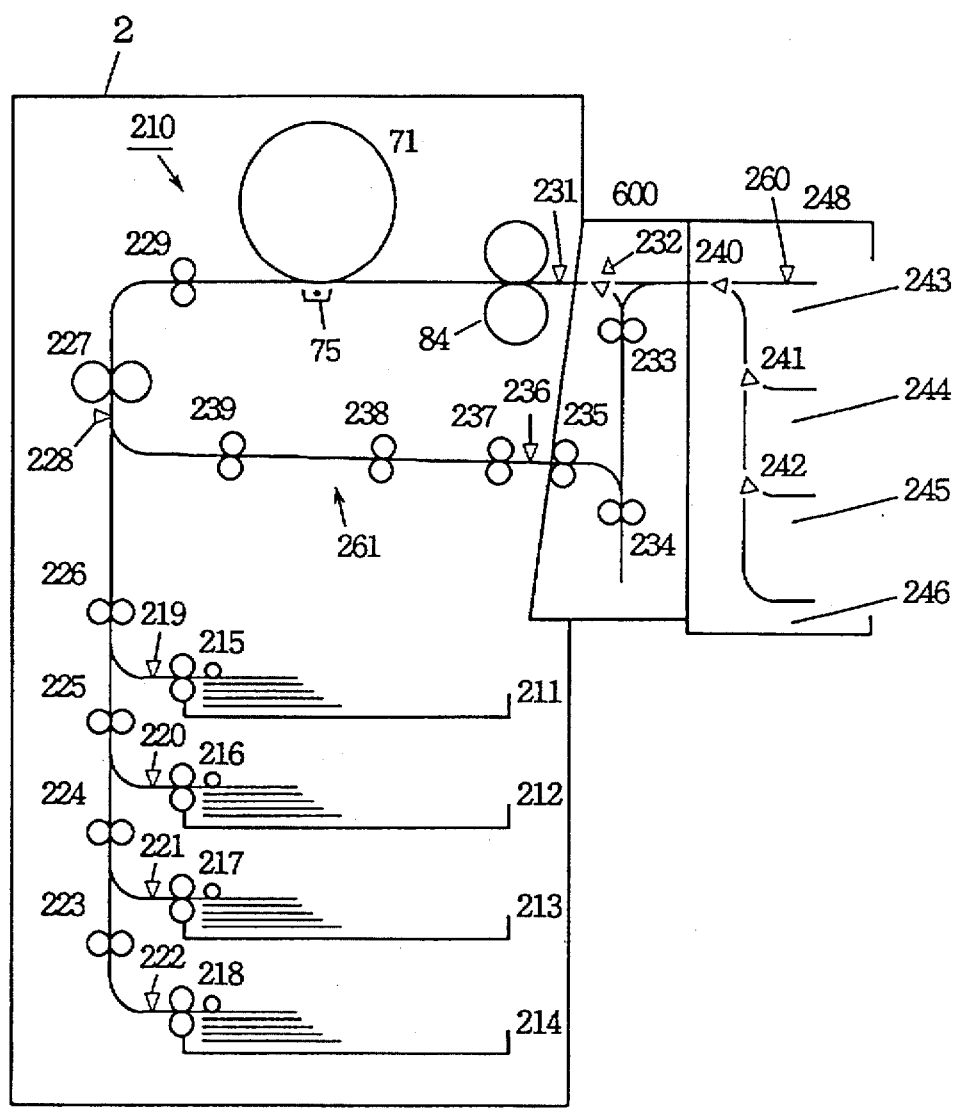
FIG. 29 schematically shows a sheet transportation path in a copying apparatus to which the present invention is applied.

FIG. 29 is a schematic diagram for describing the sheet transportation mechanism of the present embodiment. Referring to FIG. 29, copying apparatus 2 includes first to fourth sheet cassettes 211–214, a duplex side unit 247 with duplex function, and a mail box 248 for sorting the printout for each user.

The sheet transportation operation of copying apparatus 2 will be described hereinafter with reference to FIG. 29. First, an operation starting from a single side printing from first sheet cassette 211 until discharge of a printed sheet into a first mail tray 243 will be described. A sheet feed roller unit 215 is rotated to supply one sheet from first sheet cassette 211. The leading edge of the sheet is detected by a paper sensor 216. At an elapse of a predetermined time when the sheet is transported by transport roller 216, sheet feed roller unit 215 is ceased.

The sheet transported by transport roller 226 is transported to a photoreceptor drum 71 in synchronization with the print out timing by a resist roller 219 via an intermediate roller 217.

Following transfer of an image onto the sheet by a transfer charger 75, the image is fixed by a fixing roller pair 84. The sheet is transported to refeeding unit 600. In refeeding unit 600, a discharge gate 232 is turned on to convey the sheet in the discharge direction. In mail box 248, discharge gate 240 is turned on to discharge the sheet towards first mail tray 243.

Next, an operation of duplex printing on two sheets from fourth cassette 214 until discharge to a fourth mail tray 246 will be described hereinafter. Sheet feed roller unit 218 is rotated to feed out one sheet from fourth sheet cassette 214. At an elapse of a predetermined time from detection of a leading edge of the sheet by paper sensor 222, sheet feed roller unit 218 is ceased during transportation by transport roller 223. At an elapse of a predetermined time period from passage of the fed sheet through paper sensor 222 (to provide a predetermined interval from the first sheet), sheet feed roller 218 is rotated, whereby a second sheet is supplied from fourth sheet cassette 214. At an elapse of a predetermined time period from detection of the leading edge of the sheet by paper sensor 222, sheet feed roller unit 218 is stopped during transportation of the sheet by transport roller 226.

The fed two sheets are similarly sent to photoreceptor drum 71 via transport rollers 224–226 and intermediate roller 227. An image is formed thereon and fixed by fixing unit 30. Discharge gate 232 in refeeding unit 600 is turned off. The sheet is transported into refeeding unit 600 via transport roller 233. A switch back roller 234 is forward-positive reversed to send the sheet into the main body. The sheet is conveyed again to photoreceptor drum 71 via transport rollers 235–239, intermediate roller 227, and resist roller 229. At photoreceptor drum 71, an image is formed on the backside and then fixed by fixing roller pair 84. The sheet is then transported to refeeding unit 600. In refeeding unit 600, discharge gate 232 is turned on, whereby the sheet is conveyed to the discharge direction. In mail box 248, discharge gates 240–242 are turned off to discharge the sheet towards fourth mail tray 246.

Refeeding path 261 through which the sheet is refed includes transport rollers 235–239 to convey the sheet from refeeding unit 600 at a constant speed. Stock means such as an intermediate tray is not provided. A refeed outlet is provided at the output of refeeding path 261. In copying apparatus 2, a memory (not shown) is provided in which the size and direction of the sheets in each sheet cassette are stored. Input of the sheet size and direction for each cassette is implemented by a dip switch, for example. Alternatively, a microswitch can be provided at each sheet outlet instead of a memory to detect the size and direction of the sheet stored in each cassette. The exit of the first sheet cassette is referred to as outlet 1, the exit of the second sheet cassette as outlet 2, the exit of the third sheet cassette as outlet 3, and the exit of the fourth sheet cassette as outlet 4.

Communication between printer controller 205 and print processing unit 40 shown in FIG. 28 will be described hereinafter. Control of transportation of a sheet from a sheet cassette is provided by transferring data and commands between printer controller 205 and print processing unit 40 in copying apparatus 2.

In response to transmission of a print command from printer controller 205, print processing unit 40 always transmits a sheet feed report. This sheet feed report includes three types of reports.

(1) Sheet feed report (transmitted when a sheet is fed).

(2) Sheet feed report (prohibited) (transmitted when a sheet cannot be fed due to an error or due to the sheet cassette being empty).

(3) Sheet feed report (prohibited: preference of refeed) (transmitted when a sheet cannot be fed due to a refeed outlet given priority).

Following transmission of a print command, printer controller 205 waits for a sheet feed report. The next print command can be generated upon reception of a sheet feed report. The sequence of a discharge report concerning the sheet corresponding to the print command and a discharge report concerning the current print command is of no importance.

Details of the data transmitted from printer controller 205 and print processing unit 40 will be described hereinafter.

Print command: request of print out operation

Sheet feed report: inform that a sheet is fed

Sheet feed report(prohibited): inform that a sheet cannot be fed

Sheet feed report (prohibited: preference of refeed sheet): inform that a sheet cannot be fed (priority given to reset sheet)

Discharge report: inform that sheet is discharged outside the apparatus

Discharge report (refeed): inform that one side is printed and discharged to refeed outlet in duplex printing Sheet outlet setting: cassette number: set the cassette from which a sheet is to be fed Sheet feed setting (refeed): set the cassette to feed a sheet as the refeed outlet Duplex side setting: set transportation of printed sheet to refeed outlet Discharge setting, single side setting: discharge printed sheet outside apparatus Details will be described in the following.

Figure 30A:
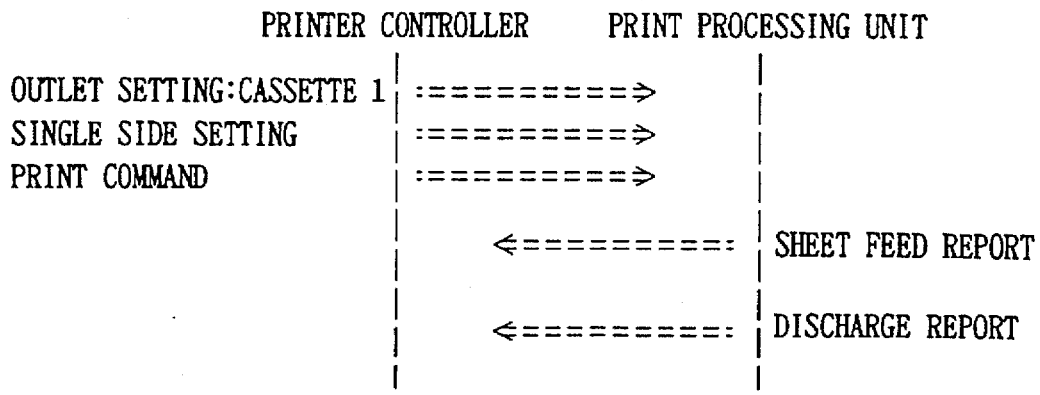

In the case of single side print out of one sheet, data is output from both printer controller 205 and print processing unit 40 as shown in FIG. 30a. First, a print command is generated from printer controller 205 specifying outlet 1 and single side copy. Sheet feed roller unit 215 is rotated, whereby one sheet is fed out from first sheet cassette 211. Here, print processing unit 40 transmits a sheet feed report. The following operation is similar to that described with reference to the structure of the copying apparatus of FIG. 29, and details will not be repeated. An image is formed and printed out on the fed sheet. Print processing unit 40 transmits a discharge report when the sheet passes fix discharge sensor 231.

Figure 30B:
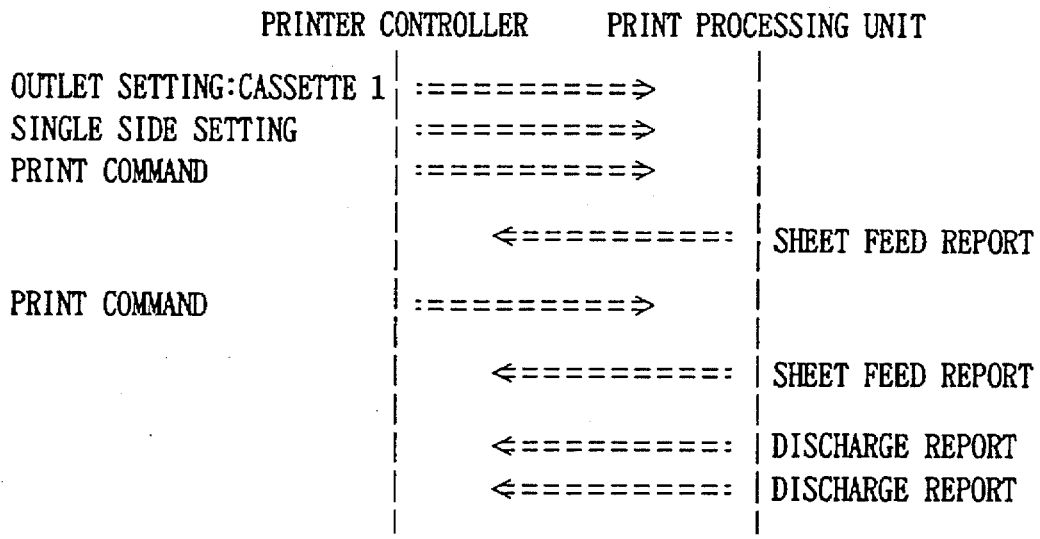

A case where printing is carried out on two sheets will be described with reference to FIG. 30b. Printer controller 205 generates a print command specifying outlet 1 in a single side copy operation. The responsive operation up to transmission of a sheet feed report (first sheet) from print processing unit 40 is similar to that of FIG. 30a. Then, printer controller 205 generates a print command for the second sheet upon receiving a sheet feed report. In response, print processing unit 40 transmits a sheet feed report for the second sheet. Respective sheets are sequentially transported to photoreceptor drum 71 for print out. At respective time points of printed sheets being discharged outside the apparatus, a discharge report in sequence for the first sheet and then the second sheet is transmitted from print processing unit 40.

Figure 30C:
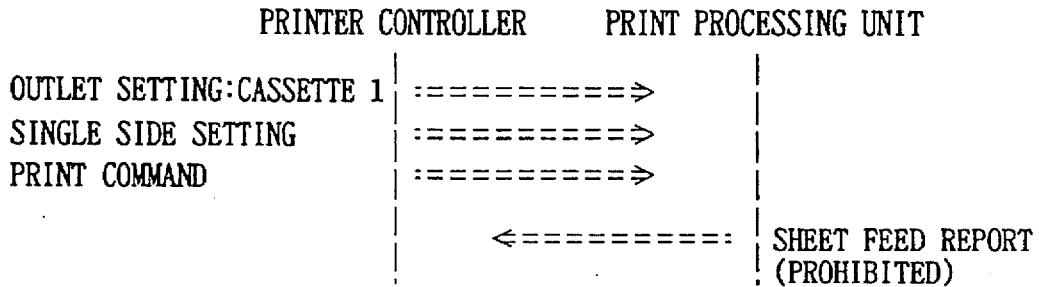

A case will be described with reference to FIG. 30c where printing is inhibited at a paper empty state where there is no sheet in the cassette. The process of specifying the cassette outlet and single side copy up to generation of a print command is similar to the above case. Here, print processing unit 40 transmits a sheet feed report (prohibited) indicating that a sheet cannot be fed in response to a print command.

Figure 31A:
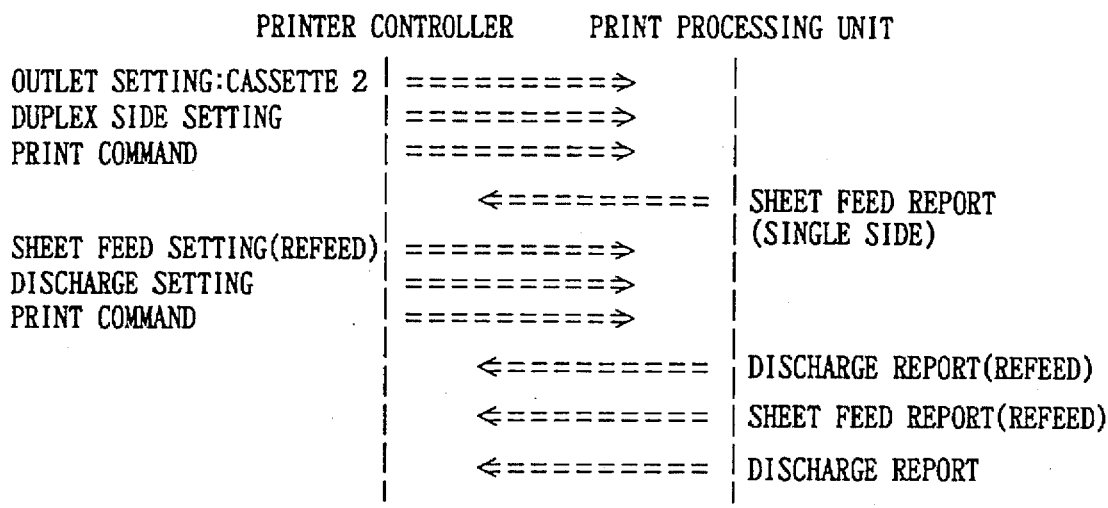

Duplex printing will be described hereinafter. FIG. 31a is a diagram showing the communication contents. Printer controller 205 generates a print command for a one side copy under the specification of outlet 2 and duplex side copy. Sheet feed roller unit 216 is rotated, whereby one sheet is fed out from second sheet feed cassette 212. Here, print processing unit 40 transmits a sheet feed report (single side). The supplied sheet is printed. Print processing unit 40 transmits a discharge report (refeed) when the printed sheet passes fix discharge sensor 231. The sheet is transported to photoreceptor drum 71 to have the backside printed. A discharge report is output from print processing unit 40 at the time point where the sheet having both sides printed is discharged outside the apparatus.

Figure 31B:
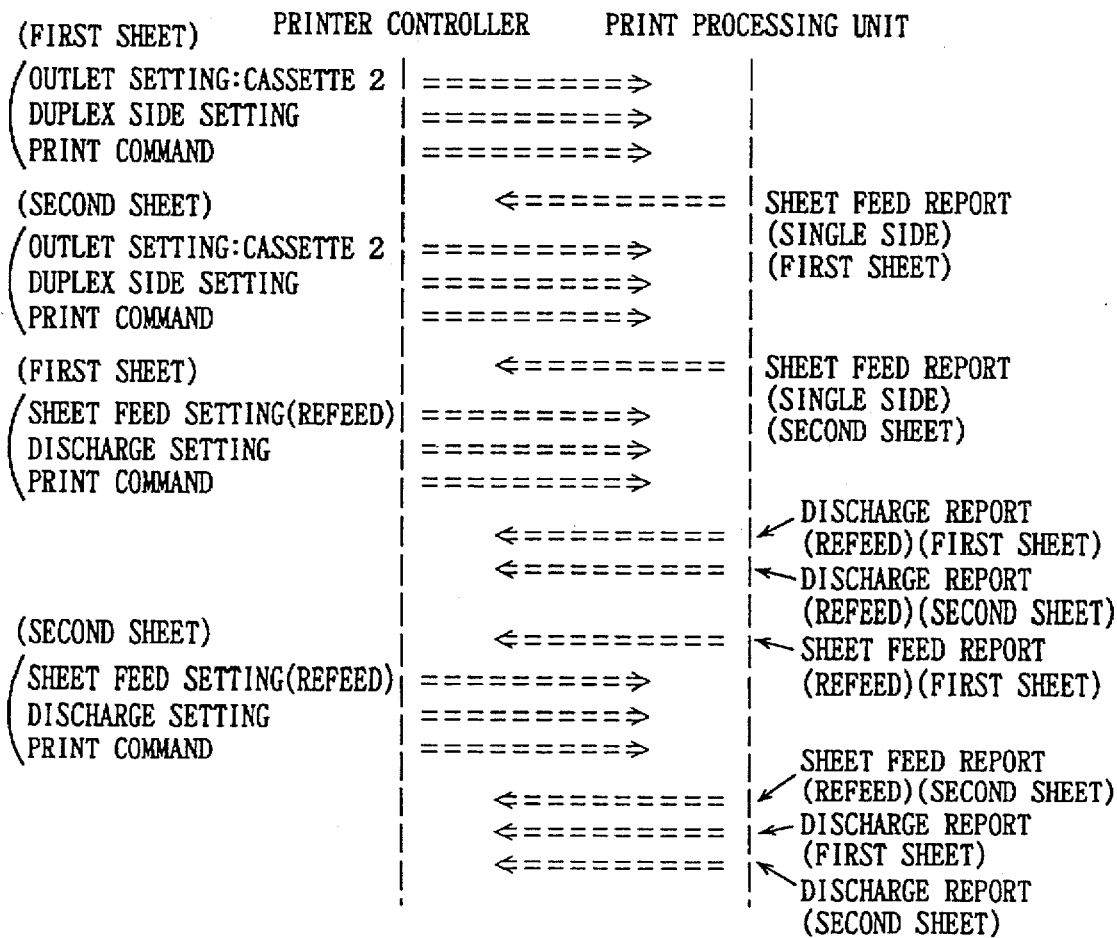

The case of printing both sides for two sheets will be described with reference to FIG. 31b. The operation of the processes up to respective outputs of a sheet feed report (one side) for both the first and second sheets is similar to that described in FIG. 31a. Printer controller 205 specifies refeeding and discharge, and provides a print command for the first sheet. In response, a signal indicating that the sheet is discharged to the refeeding outlet for the first and second sheets and a sheet feed report (refeed) for the first sheet are output from print processing unit 40. In response, a print command for the backside of the second sheet is transmitted from printer controller 205. The first and second sheets are transported to photoreceptor drum 71, whereby respective backsides are printed. A discharge report for the first sheet and then for the second sheet is transmitted from print processing unit 40 at the time point when the sheets having both sides printed are discharged outside the apparatus.

Another example of having both sides of two sheets printed will be described with reference to FIG. 32. The difference from FIGS. 31a and 31b lies in that transmission of a print command for the first refed sheet is provided after a discharge report (refeed) is received. The remaining contents are similar to those of FIG. 31b, so that details thereof will not be repeated.

Still another example of having both sides of two sheets printed will be described with reference to FIG. 33. The difference from the example shown in FIG. 31b lies in that the transmission of a print command (one side) for the second sheet is provided after a discharge report (refeed) is transmitted, i.e. generation of the command is delayed.

Figure 33:
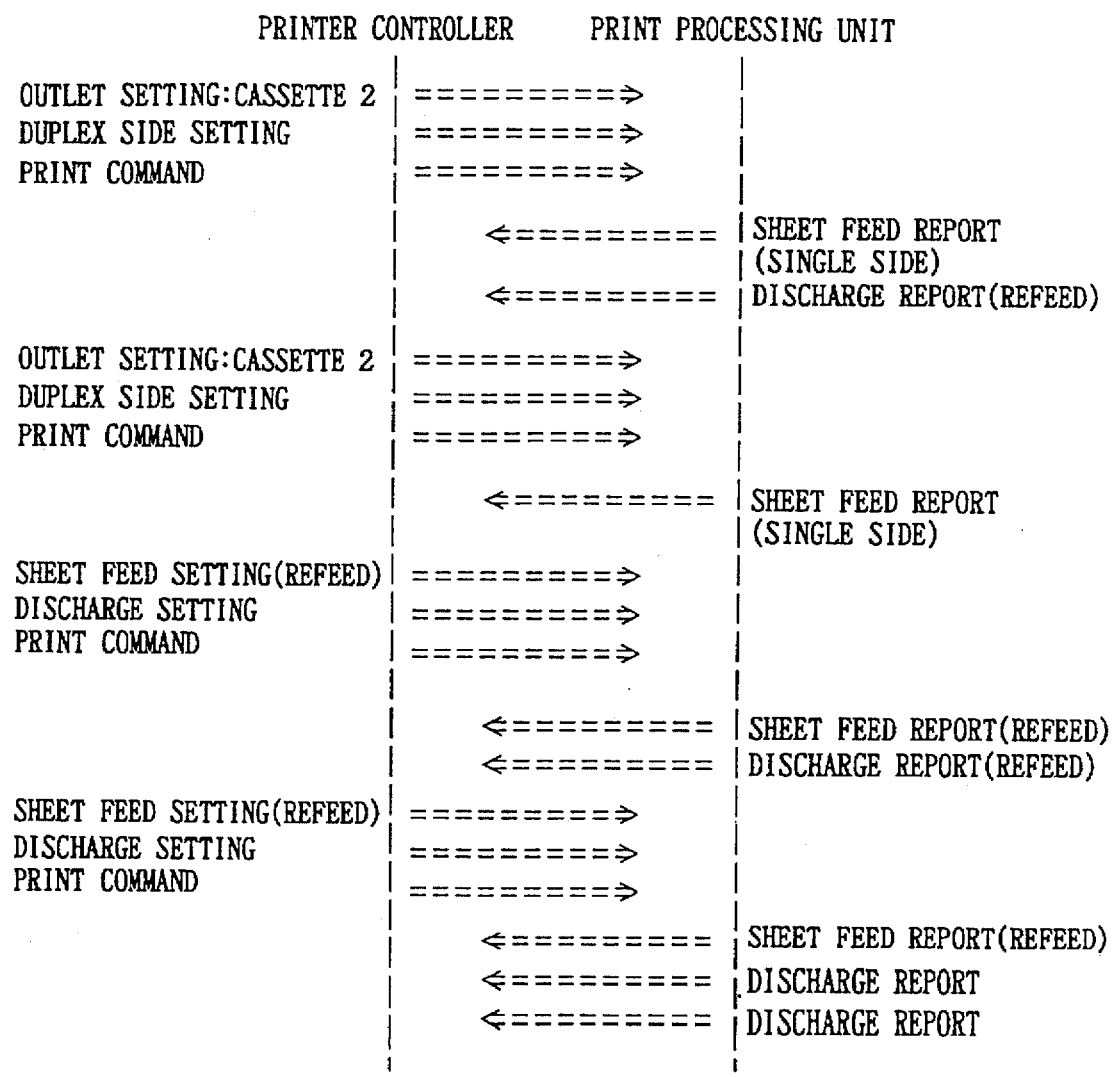

Referring to FIG. 33, printer controller 205 generates a print command specifying cassette outlet 2 for duplex side copy. Sheet feed roller unit 216 is rotated, whereby one sheet is output from second sheet cassette 212. Here, print processing unit 40 transmits a sheet feed report (single side).

Print processing unit 40 transmits a discharge report (refeed) when the fed sheet is printed and passes fixing discharge sensor 231. Then, printer controller 205 generates a print command specifying cassette outlet 2 for duplex side copy at the time point the second sheet is ready for printing. Sheet feed roller unit 216 is rotated, whereby one sheet (second sheet) is provided from second sheet cassette 212. Here, print processing unit 40 transmits a sheet feed report (single side).

After receiving a sheet feed report (single side) for the second sheet, printer controller 205 specifies the refeed outlet and generates a print command (backside of the first sheet) at the discharge specify routine. If the first sheet transported to the refeed outlet has arrived at a horizontal transport path entry paper sensor 236 (or at the time point of arrival), a sheet feed report of the refeed outlet and a discharge report (first sheet) are generated. Then, the first sheet is transported to photoreceptor drum 71 via transport rollers 237–239, 227 and 229 to have its backside printed.

Following transmission of a sheet feed report of the refed first sheet, printer controller 205 specifies the refeed outlet, and generates a print command (the backside of the second sheet) at the discharge specify routine. If the second sheet transported to the refeed outlet has arrived at horizontal transportation path entry paper sensor 36 (or at the time point of arrival), a sheet feed report (second sheet) of the refeed outlet is generated.

The second sheet is transported to photoreceptor drum 71 via transport rollers 237–239, 227 and 229 to have the backside printed. A discharge report for the first sheet and then the second sheet is transmitted from print processing unit 40 at the time point where the sheet having both sides printed is discharged outside the apparatus.

Yet a further example of having both sides of two sheets printed will be described hereinafter. The present case corresponds to the case where the print command of the second sheet is delayed, so that supply of the second sheet is canceled to avoid collision with a refed sheet.

Figure 34:
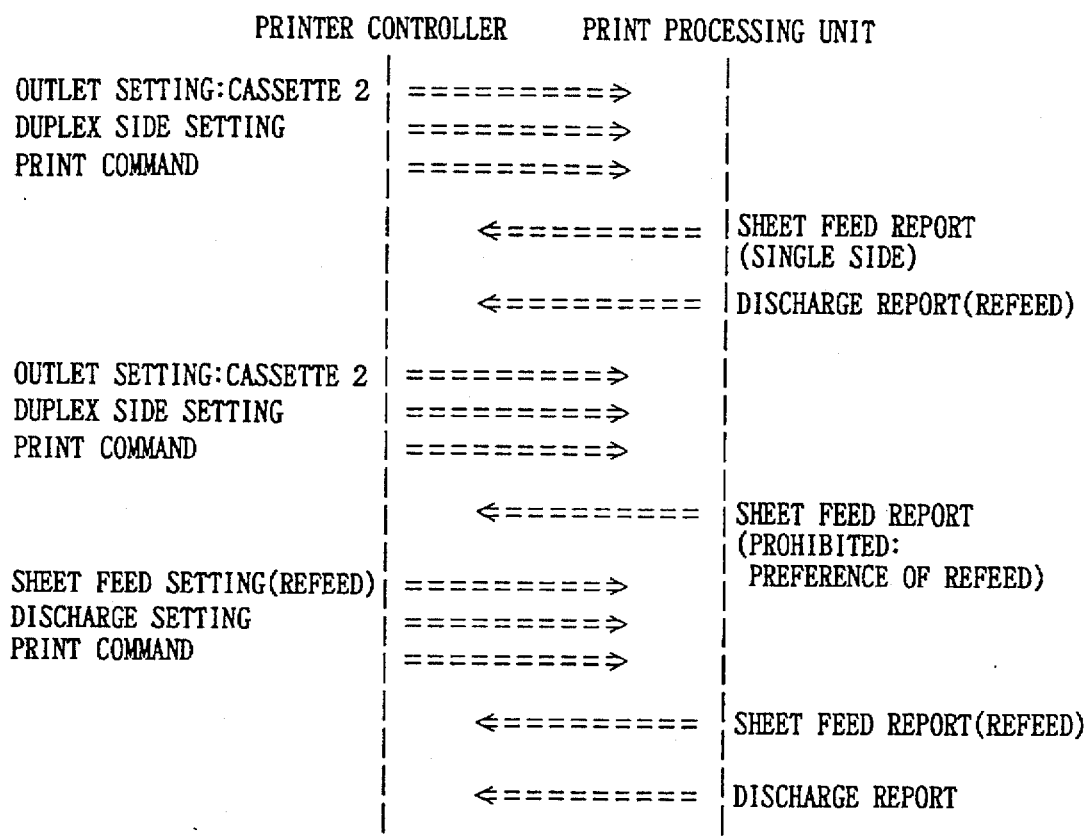

Referring to FIG. 34, printer controller 205 generates a print command in a duplex side specify routine from outlet 2. Sheet feed roller unit 216 is rotated, whereby one sheet is output from second sheet cassette 212. Here, print processing unit 40 transmits a sheet feed report. The fed sheet is printed. Print processing unit 40 transmits a discharge report (refeed) when the sheet passes fixing discharge sensor 231. Then, printer controller 205 generates a print command in the duplex side specify routine from cassette outlet 2 at the time point the second sheet is ready to be printed.

Here, the distance from cassette outlet 2 to intermediate roller 228 is compared with the distance from the sheet having one side already printed in the refeeding path to intermediate roller 218. In this case, print processing unit 40 transmits a sheet feed report (prohibited: preference of refeed) since collision of the sheets will occur if a sheet is fed.

Printer controller 205 detects that sheet feeding is inhibited from outlet 2 upon receiving a sheet feed report (prohibited: preference of refeed). Therefore, printer controller 205 generates a print command (for the backside of the first sheet) in the refeeding outlet and discharge specify routine. If the first sheet transported to the refeed outlet has already arrived at horizontal transportation path entry paper sensor 236, or at the time point of arrival, a sheet feed report (first sheet) of the refeeding outlet is generated. Then, the backside of the sheet is printed and discharged outside the apparatus. A discharge report is transmitted from print processing unit 40.

The above-described control is provided to interrupt supply of a sheet from the feeding unit to carry out feeding of a sheet from refeeding path the sheet in since the sheet in refeeding path 261 cannot have its transportation suppressed. Therefore, the above-described control is not necessary in a copying apparatus where stock means such as a refeed sheet tray is provided in refeeding path 261.

The position of a sheet in refeeding path 261 is not determined in a one-to-one correspondence, and differs depending upon various circumstances of printer controller 205. More specifically, printer controller 205 transmits a sheet feed command to print processing unit 40 after data to be recorded is transferred into a bit map memory. However, this transfer time differs depending upon whether the data is character data or image data even for data of a A4 size sheet, for example. (It is assumed that printer controller 205 of the present embodiment has a memory available for two pages of the maximum size sheet.) This means that the position of the sheet (having one side already printed) in refeeding path 61 differs depending upon the time consumed for transferring the data that is to be printed on the sheet. The sheet position in refeeding path 250 also varies depending upon the transmission timing of a print instruction from a host computer for the sheet to be recorded.

The difference between FIGS. 33 and 34 lies in whether sheet feeding is carried out from a cassette depending on where the first sheet is positioned in the refeeding path. Determination of whether to feed a sheet or prohibited sheet feeding will be described hereinafter.

The distance from intermediate roller 227 to sheet feed roller 215 provided at outlet 1, sheet feed roller 216 provided at outlet 2, sheet feed roller 217 provided at outlet 3, sheet feed roller 218 provided at outlet 4, and sheet feed rollers 215–218 provided at outlet X (X=1–4) are referred to as Lf1, Lf2, Lf3, Lf4 and LfX, respectively.

The distance from fixing discharge sensor 231 to intermediate roller sensor 228 via refeeding path 261 is referred to as Ldp, and the optimum sheet interval is referred to as Linv.

It is assumed that the size of the sheets accommodated in first to fourth sheet cassettes and the Xth sheet cassette (X=1–4) is PSf1-PSf4 and PSfx, respectively.

The elapsed time from generation of a discharge report (refeed) is referred to as Tmdp1 (it is assumed that a timer is provided indicating the number of generated discharge reports in copying apparatus 1). The system speed is referred to as Sp.

In the case of duplex side copy, the count of the timer is initiated when a discharge report is generated at completion of printing one side. Then, the following operation of X1=Ldp–LfX–Linv–PSfx–Tmdp1×Sp is carried out when a print command is generated from cassette outlet X.

When the value of the above X1 is less than 0, a print command of cassette outlet X is inhibited, and a feed sheet report (prohibited: preference of refeed sheet) is transmitted. This is because there is a possibility of collision of the sheets.

If the calculated value X1 is 0 or more, a print command of cassette outlet X is permitted. Sheet feeding is carried out, and a sheet feed report is transmitted. Printing can be carried out properly when the sheet is fed at this timing. A specific flow chart of the above process will be described afterwards.

An operation of print processing unit 40 will be described hereinafter with reference to the flow chart of FIG. 35 of the control routine of print processing unit 40 of FIG. 35. When the power is turned on, various initialization processes are carried out at #110. At #120, interface (I/F) control is provided for receiving and analyzing a command from printer controller 205, and for transmitting a print processing unit control report to printer controller 205. At #130, the sheet transportation status is detected, and a sheet transportation control process for controlling the transportation operation is carried out. At #140, miscellaneous processes such as image information are carried out.

Figure 35:
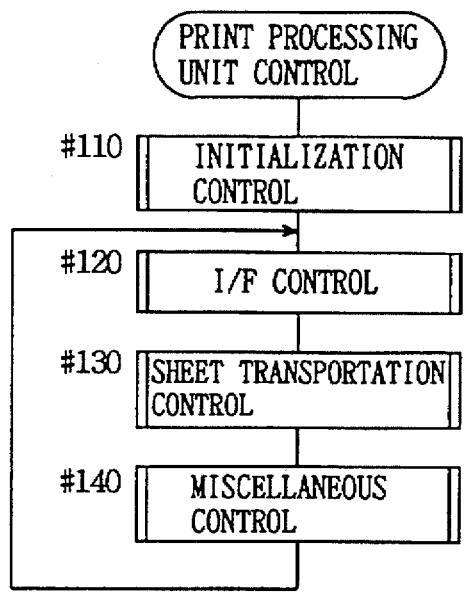
FIG. 35 is a flow chart showing a print processing unit control routine.
Figure 36:
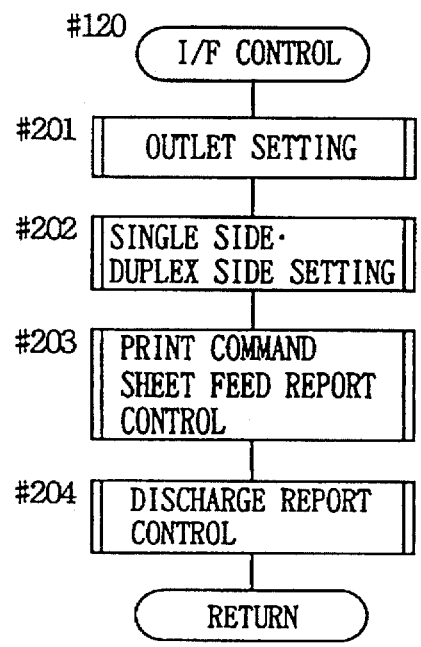
FIG. 36 is a flow chart showing the contents; of an I/F control subroutine.

FIG. 36 is a flow chart showing the I/F control subroutine of #120 of FIG. 35. First, an outlet is specified (#201). Next, a single side print out or a duplex side print out is specified (#202). Then control of receiving a print command and transfer of a sheet feed report is carried out (#203). Finally, control for transmitting a discharge report is carried out (#204).

Figure 37:
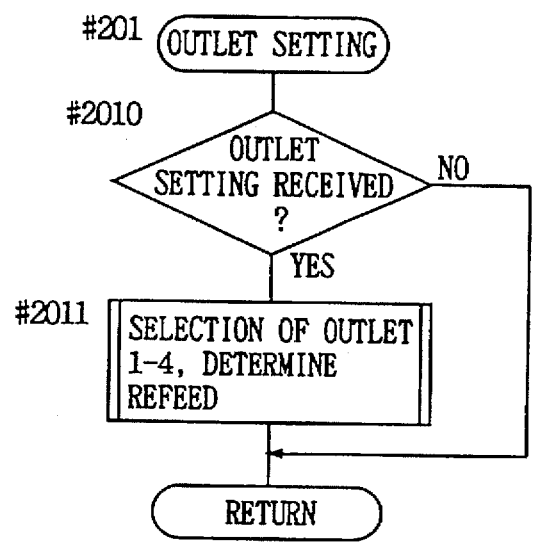
FIG. 37 is a flow chart showing the contents; of a supply sheet outlet setting subroutine.

FIG. 37 is a flow chart showing the contents of a subroutine of the sheet outlet setting process of #201 in FIG. 36. First, determination is made whether a sheet outlet set command indicating setting of a cassette from which a sheet is fed out is received from printer controller 205. If the command is received, the sheet outlet is specified according to the received command (YES at #2010, #2011).

Figure 38:
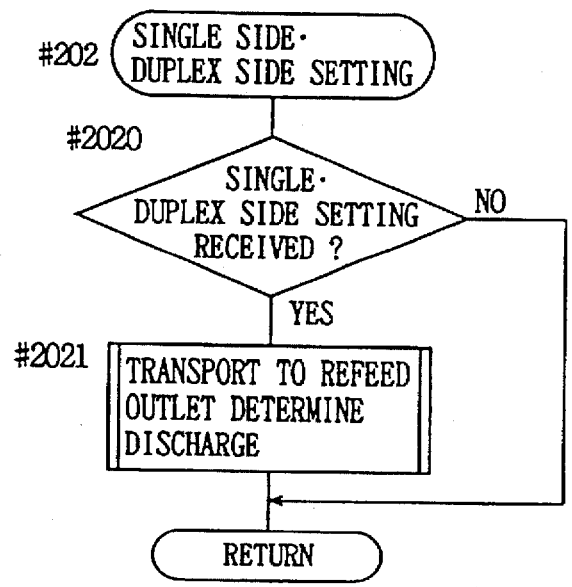
FIG. 38 is a flow chart showing a single side copy•duplex side copy setting subroutine.

FIG. 38 is a subroutine showing the process of a single side/duplex side copy specification of #202 of FIG. 36. Determination is made whether a single side copy setting command or a duplex side copy setting command is received from printer controller 205 indicating whether the printed sheet is discharged outside the apparatus or to the refeeding outlet (#2020). If the command is received, discharge of the sheet outside the apparatus or for refeed transportation is determined according to the received command (#2021).

Figure 39:
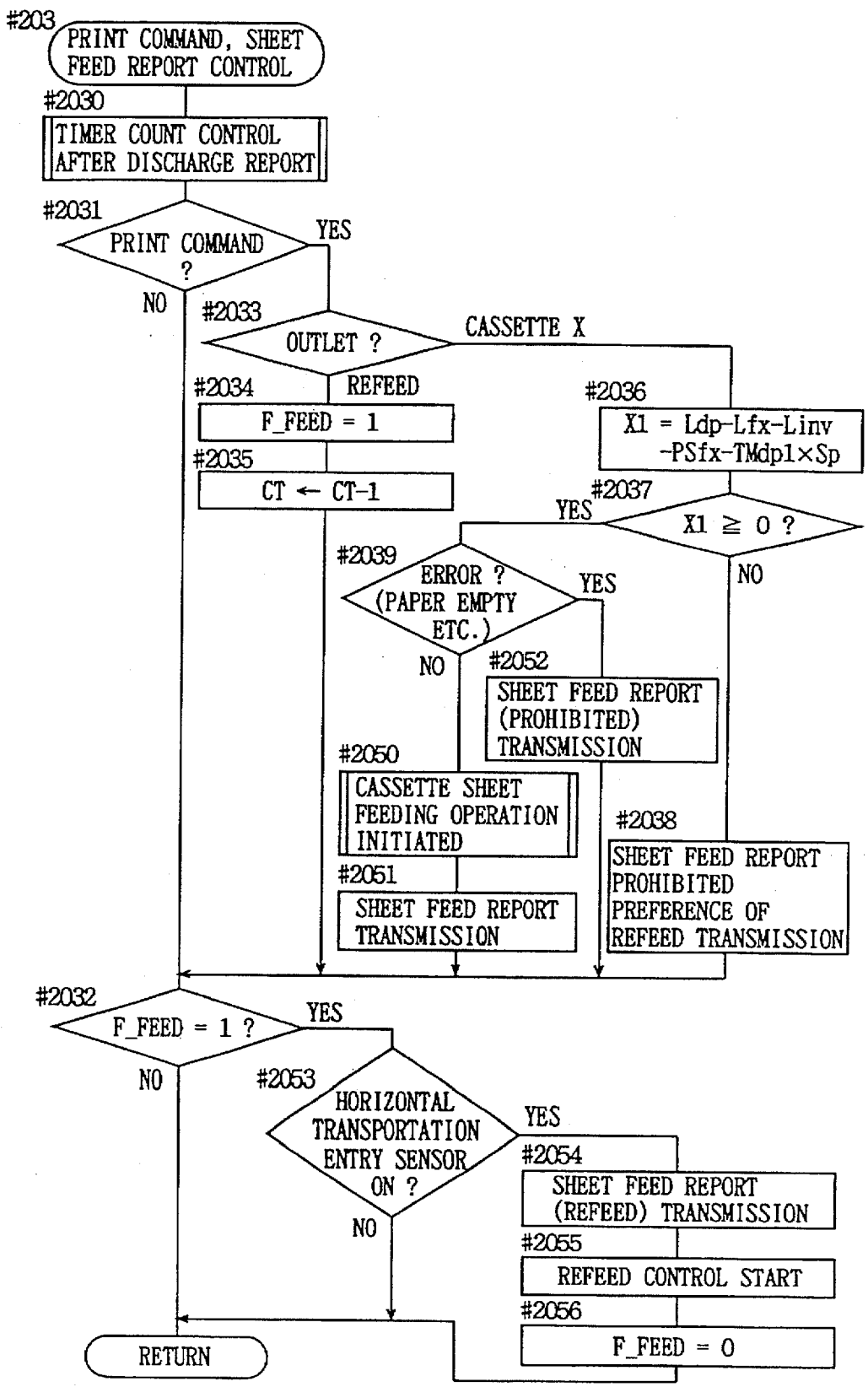
FIG. 39 is a flow chart showing the contents of a print command•sheet feed report control subroutine.

FIG. 39 is a subroutine indicating the print command sheet feed report control of #203 of FIG. 36. Control is provided of the timer count after a discharge report is transmitted for printer controller 205 (#2030). Then, determination is made whether a print command is received (#2031). When a print command is received, determination is made whether the outlet setting specifies the cassette or a refeeding outlet (#2033). When sheet feeding from the outlet is set, a flag F_FEED that is placed when printing is carried out for a sheet supplied from the refeed outlet is set to 1 (#2034). The count value CT of the number of sheets in the reverse transportation path 247 is decremented by one, i.e. CT-1 (#2035).

When F_FEED is 1 at #2032, i.e. when printing is to be carried out for a sheet from the refeeding outlet, determination is made whether the leading edge of the one-side-printed-sheet reversed by duplex side unit 247 has turned on horizontal transportation path entry paper sensor 236 (#2053). At the turn-on timing, a sheet feed report of preference of refed sheet is sent to printer controller (#2054). Then, control is provided to refeed the sheet to the print unit (#2055). The flag of F_FEED is reset to 0 (#2056).

When determination is made that the setting at #2033 specifies a sheet fed from the cassette, the value of the aforementioned X1 is calculated (#2036). When the value X1 is less than 0, i.e., NO at #2037, there is a possibility of the fed out sheet collision if the sheet is directly fed out from the sheet cassette. Therefore, a preference refeed sheet feed report is transmitted to printer controller 205, and execution of a print command is inhibited (#2038).

When determination is made that the value of X1 is 0 or more at #2037, confirmation is made that there is no paper empty error and the like for the set cassette since there is no possibility of collision of the refed sheet even when a sheet is fed out from the sheet cassette (#2039). A feed out operation from the sheet cassette is initiated (#2050). A sheet feed report is transmitted to printer controller 205 (#2051). When there is an error in the sheet cassette (YES at #2039), a sheet feed report of sheet feed prohibited is transmitted (#2052).

Figure 40:
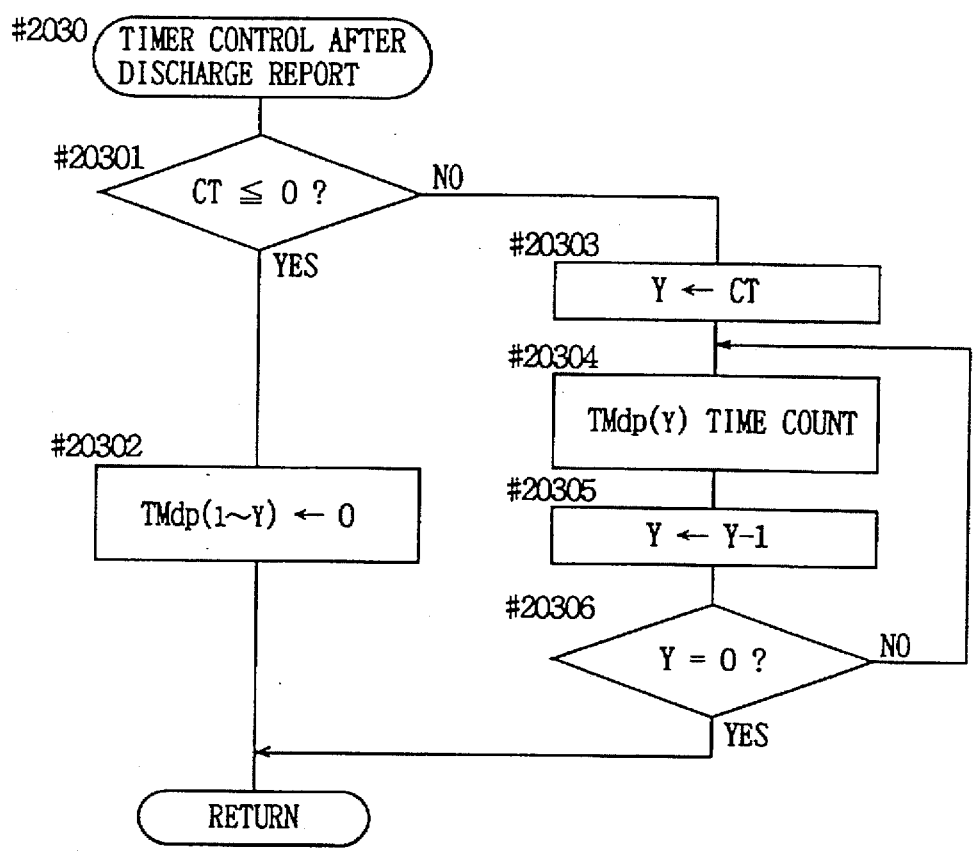
FIG. 40 is a flow chart showing the contents of a timer control subroutine after a discharge report.

FIG. 40 is subroutine of the timer count control process after a discharge report is transmitted of #2030 in FIG. 39. Determination is made whether the value of CT is less than 0 (#20301). A value of less than 0 for CT indicates that a refeed discharge report is not output. More specifically, when a refeed print command indicated at #2031 and #2033 shown in FIG. 39 is received before the one-side-printed-sheet passes through fixing discharge sensor 231, the value of CT becomes less than 0 at #2035. In this case, the timer value TMdp (1~Y) indicating the elapsed from generation of a refeed sheet discharge report is set to 0 (#20302). When the value of CT is 0 or more at #20301, a plurality of timers Y corresponding to the incorporated numbers of sheets (CT) are set (#20203). The elapsing time for each sheet is counted (#20304). When the timers are set for all the copies and initiated at #20306, the program returns. When there is no refeed discharge report, the values of TMdp1–TMdpY become 0.

Figure 41:
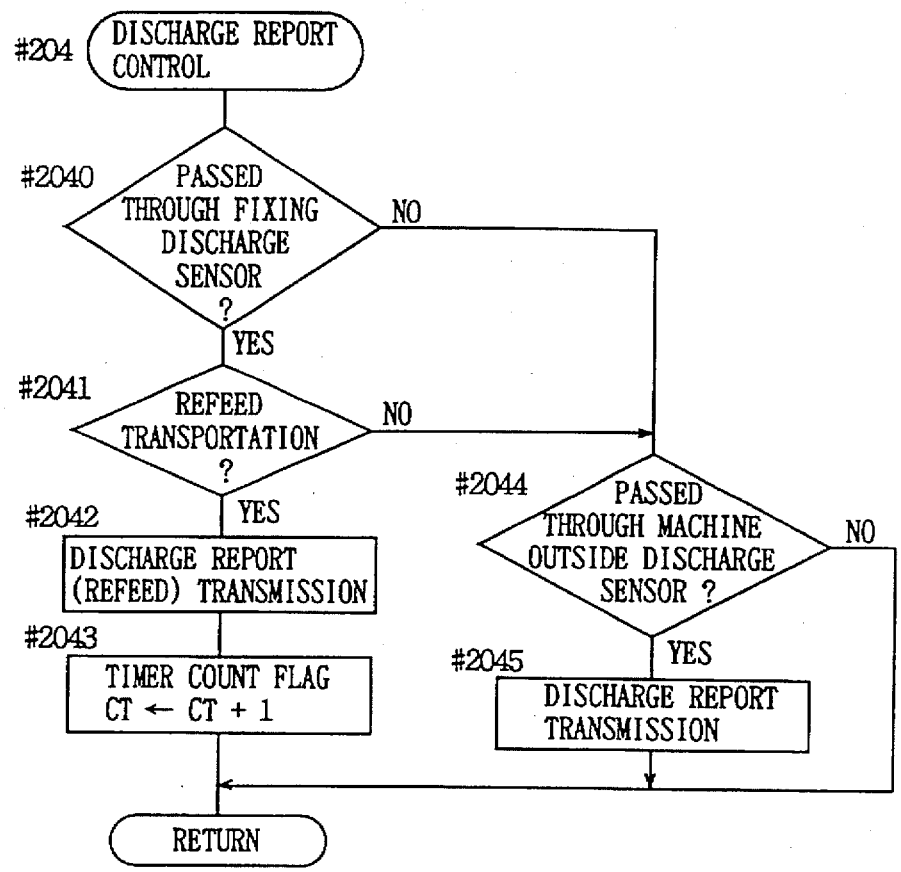
FIG. 41 is a flow chart showing the contents of a discharge report control subroutine.

FIG. 41 is a subroutine indicating the discharge report control process of #204 shown in FIG. 36. When confirmation is made that the sheet has passed fixing discharge sensor 231 (#2040), determination is made whether duplex side copy is set (#2041). When duplex side copy is set, a refeed discharge report is transmitted to printer controller 205 (#2042). Counter value CT indicating the number of incorporating sheets is incremented (#2043). When NO at #2040 or #2041, determination is made whether the sheet has passed an outside machine discharge sensor 60 (#2044). If YES, a discharge report is transmitted (#2045).

Figure 42:
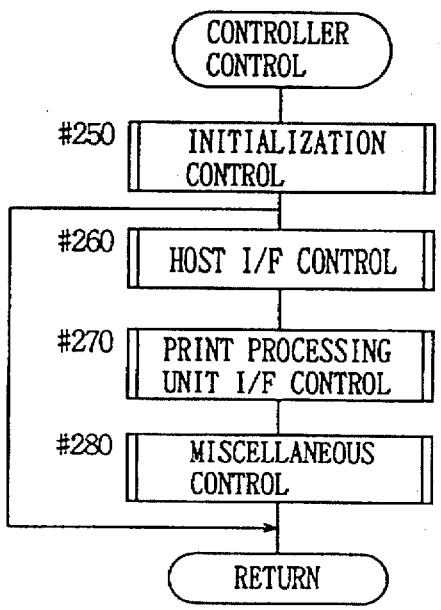
FIG. 42 is a flow chart showing the contents of a controller control subroutine.

FIG. 42 is a flow chart of the control routine of printer controller 205. First, various initializations are carried out (#250). Then, a host I/F control process for transferring a signal to and from the host is carried out (#260). Then, the print processing unit I/F control process for transferring a signal to and from print processing unit 40 is carried out (#270). Then, miscellaneous processing is carried out (#280).

Figure 43:
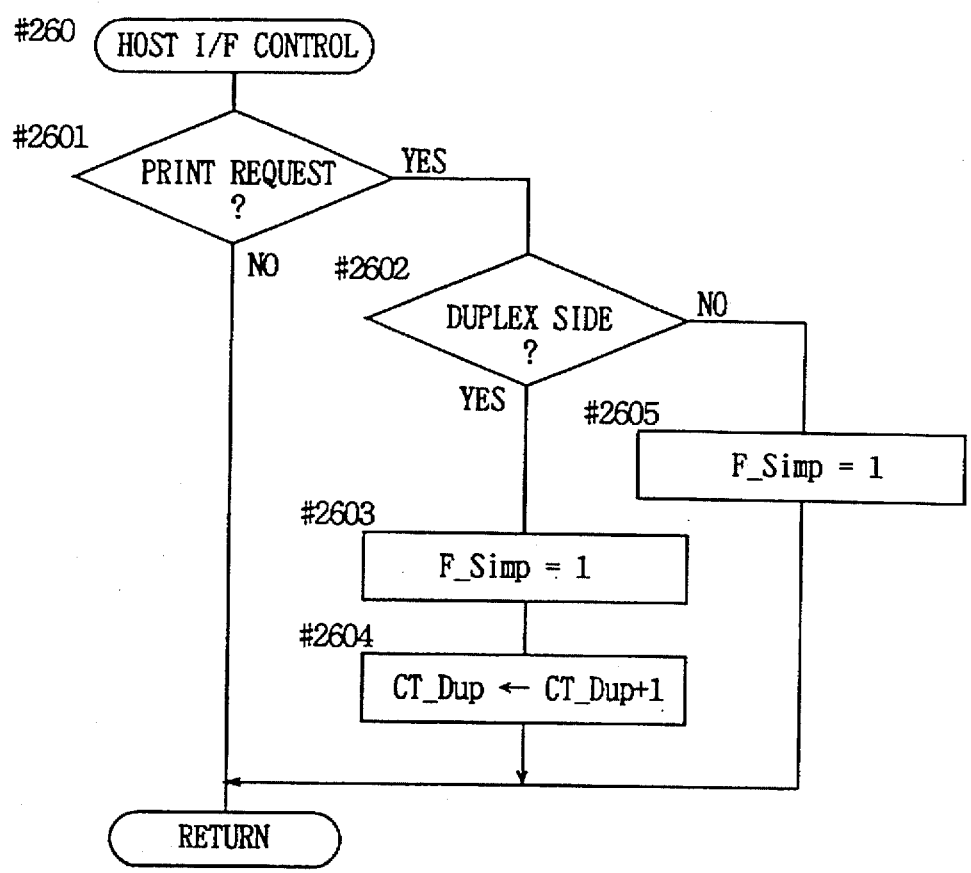
FIG. 43 is a flow chart showing the contents of a host I/F control subroutine.

FIG. 43 is a subroutine of the host I/F control process of #260 shown in FIG. 42. When a print request is provided from the host (#2601), determination is made whether a duplex side copy print out is requested or not (#2602). In the case of a duplex side copy operation, a flag F__Simp for first carrying out one side printing is set to 1 (#2603). Counter CT__Dup for duplex printing is incremented by 1 (#2604). When single side copy is specified at #2602, a process for setting F__Simp to 1 is carried out (#2605).

Figure 44:
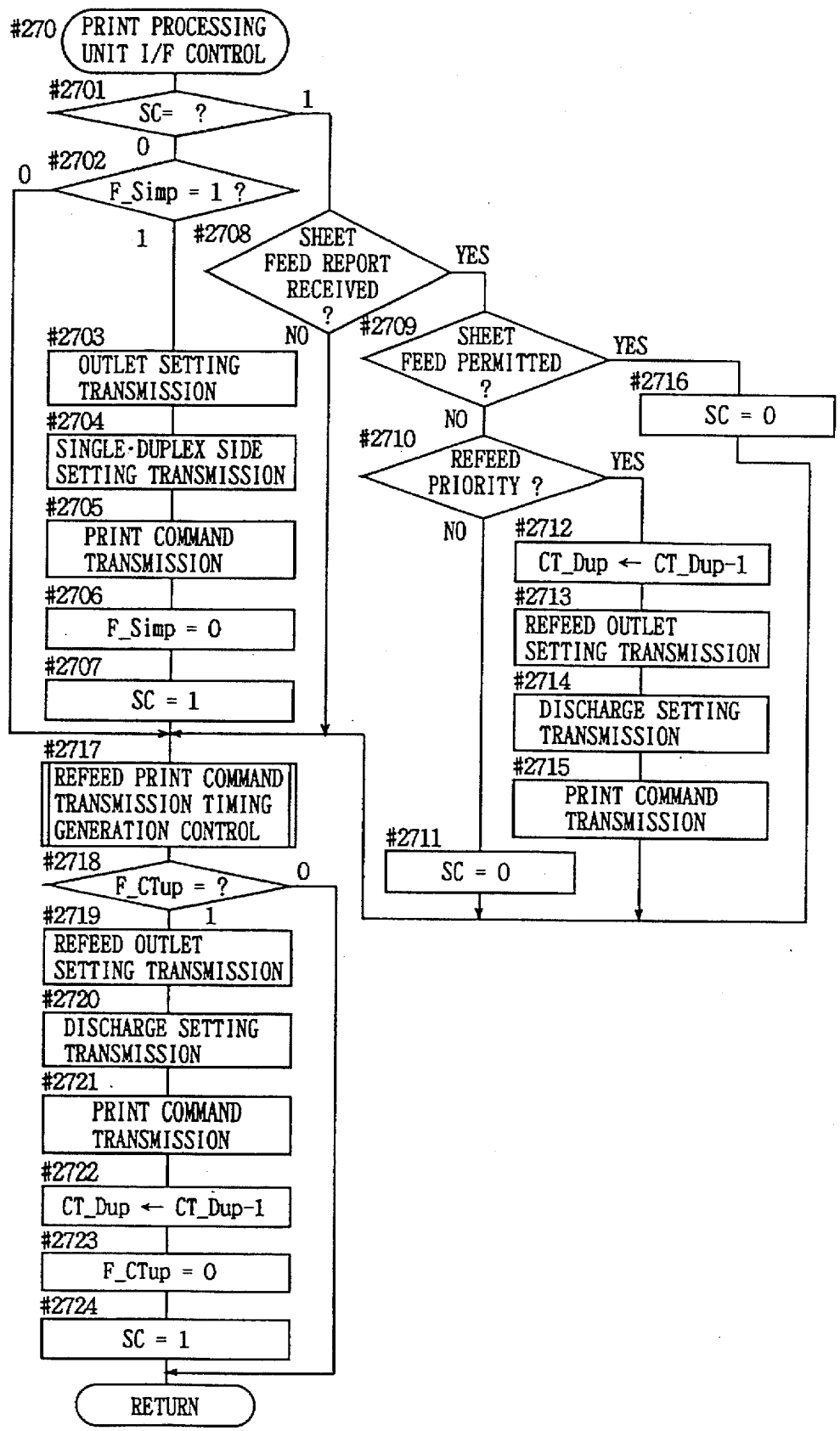
FIG. 44 is a flow chart showing the contents of a print sheet control unit I/F control subroutine.

FIG. 44 is a subroutine indicating a print processing unit I/F control process of #270 shown in FIG. 42. The value of state counter SC is checked (#2701). When the value of SC is 0, the program proceeds to #2702 where confirmation is made whether F__Simp is set to 1. Then, various processing for outlet setting, single side copy·duplex side copy setting, and print command transmission to print processing unit 40 are carried out (#2703–#2705). Then, F__Simp is set to 0 (#2706). State counter SC is set to 1 (#2707). Then, waiting is conducted for reception of a sheet feed report from print processing unit 40 (#2708).

When a sheet feed report is returned from print processing unit 40, determination is made whether the returned report is a sheet feed permit report indicating sheet feeding (#2709). State counter SC is set to 0 (#2716). When the report is not a sheet feed permit report (NO at #2709), determination is made whether the report is a preference refeed report (#2710). If YES, CT__Dup is decremented by 1 (#2712). Various commands of refeed outlet setting, discharge setting, and a print command are transmitted to print processing unit 40 (#2713–#2715).

When determination is made that the report is a refeed prohibited report at #2710, state counter SC is set to 0 (#2711). Then, a refeed print command transmission timing generation control process is carried out (#2717). Next, the value of flag F__Ctup is checked (#2718). When this value is 1, various commands for refeed outlet setting, discharge setting, and printing are transmitted to print processing unit 40 (#2719–#2721). The value of CT__Dup is decremented by 1 (#2722). Flag F__Ctup is reset to 0 (#2723). State counter SC is set to 1 (#2724).

Figure 45:
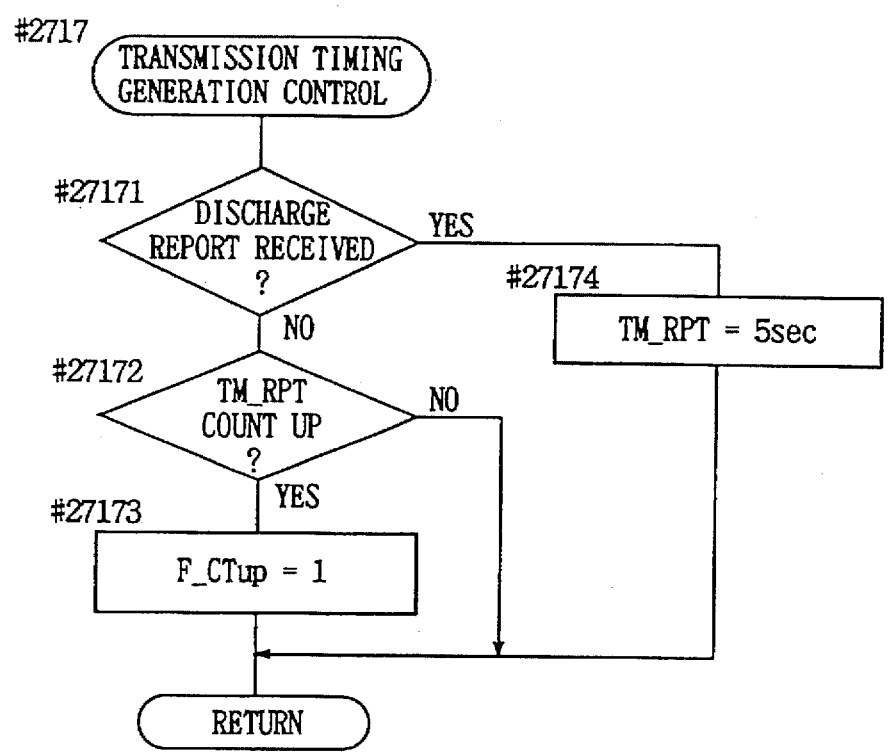
FIG. 45 is a flow chart showing the contents of a transmission timing generation control subroutine.

FIG. 45 is a subroutine of the refeed print command transmission timing generation control of #2717 in FIG. 44.

First, determination is made whether a refeed discharge report is received or not (#27171). If the report is received, a predetermined timer value TM__RPT that counts the timing for generating a refeed sheet print command is set (#27174). If a refeed sheet print command is generated at a premature timing, another sheet cannot be fed until the relevant sheet circulates refeed path 61 to have both sides printed. Therefore, this timer value is set to a maximum period so that as many recirculating sheets as possible remains in refeed path 61. When confirmation is made that timer value TM__RPT has counted up (#27172), flag F__Ctup is set to 1 (#27173).

Control provided by multijob controller 208 of FIG. 28 will be described hereinafter. Transportation of the sheets in copying apparatus 2 when the duplex side copy command of FIG. 31b is provided from CPU 1 will be described with reference to FIGS. 46a–46d.

Figure 46A:
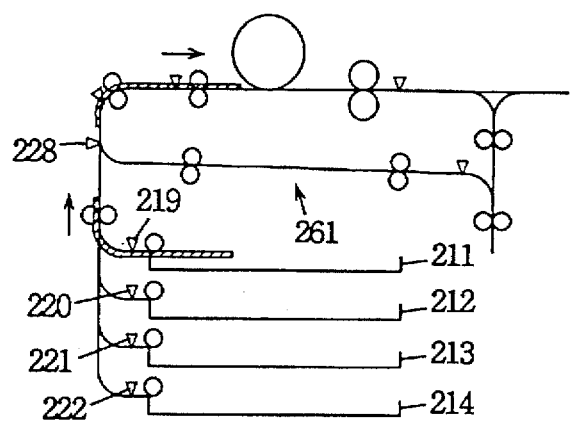
FIGS. 46a–46d and 47a–47d show the transportation of sheets in a PRT.
Figure 46B:
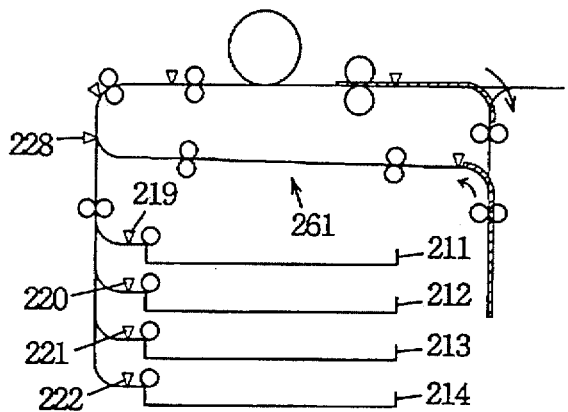
Figure 46C:
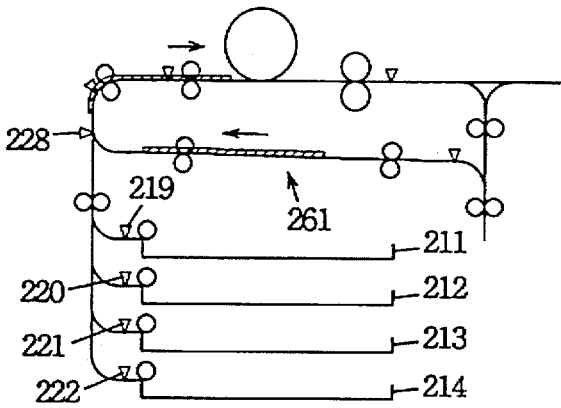
Figure 46D:
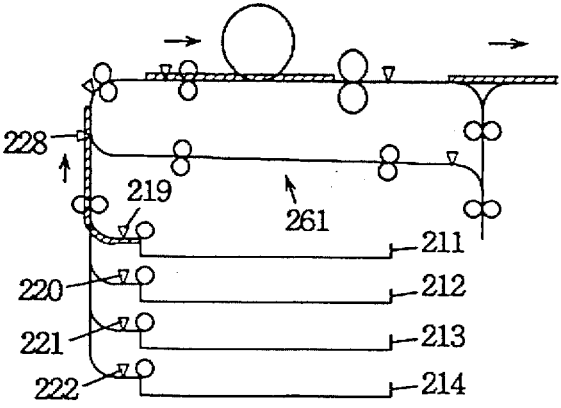

First, two sheets are continuously fed out from the sheet cassette to have the first side face printed (FIG. 46a). The sheet with the first face printed is reversed and transported in the circulation path to have the second side printed (FIGS. 46b, 46c). Following the print out of the second side, a new sheet is fed out from the sheet cassette to have its first side face printed (FIG. 46c). The above-described operation is repeated. Here, a sheet feed report and a discharge report transmitted from print processing unit 40 are also transmitted from multijob controller 208 to printer controller 205 to inform multijob controller 208 the operational status of copying apparatus 2.

Figure 47A:
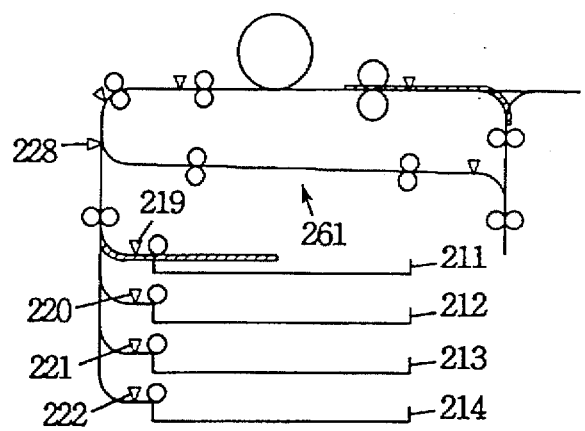
Figure 47B:
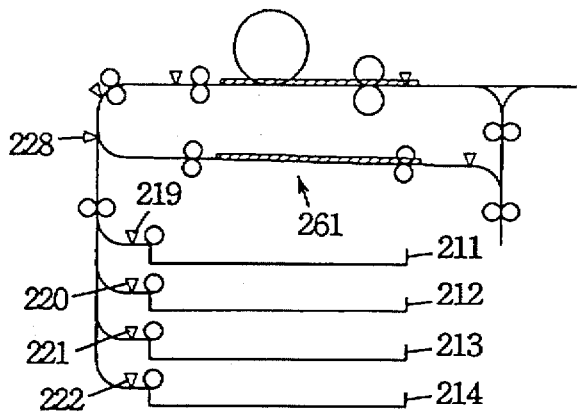
Figure 47C:
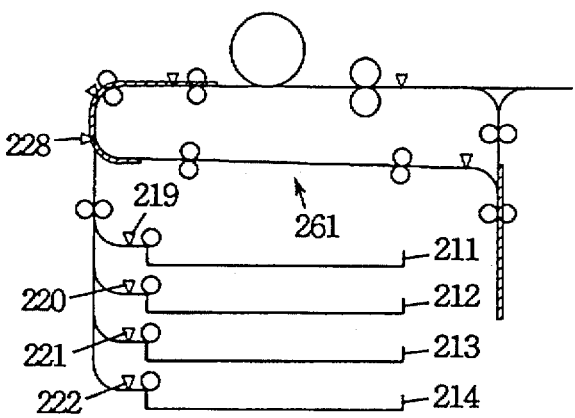
Figure 47D:
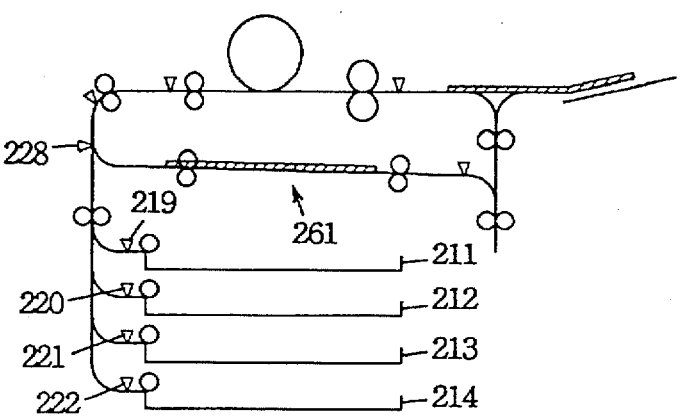

When the number of sheets to have its first side printed is not many with respect to the length of the refeed path (FIG. 46b), there will be a time period where nothing is printed out after the sheet of the first side is refed and until the first-side-printed sheet is returned with an image formed. In the case where 2-sheet 4-page duplex printing is specified, for example, sheet feeding will be delayed if transfer to a bit map memory is time-consuming due to the image of the second sheet for the first side face including a great amount of graphics. A sheet cannot be fed until the transfer ends. Therefore, the interval of sheet feeding will be increased (FIG. 47a). This means that the second sheet still remains in the image forming unit even when the first sheet for the first side face is transported to refeed path 261 (FIG. 47b). The increased interval of sheet feeding is maintained until print out for the second side face ends (FIGS. 47c, 47d). This interval is determined according to the delay time of sheet feeding.

When a reserved job is to be carried out during this print interval, the actual sheet feeding interval is identified at the time of feeding the first side face in duplex copy to determine whether a sheet for the reserved job can be fed during the interval when the second printing is carried out.

As shown in FIGS. 48a–48d, printing is carried out during this interval of duplex side printing when there is a print command from another information processing means or when there is a reserved job. This will be described hereinafter with reference to FIGS. 48a–48d. In the case of duplex side printing incorporating two sheets from the first stage cassette, the distance up to commencement of printing the second face is determined when sheet feeding for having the first side face printed ends. This distance P is represented by:

$$P = Lj - PSfx \times Nf - Linv \times (Nf-1)$$

where Lj is the length of the circulation path (the distance from intermediate roller sensor 228 to fixing discharge sensor 231+the distance from fixing discharge sensor 231 to intermediate roller sensor 28 via refeed path 261). Linv is the optimum sheet interval, PSfx is the size of the sheet mounted in the X cassette, and Nf is the number of fed sheets.

In the case where the interruptive reserved job is to use the sheet in the Yth stage cassette, sheet feeding from the Yth cassette is allowed when the condition of:

P>PSfy+Linv×2 is satisfied, where PSfy is the size of the sheet accommodated in the Yth cassette.

Figure 48A:
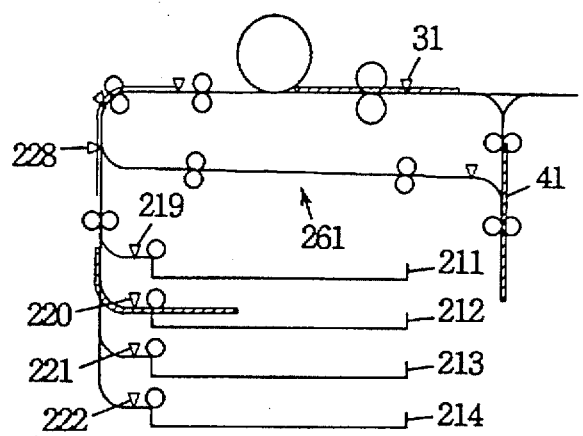
FIGS. 48a–48d show the transportation of sheets when a reserved job is carried out.
Figure 48B:
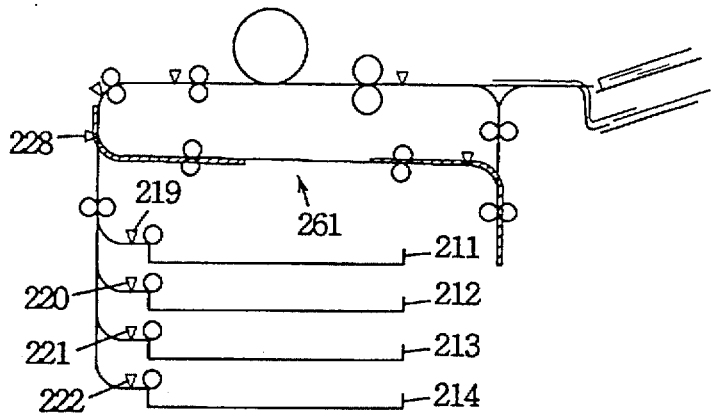
Figure 48C:
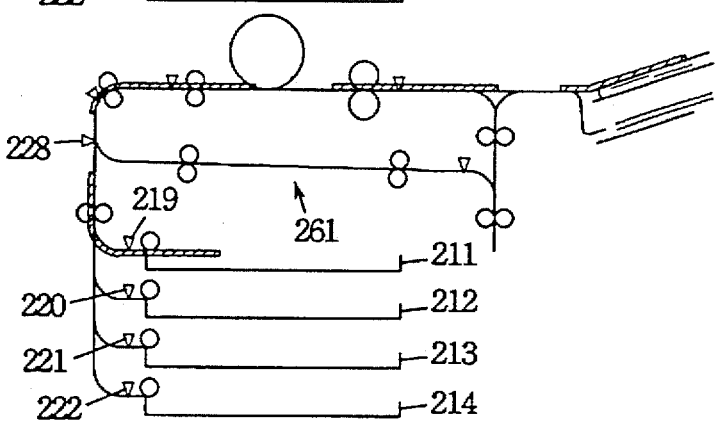
Figure 48D:
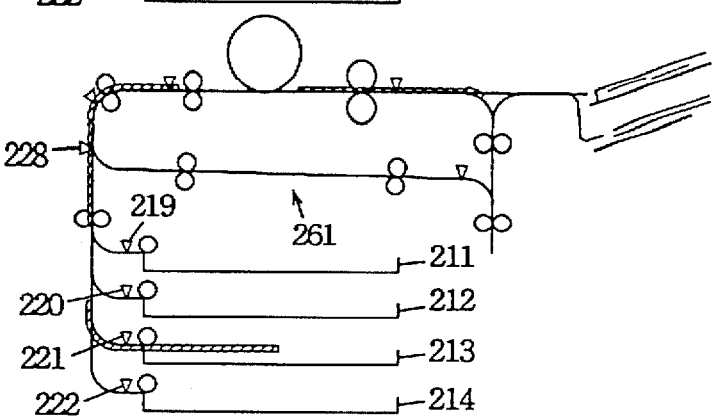

In the example of FIGS. 48a–48d, the reserved job will feed sheets from the second stage cassette (FIG. 48a). In this case, two sheets are fed out from the second stage. The sheet output from the second stage is discharged to a tray different from the discharge tray of the preceding job. The sheet fed out from the first stage is refed to the image formation unit through refeed path 261 to have the second side printed (FIG. 48b). The sheet having the second side printed is discharged outside the apparatus, and a sheet is fed from the first stage to have the first face printed (FIG. 48c). Following sheet feeding for first-side-print out, sheet feeding from the third stage is effected if another reserved job is to use the sheet in the third stage (FIG. 48d).

Figure 49:
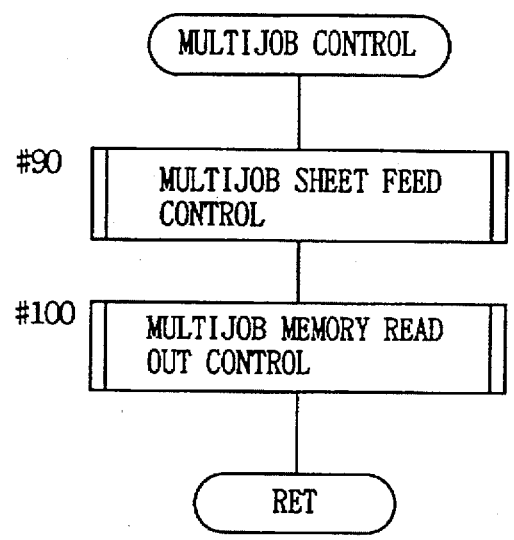
FIG. 49 is a flow chart showing the contents of multijob control.

FIG. 49 is a flow chart of the control routine of multijob controller 208. At #90, determination is made whether a reserved job from another information processing means can be executed during duplex side printing by page printer PRT. If allowed, a sheet feed command is output. When a reserved job from another information processing means is initiated during duplex copy printing by page printer PRT, image data of that job is read out from the buffer memory and provided to page printer PRT (#100).

Figure 50:
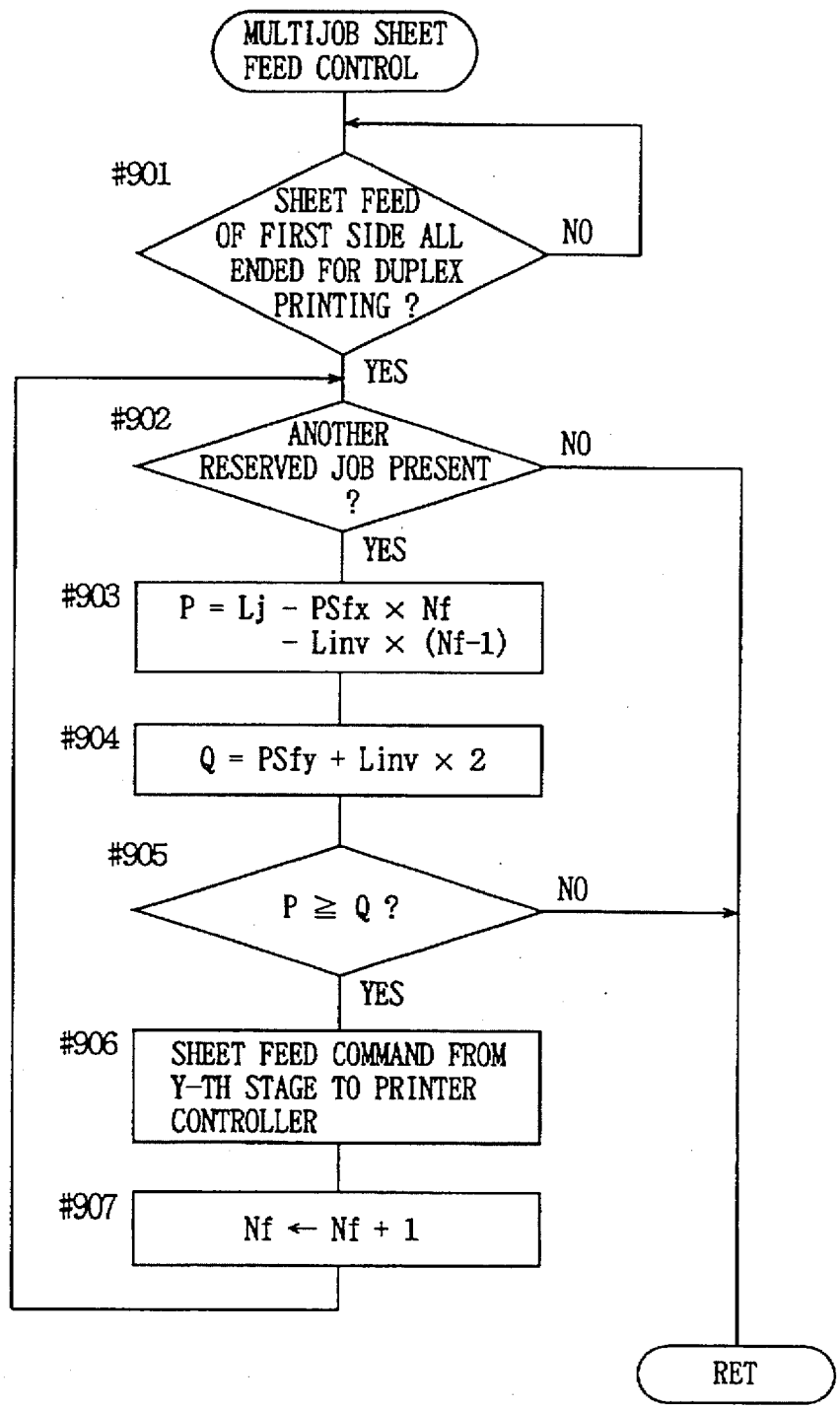
FIG. 50 is a flow chart showing the contents of multijob sheet feed control.

FIG. 50 is a flow chart of the multijob sheet feed control subroutine of #90 in FIG. 49. When sheet feeding of the first side for duplex printing is entirely completed (#901), determination is made whether there is a reserved job from another information processing means (#902). If there is a reserved job, distance P is calculated to determine whether sheet feeding of the reserved job can be provided after the last page of the first side sheet (#903). Also, distance Q is calculated to determine whether the sheet at the Yth stage required by the reserved job can be fed (#904). The value of P is compared with that of Q (#905). Sheet feeding is allowed if P≧Q. Sheet feeding from the Yth stage is provided to printer controller 205 (#906). The value of the number of fed sheets Nf is incremented (#907). The program returns to #902 to check whether further sheet feeding is allowed. When control of this subroutine is completely ended, the program returns to carry out printing of the second side face.

Figure 51:
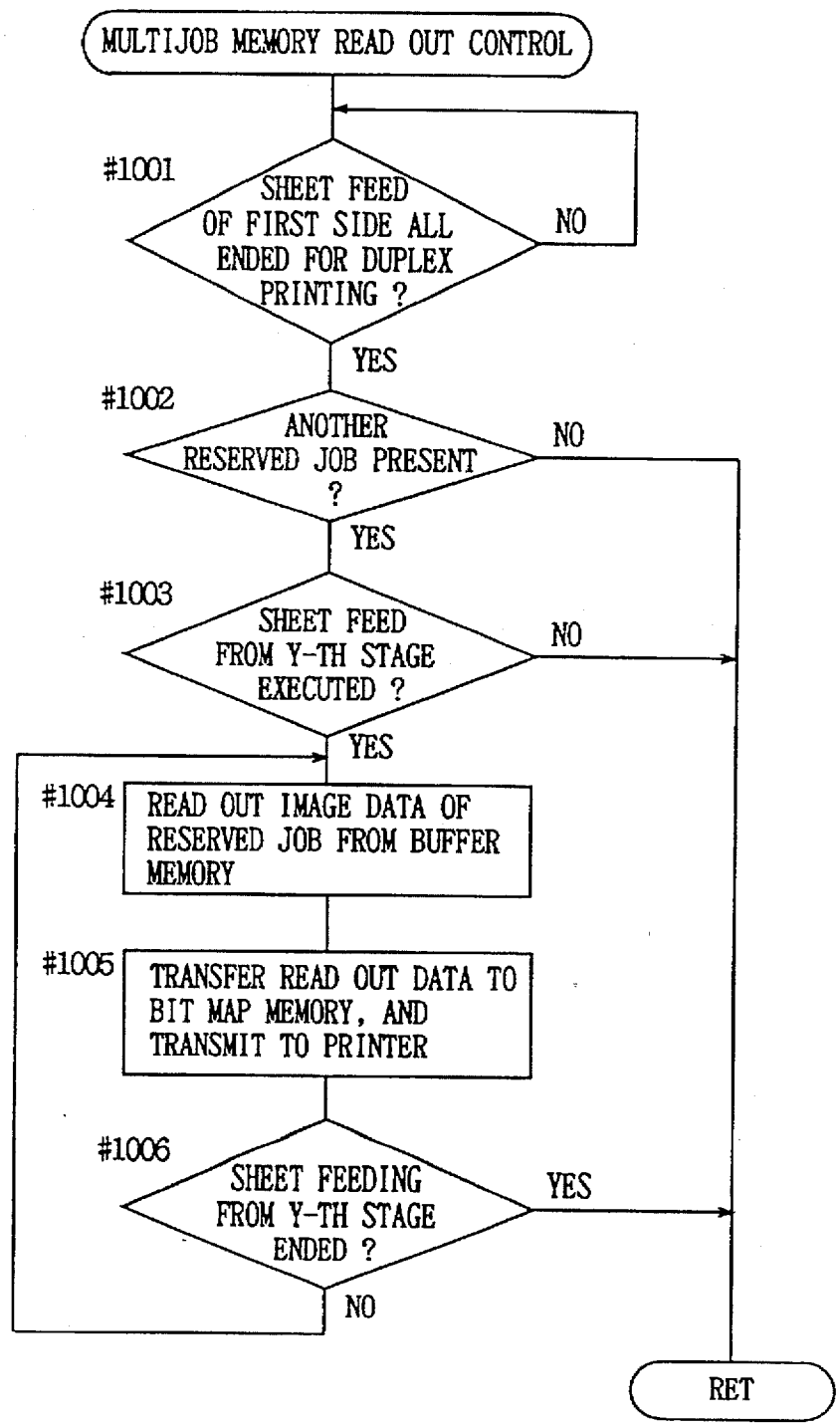
FIG. 51 is a flow chart showing the contents of multijob memory read out control.

FIG. 51 is a flow chart of the multijob memory read out control subroutine of #100 in FIG. 49. When sheet feeding of all the sheets for the first side in duplex printing is completely ended (#1001), determination is made whether there is a reserved job from another information processing means (#1002). When a reserved job is accepted and sheet feeding from the Yth stage is executed (#1003), image data of the reserved job stored in the buffer memory is read out (#1004). The read out data is transferred to the bit memory map and transmitted to page printer PRT (#1005). Since there is a possibility that sheet feeding is continued from the Yth stage, determination is made whether sheet feeding from the Yth stage has ended (#1006). If not ended, the program returns to #1004 to read out again image data of the reserved job. At completion of control of the subroutine, the program returns to print out the second side.

A further embodiment of the present invention will be described hereinafter. In the present embodiment, control by multijob controller 208 will be described with reference to FIGS. 52a–52d and 53.

Figure 52A:
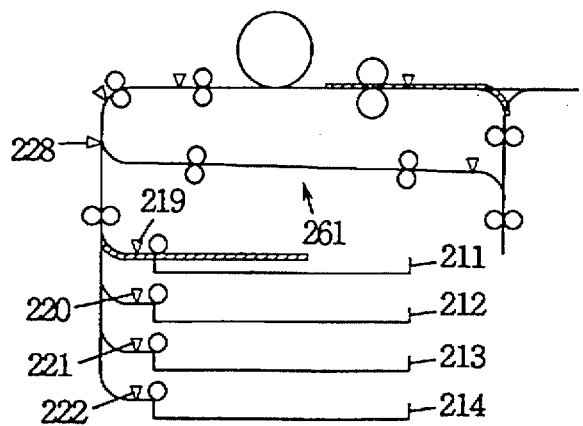
FIGS. 52a–52d show another embodiment of sheet feed control.
Figure 52B:
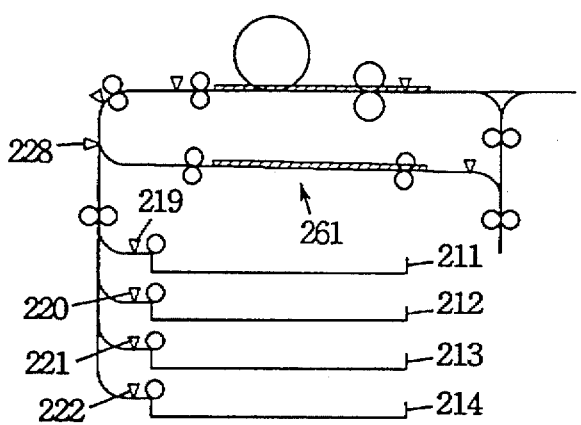

In the case where 2-sheet 4-page duplex printing is specified, sheet feeding cannot be effected if transfer to a bit map memory is time consuming due to the image of the second sheet for the first side including a great amount of graphics. Therefore, the sheet feed interval will be increased (FIG. 52a). As a result, the second sheet still remains in the image formation unit even when the first sheet of the first side face is transported to refeed path 261. (FIG. 52b)

Therefore, the distance from the end of sheet feed of the first sheet to the commencement of sheet feed of the second sheet is counted and stored. The sheet feed timing of the first and second sheets can be identified by the sheet feed reports transmitted from print processing unit 40. The interval R is represented as:

R=(time interval of sheet feed reports of first and second sheets)/transportation speed—sheet size If the interruptive reserved job is to use the sheet in the Y stage, sheet feeding is allowed from the Yth cassette when the condition of:

R>PSfy+Linv×2 is satisfied, where PSfy is the size of the sheet mounted in the Yth cassette and Linv is the optimum sheet interval.

Figure 52C:
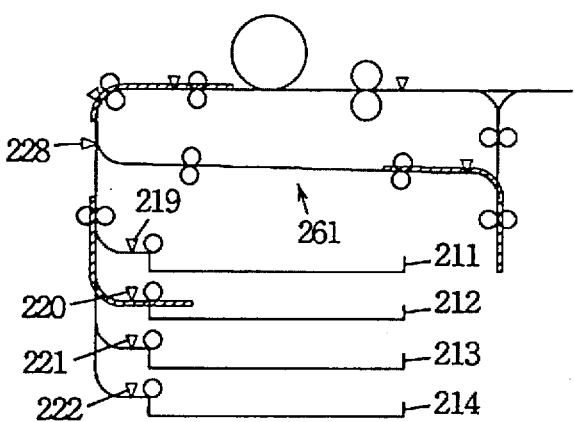
Figure 52D:
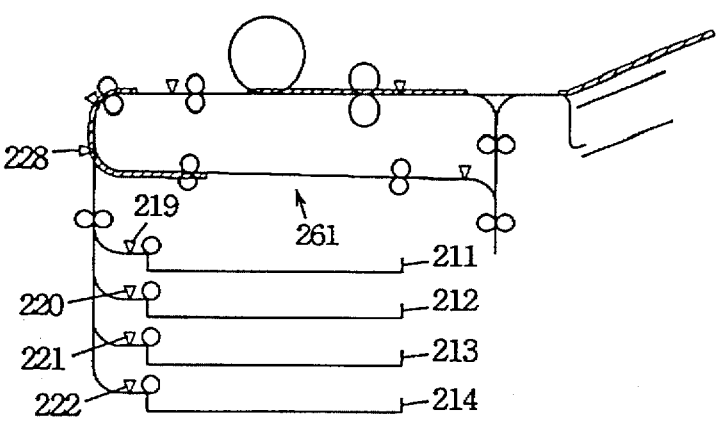
Figure 53:
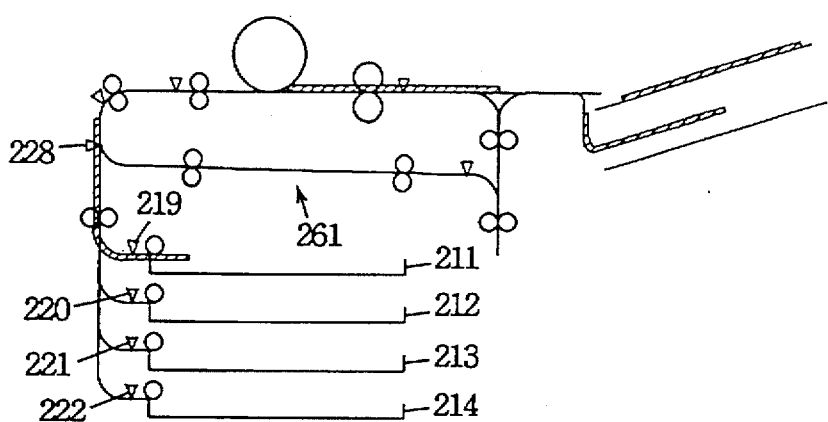
FIG. 53 shows another embodiment of a sheet feed format.

In the example of FIGS. 52a–52d, the reserved job uses the sheet from the second stage. The sheet of the reserved job is fed out from the second stage succeeding the first sheet of the second face returning from refeed path 261 (FIG. 52c). The first sheet of the second side is discharged outside the apparatus after the second side is printed, and an image is printed on the sheet of the reserved job (FIG. 52d). The sheet of the reserved job is discharged to a tray differing from the tray of the preceding job. Sheet feeding of the preceding job is effected (FIG. 53e).

Figure 54:
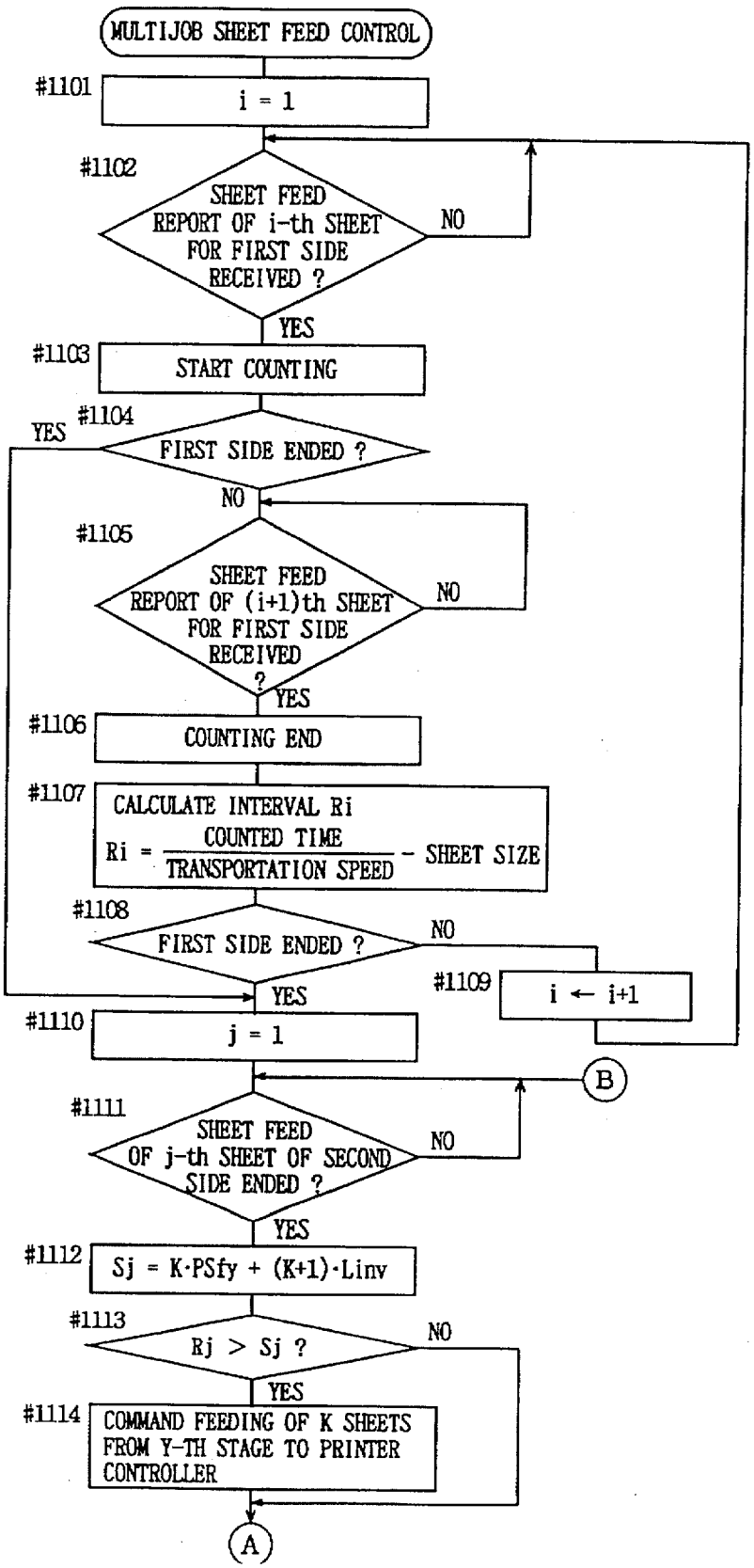
FIGS. 54 and 55 are flow charts showing the contents of multijob sheet feed control.
Figure 55:
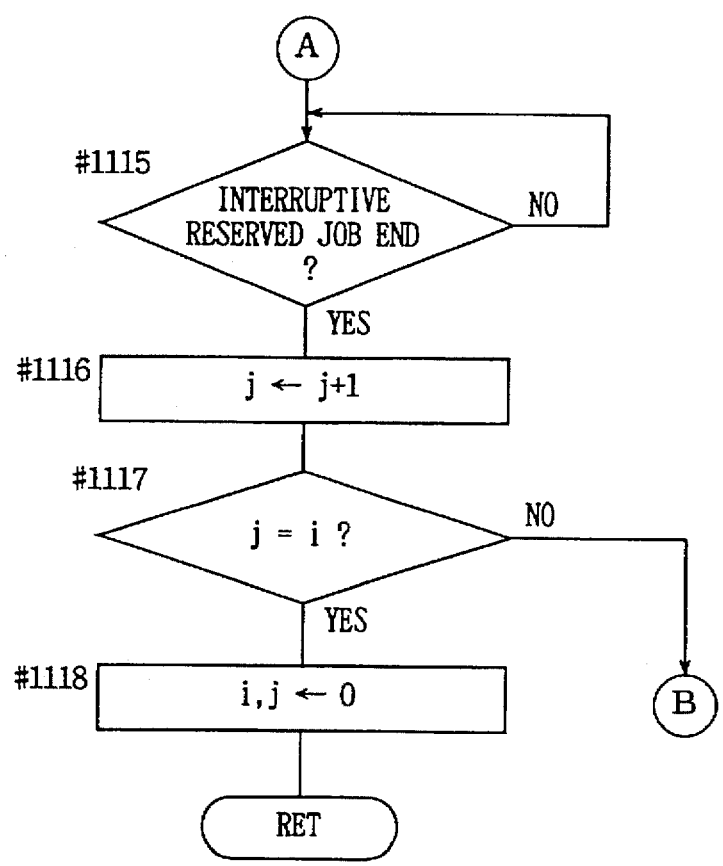

The multijob sheet feed control of multijob controller 208 is shown in FIGS. 54 and 55. The case where transfer to a bit map memory is time consuming due to the image of the first sheet for the first side face including a great amount of graphics in 2-sheet 4-page duplex printing.

Following initialization of i=1 (#1101), waiting is conducted to receive a sheet feed report of the first sheet for the first side (#1102). Upon receiving a sheet feed report of the first side of the first sheet, time counting of the sheet feed interval is initiated (#1103). The first side face is not yet completed, so that waiting is conducted for receiving a sheet feed report of the second sheet for the first side face (#1104, #1105). Upon receiving a sheet feed report of the second sheet for the first side, time counting of the sheet feed interval is ended (#1106) to calculate sheet feed interval R1 (#1107). After confirming ending of the first side (#1108), initialization of j=1 is effected (#1110). Waiting is conducted for sheet feeding of the first sheet for the second face to end (#1111). When the first sheet for the second face is fed, interval S1 is calculated required for feeding the sheet in the Yth stage for the interruptive reserved job in an interruptive manner between the first sheet for the second side and the second sheet for the second side (#1112). K is a natural number of sheets to be fed in an interruptive manner. When K=1 and R1>S1 is established, a command is provided to printer controller 205 to feed one sheet from the Yth stage (#1114). Waiting is conducted for sheet feeding of the interruptive reserved job to end (#1115). The count becomes j=2 at the next process (#1116). When j=i=2, i and j are both cleared to 0, and the program returns (#1117, #1118).

In the case of duplex printing with at least three incorporated sheets, the first face is not completed at #1108. Therefore, i is incremented, and the program returns to

1102. Interval R between the second and third sheets, interval R3 between the third and fourth sheets, . . . , are obtained repeatedly. The program returns to #1111 until printing of the second face is completed at #1117. The intervals S2, S3, . . . required for allowing interruptive sheet feeding are obtained to determine whether interruption is allowed between sheets during printing of the second side.

Figure 56:
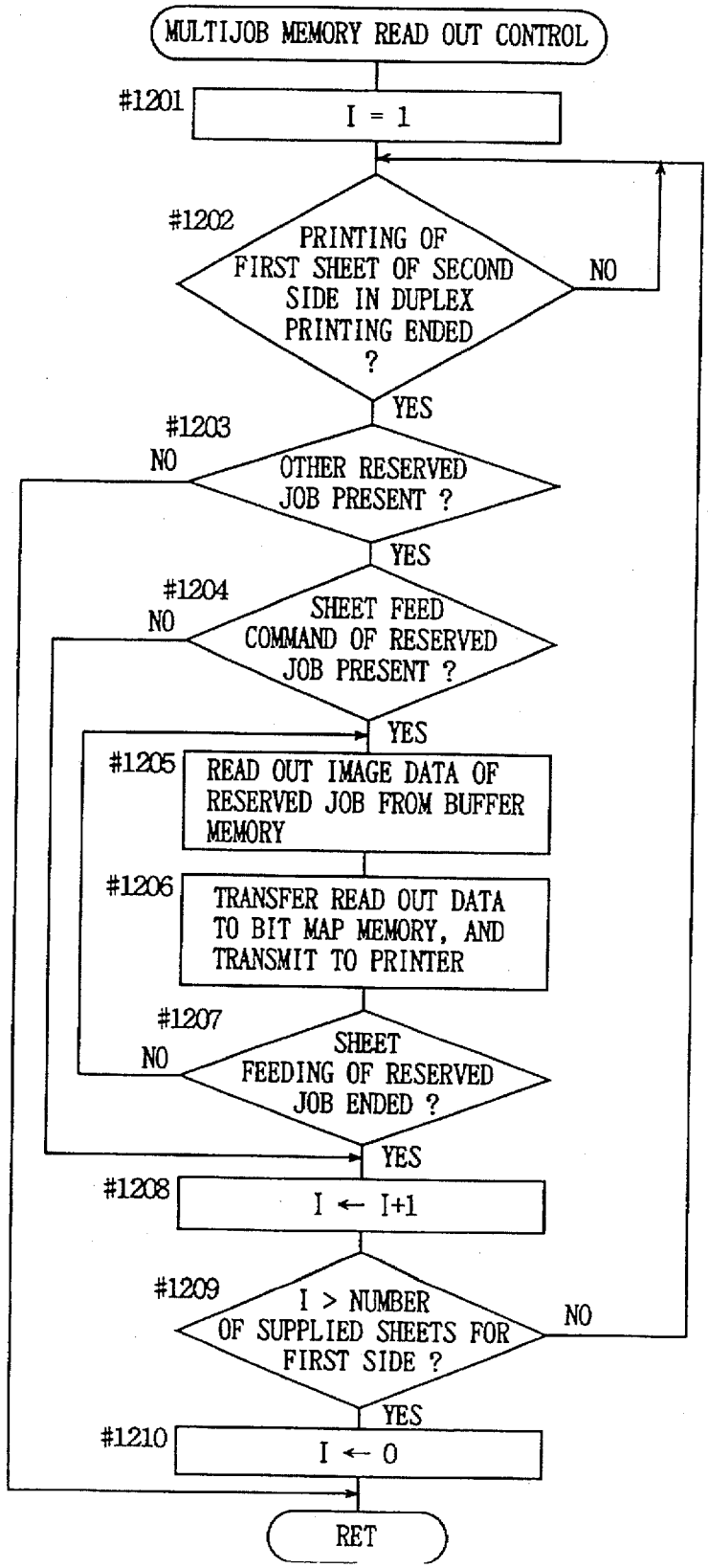
FIG. 56 is a flow chart showing the contents of multijob memory read out control.

The multijob memory read out control of multijob controller 208 will be described hereinafter with reference to FIG. 56. Likewise the above-described multijob sheet feed control, a case is described where transfer to a bit map memory is time consuming due to the image of the second sheet for the first side including a great amount of graphics in a 2-sheet 4-page duplex printing.

Following initialization of I=1 (#1201), waiting is conducted for the first sheet to have the second side printed (#1202). Determination is made whether a sheet feed command of a reserved job is output, when there is such a reserved job (#1203, #1204). When a sheet feed command of a reserved job is output, image data of that reserved job is read out from the buffer memory (#1205). The read out data is transferred to the bit map memory for transmission to the copying apparatus (#1206). When all sheet feeding of the reserved job ends (#1207), the value of I is incremented (1208). When I=2, the value of I is cleared to 0 (#1209, #1210). Then, the program returns.

In the case of duplex printing with at least 3 incorporating sheets, the program returns to #1202 until the number of sheets fed for the second side at #1209 becomes equal to the number of sheets fed out for the first side face. Determination is made whether read out of an image of a reserved job is to be carried out.

The present embodiment was described where a reserved job is executed in an interruptive manner when the sheet interval is increased in duplex printing. The present invention is also applicable to the case where the sheet interval is increased in cases besides duplex printing. Such a case is set forth in the following.

When a copy operation is to be effected while stapling with a finisher or a staple sorter, the sheets are accommodated while being arranged at the stable position. The sheets are stapled together and discharged outside the apparatus. Sheet interval must be provided since subsequent sheets cannot be accommodated in a staple mode. Here, an interruptive execution as shown in FIGS. 26 and 27 is allowed if the reserved job does not require a stable operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A copying apparatus that interrupts a first job during printing of the first job to allow printing by another interruption job, said copying apparatus comprising:

an input unit for optically reading out an original image and converting the same into image data of electrical signals, a memory for storing said image data read out by said input unit, a print unit for printing on a sheet according to the image data stored in said memory, a detection unit for detecting a print wait state of said print unit when said interruption job is in progress, a first control unit for restarting printing of the interrupted said first job when a print wait state is detected by said detection unit, and a second control unit for interrupting printing of said restarted first job to initiate printing of the interruption job when cancel of a print wait state of the interruption job is detected by said detection unit.

2. The copying apparatus according to claim 1, wherein said detection unit detects whether an original read in time period is longer than a print out time period.

3. The copying apparatus according to claim 2, wherein said detection unit provides detection according to whether a mode for printing a plurality of original images on one sheet is selected for said interruption job.

4. The copying apparatus according to claim 3, wherein said detection unit detects a print wait state according to generation of an error in printing of the interruption job in said print unit.

5. The copying apparatus according to claim 4, wherein said error in said print unit includes a sheet empty error.

6. An image formation apparatus that allows an interrupt process of a second job during execution of a first job, said image formation apparatus comprising:

an input unit for taking in image data corresponding to each said job, a transfer unit for transferring said image data taken in by said input unit onto a memory in advance for printing, a print unit for printing the image data transferred onto the memory by said transfer unit on a sheet, an identification unit for identifying, during a standby period of a print unit of one of said first job and said second job during execution thereof, whether execution of the other of said first job and said second job is executable, and a control unit for providing control such that said other job is executed simultaneous to said one job when identification is made that execution is possible by said identification unit.

7. The image formation apparatus according to claim 6, further comprising a finisher for post-processing a printed sheet, wherein said identification unit identifies whether execution of another job is executable when one job in progress is executing said post-process by said finisher.

8. The image formation apparatus according to claim 7, wherein said control unit executes a process excluding the process by said finisher in execution of another job.

9. The image formation apparatus according to claim 6, wherein said input unit includes an image scanner for optically reading an original image and converting the same into electrical signals, wherein said identification unit for identifying whether said other job is executable depending on whether the mode for printing a plurality of original images on one sheet is selected for said one job.

10. An image formation apparatus having a reservation function that allows registration of a plurality of jobs for image formation according to a set of image data, and that initiates a print operation of a second job continuous to termination of a print operation of a first job, said image formation apparatus comprising:

an input unit for entering image data and an operation mode at each job, and a print unit for printing input image data on a sheet, a detection unit for detecting feeding interval of sheets fed to said print unit, and determination unit for determining whether a print operation of at least one sheet of the second job is allowed during the feeding interval of the first job detected by said detection unit, and a controller for forming an image of said second job during image formation of said first job when determination is made that printing is allowed by said determination unit.

11. The image formation apparatus according to claim 10, wherein a sheet having an image formed in said first job and a sheet having an image formed in said second job are discharged in different forms when said first and second jobs are simultaneously executed in parallel.

12. The image formation apparatus according to claim 10, wherein said print unit includes a circulation path for duplex side to form an image on both sides of said sheet, and wherein said detection unit detects a time period from termination of image formation of a first side up to initiation of image formation of a second side.

13. The image formation apparatus according to claim 10, further comprising a memory for storing a plurality of input image data, wherein said print unit forms an image on said sheets according to the image data stored in said memory.

14. A print method of a copying apparatus that interrupts a first job during printing of said first job to allow printing by another interruption job, comprising the steps of:

optically reading out an original image to convert the same into image data of electrical signals, storing said read image data into a memory, printing on a sheet according to the image data stored in said memory, detecting a print wait state of said print step during when the interruption job is in progress, restarting said interrupted first job when said print wait state is detected, and interrupting printing of said restarted first job to initiate printing of the interruption job when detection is made of cancel of a print wait state of said interruption job.

15. The print method of a copying apparatus according to claim 14, further comprising a finishing step for applying a post-process on a printed sheet, and including the step of identifying that another job can be executed when one job in progress carries out a post-process.

16. An image formation apparatus method of an image formation apparatus having a reservation function that allows registration of a plurality of jobs for image formation according to one set of image data, and that initiates a print operation of a second job continuous to termination of a print operation of a first job, said method comprising the steps of:

entering image data and an operation mode at each job, printing the input image data on a sheet, detecting feeding interval of sheets fed to said print unit, determining whether a print operation of at least one sheet of the second job is allowed during said detected feeding interval of the first job, and forming an image of said second job during image formation of said first job when said determination result indicates that printing is allowed.

* * * * *